(12) United States Patent
Kingsbury et al.

(10) Patent No.: US 10,530,478 B2
(45) Date of Patent: *Jan. 7, 2020

(54) FREE-SPACE OPTICAL COMMUNICATION MODULE FOR SMALL SATELLITES

(71) Applicant: MASSACHUSETTS INSTITUTE OF TECHNOLOGY, Cambridge, MA (US)

(72) Inventors: Ryan Wallace Kingsbury, Cambridge, MA (US); Kathleen Michelle Riesing, Cambridge, MA (US); Kerri Lynn Cahoy, Lexington, MA (US); Tam Nguyen Thuc Nguyen, Cambridge, MA (US); David O. Caplan, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,094

(22) Filed: Nov. 6, 2017

(65) Prior Publication Data

US 2018/0076895 A1 Mar. 15, 2018

Related U.S. Application Data

(63) Continuation of application No. 14/817,985, filed on Aug. 4, 2015, now Pat. No. 9,813,151.

(Continued)

(51) Int. Cl.
*H04B 10/00* (2013.01)
*H04B 10/118* (2013.01)
*H04B 7/185* (2006.01)

(52) U.S. Cl.
CPC ....... *H04B 10/118* (2013.01); *H04B 7/18513* (2013.01); *H04B 7/18515* (2013.01); *H04B 7/18517* (2013.01)

(58) Field of Classification Search
CPC .................................................. H04B 10/118
(Continued)

(56) References Cited

U.S. PATENT DOCUMENTS 3,567,155 A * 3/1971 Gatlin ...................... B64G 1/34
244/167
3,658,427 A * 4/1972 DeCou ..................... B64G 1/36
244/3.16
(Continued)

FOREIGN PATENT DOCUMENTS

| CA | 2794400 A1 | 10/2011 |
|---|---|---|
| EP | 2073404 A1 | 6/2009 |
| WO | WO 2011/120654 A1 | 10/2011 |

OTHER PUBLICATIONS

Spellmeyer et al., "A multi-rate DPSK modem for free-space laser communications," Proceedings of SPIE, vol. 8971, 10 pages, 2014.

(Continued)

*Primary Examiner* — Agustin Bello
(74) *Attorney, Agent, or Firm* — Smith Baluch LLP

(57) ABSTRACT

Communication bottlenecks, particularly in the downlink direction, are a common problem for many CubeSat developers. As described herein, a CubeSat module for a CubeSat comprises an optical transmitter to transmit data to a remote terminal, a receiver to acquire an optical beacon from a remote terminal, and a fine-pointing module operably and directly coupleable to a coarse-pointing module of the CubeSat. The fine-pointing module is configured to point the optical transmitter toward the remote terminal with an accuracy range that overlaps with an accuracy range of the coarse-pointing module of the CubeSat so as to establish a communications link between the CubeSat and the remote terminal over a low-Earth-orbit (LEO) distance.

18 Claims, 30 Drawing Sheets

Related U.S. Application Data

(60) Provisional application No. 62/033,321, filed on Aug. 5, 2014, provisional application No. 62/112,854, filed on Feb. 6, 2015.

(58) Field of Classification Search
USPC .................................................. 398/118–131
See application file for complete search history.

(56) References Cited

U.S. PATENT DOCUMENTS

| | | | | |
|---|---|---|---|---|
| 4,078,747 A * | 3/1978 | Minovitch | ............ | B64G 1/425 |
| | | | | 136/292 |
| 4,170,904 A * | 10/1979 | Fischell | ............ | B64G 1/26 |
| | | | | 244/166 |
| 5,041,833 A * | 8/1991 | Weinberg | ............ | G01S 5/14 |
| | | | | 342/357.48 |
| 5,067,672 A * | 11/1991 | Bouzat | ............ | B64G 1/007 |
| | | | | 244/158.5 |
| 5,119,225 A * | 6/1992 | Grant | ............ | H04B 10/118 |
| | | | | 244/158.4 |
| 5,367,371 A * | 11/1994 | Krawczyk | ............ | B64G 1/22 |
| | | | | 356/28.5 |
| 5,446,465 A * | 8/1995 | Diefes | ............ | G01C 21/00 |
| | | | | 342/352 |
| 5,450,223 A | 9/1995 | Wagner et al. | | |
| 5,474,264 A * | 12/1995 | Lund | ............ | B64G 1/34 |
| | | | | 244/167 |
| 5,506,588 A * | 4/1996 | Diefes | ............ | G01C 21/00 |
| | | | | 342/357.27 |
| 5,508,932 A * | 4/1996 | Achkar | ............ | B64G 1/24 |
| | | | | 244/164 |
| 5,534,875 A * | 7/1996 | Diefes | ............ | G01C 21/00 |
| | | | | 342/357.59 |
| 5,562,266 A * | 10/1996 | Achkar | ............ | B64G 1/24 |
| | | | | 244/171 |
| 5,666,648 A * | 9/1997 | Stuart | ............ | H04B 7/18576 |
| | | | | 342/352 |
| 5,710,652 A * | 1/1998 | Bloom | ............ | H04B 10/118 |
| | | | | 398/129 |
| 5,831,572 A * | 11/1998 | Damilano | ............ | G01S 19/14 |
| | | | | 342/352 |
| 5,903,545 A * | 5/1999 | Sabourin | ............ | H04L 45/02 |
| | | | | 370/225 |
| 6,076,939 A * | 6/2000 | Czichy | ............ | G02B 7/183 |
| | | | | 359/848 |
| 6,087,646 A * | 7/2000 | Didinsky | ............ | B64G 1/361 |
| | | | | 244/164 |
| 6,097,522 A * | 8/2000 | Maerki | ............ | H04B 10/118 |
| | | | | 398/1 |
| 6,098,929 A * | 8/2000 | Falbel | ............ | B64G 1/361 |
| | | | | 244/171 |
| 6,147,644 A | 11/2000 | Castles et al. | | |
| 6,181,450 B1 * | 1/2001 | Dishman | ............ | H04B 7/18521 |
| | | | | 370/281 |
| 6,195,044 B1 * | 2/2001 | Fowell | ............ | B64G 1/28 |
| | | | | 342/355 |
| 6,268,944 B1 | 7/2001 | Szapiel | | |
| 6,281,853 B1 * | 8/2001 | Caille | ............ | H01Q 3/02 |
| | | | | 343/753 |
| 6,297,897 B1 * | 10/2001 | Czichy | ............ | H04B 10/118 |
| | | | | 398/122 |
| 6,347,001 B1 * | 2/2002 | Arnold | ............ | H04B 10/118 |
| | | | | 398/122 |
| 6,411,414 B1 | 6/2002 | Abate et al. | | |
| 6,445,496 B1 | 9/2002 | Presby et al. | | |
| 6,469,815 B1 * | 10/2002 | Poon | ............ | H04B 10/118 |
| | | | | 398/131 |
| 6,522,440 B1 * | 2/2003 | Poon | ............ | H04B 10/118 |
| | | | | 398/103 |
| 6,535,314 B1 * | 3/2003 | Mendenhall | ............ | H04B 10/118 |
| | | | | 250/491.1 |
| 6,535,734 B1 * | 3/2003 | Miller | ............ | H01Q 1/125 |
| | | | | 342/354 |
| 6,570,695 B1 | 5/2003 | Pribil et al. | | |
| 6,590,685 B1 * | 7/2003 | Mendenhall | ............ | G01S 3/786 |
| | | | | 250/491.1 |
| 6,661,975 B1 | 12/2003 | Hall et al. | | |
| 6,674,576 B1 | 1/2004 | Carollo et al. | | |
| 6,763,195 B1 | 7/2004 | Willebrand et al. | | |
| 6,778,779 B1 | 8/2004 | Shay et al. | | |
| 6,834,164 B1 | 12/2004 | Chan | | |
| 6,839,520 B1 * | 1/2005 | Dreischer | ............ | H04B 10/118 |
| | | | | 398/121 |
| 6,868,237 B2 | 3/2005 | Willebrand et al. | | |
| 7,197,248 B1 | 3/2007 | Vorontsov et al. | | |
| 7,216,036 B2 * | 5/2007 | Brady | ............ | B64G 1/288 |
| | | | | 244/164 |
| 7,277,641 B1 | 10/2007 | Gleckman | | |
| 7,289,736 B1 | 10/2007 | Graves | | |
| 7,292,789 B1 | 11/2007 | Capots et al. | | |
| 7,343,099 B2 * | 3/2008 | Wirth | ............ | G02B 26/06 |
| | | | | 398/123 |
| 7,379,673 B2 | 5/2008 | Krill et al. | | |
| 7,457,326 B2 | 11/2008 | Rogers et al. | | |
| 7,609,972 B2 | 10/2009 | Cunningham et al. | | |
| 7,610,687 B2 * | 11/2009 | Stegmaier | ............ | E02F 3/847 |
| | | | | 33/285 |
| 7,631,839 B1 | 12/2009 | Duncan et al. | | |
| 7,657,183 B2 * | 2/2010 | Drago | ............ | H04B 10/118 |
| | | | | 398/122 |
| 7,729,816 B1 * | 6/2010 | Josselson | ............ | G05D 1/0883 |
| | | | | 701/1 |
| 7,826,752 B1 | 11/2010 | Zanoni et al. | | |
| 7,920,794 B1 | 4/2011 | Whaley et al. | | |
| 7,925,167 B1 * | 4/2011 | Kozubal | ............ | H04B 10/118 |
| | | | | 398/118 |
| 8,312,782 B2 * | 11/2012 | McMickell | ............ | B64G 1/286 |
| | | | | 74/5.37 |
| 8,526,328 B2 * | 9/2013 | Hunt | ............ | G01S 19/51 |
| | | | | 370/252 |
| 8,989,579 B2 | 3/2015 | Arnold et al. | | |
| 9,027,887 B2 * | 5/2015 | Polle | ............ | B64G 1/26 |
| | | | | 244/158.6 |
| 9,048,950 B2 | 6/2015 | Chen et al. | | |
| 9,304,259 B1 * | 4/2016 | Yasumura | ............ | G02B 6/3512 |
| 9,522,746 B1 * | 12/2016 | Ih | ............ | G05D 1/0883 |
| 9,723,386 B1 | 8/2017 | Ni et al. | | |
| 9,813,151 B2 * | 11/2017 | Kingsbury | ............ | H04B 10/118 |
| 9,866,324 B2 | 1/2018 | Clemmensen | | |
| 9,966,658 B2 * | 5/2018 | Fitz-Coy | ............ | H01Q 1/288 |
| 2001/0012142 A1 * | 8/2001 | Carlson | ............ | H04B 10/118 |
| | | | | 398/121 |
| 2002/0041575 A1 | 4/2002 | Karabinis et al. | | |
| 2002/0121574 A1 * | 9/2002 | Davis | ............ | B64G 1/365 |
| | | | | 244/171 |
| 2002/0167702 A1 * | 11/2002 | Badesha | ............ | B64B 1/50 |
| | | | | 398/121 |
| 2002/0167708 A1 | 11/2002 | Tsao et al. | | |
| 2003/0050008 A1 | 3/2003 | Patterson et al. | | |
| 2003/0091276 A1 | 5/2003 | Wang et al. | | |
| 2003/0095302 A1 | 5/2003 | Schuster et al. | | |
| 2003/0172208 A1 | 9/2003 | Fidler | | |
| 2004/0148083 A1 | 1/2004 | Arakawa et al. | | |
| 2004/0052465 A1 | 3/2004 | Verbana et al. | | |
| 2004/0098178 A1 * | 5/2004 | Brady | ............ | B64G 1/288 |
| | | | | 701/4 |
| 2004/0127158 A1 | 7/2004 | Dai et al. | | |
| 2004/0141754 A1 * | 7/2004 | Cheng | ............ | H04B 10/1125 |
| | | | | 398/122 |
| 2004/0172403 A1 | 9/2004 | Steele et al. | | |
| 2004/0249964 A1 | 12/2004 | Mougel et al. | | |
| 2005/0069325 A1 * | 3/2005 | Cicchiello | ............ | H04B 10/1125 |
| | | | | 398/122 |
| 2005/0100339 A1 | 5/2005 | Tegge | | |
| 2006/0024061 A1 | 2/2006 | Wirth et al. | | |
| 2006/0030258 A1 | 2/2006 | Mocquard et al. | | |
| 2006/0056852 A1 * | 3/2006 | Cazaubel | ............ | H04B 10/118 |
| | | | | 398/122 |

(56) References Cited

U.S. PATENT DOCUMENTS

| | | |
|---|---|---|
| 2007/0019605 A1 | 1/2007 | Rioux et al. |
| 2007/0031150 A1 | 2/2007 | Fisher et al. |
| 2007/0031151 A1* | 2/2007 | Cunningham ..... H04B 10/1123 398/131 |
| 2008/0002981 A1 | 1/2008 | Valley et al. |
| 2008/0118247 A1* | 5/2008 | Drago ................. H04B 10/118 398/122 |
| 2008/0123738 A1 | 5/2008 | Katsavounidis et al. |
| 2008/0181108 A1 | 7/2008 | Hashmi et al. |
| 2008/0187322 A1* | 8/2008 | Tuchler ............... H04B 14/026 398/140 |
| 2009/0034654 A1 | 2/2009 | Inukai et al. |
| 2009/0131046 A1 | 5/2009 | Karabinis et al. |
| 2009/0324236 A1* | 12/2009 | Wu ...................... H04B 10/118 398/122 |
| 2010/0021166 A1* | 1/2010 | Way ........................ H04J 14/02 398/79 |
| 2010/0046953 A1* | 2/2010 | Shaw ...................... H01S 5/423 398/115 |
| 2010/0090866 A1* | 4/2010 | Chen ........................ B64G 6/00 340/953 |
| 2010/0201566 A1 | 8/2010 | Wyler |
| 2010/0226495 A1 | 9/2010 | Kelley et al. |
| 2010/0266290 A1* | 10/2010 | Altan .................. H04B 10/118 398/156 |
| 2010/0320330 A1* | 12/2010 | McMickell ............ B64G 1/286 244/165 |
| 2011/0004405 A1* | 1/2011 | Hutchin ................ G01C 21/025 701/513 |
| 2011/0155858 A1* | 6/2011 | Lagadec .............. B64G 1/1021 244/171 |
| 2011/0169688 A1 | 7/2011 | Wyler |
| 2011/0239421 A1 | 10/2011 | Tertitsk |
| 2011/0274429 A1 | 10/2011 | Caplan et al. |
| 2011/0285590 A1* | 11/2011 | Wellington ............ G01C 21/20 342/417 |
| 2012/0008961 A1 | 1/2012 | Chen et al. |
| 2012/0109425 A1* | 5/2012 | Janson ................... G01C 21/24 701/14 |
| 2012/0199697 A1* | 8/2012 | Nagabhushan ........ B64G 1/286 244/165 |
| 2012/0249366 A1* | 10/2012 | Pozgay .............. H04B 7/18571 342/354 |
| 2012/0276898 A1* | 11/2012 | Korb .................... B64G 1/1021 455/427 |
| 2012/0292531 A1 | 11/2012 | Grudinin et al. |
| 2013/0156439 A1 | 6/2013 | Arnold et al. |
| 2013/0182620 A1 | 7/2013 | Chaffee et al. |
| 2013/0183040 A1 | 7/2013 | Elahmadi |
| 2013/0193303 A1* | 8/2013 | Smith ..................... G01C 21/24 250/203.6 |
| 2013/0208082 A1 | 8/2013 | Williams et al. |
| 2013/0229709 A1* | 9/2013 | Newswander ......... G02B 23/02 359/399 |
| 2013/0293414 A1* | 11/2013 | Robinson ................ G01S 19/05 342/357.25 |
| 2013/0336661 A1 | 12/2013 | Chorvalli |
| 2014/0004853 A1 | 1/2014 | Mitchell |
| 2014/0016932 A1 | 1/2014 | Coleman et al. |
| 2014/0016941 A1* | 1/2014 | Coleman .............. H04B 10/118 398/121 |
| 2014/0222472 A1* | 8/2014 | Platzer ................... G06Q 10/02 705/5 |
| 2014/0241731 A1 | 8/2014 | Peach et al. |
| 2014/0266420 A1 | 9/2014 | Brown |
| 2014/0270749 A1 | 9/2014 | Miniscalco et al. |
| 2014/0294399 A1 | 10/2014 | Markowski et al. |
| 2014/0341586 A1 | 11/2014 | Wyler |
| 2014/0354477 A1* | 12/2014 | Robinson ................ G01S 19/11 342/357.78 |
| 2014/0354996 A1 | 12/2014 | Fontecchio et al. |
| 2014/0362875 A1 | 12/2014 | Le Kernec et al. |
| 2014/0376001 A1 | 12/2014 | Swanson |
| 2015/0001345 A1* | 1/2015 | Polle ....................... B64G 1/26 244/158.6 |
| 2015/0078250 A1 | 3/2015 | Mineta et al. |
| 2015/0110491 A1 | 4/2015 | Gayrard et al. |
| 2015/0125157 A1 | 5/2015 | Chao et al. |
| 2015/0131703 A1 | 5/2015 | Balter et al. |
| 2015/0207562 A1* | 7/2015 | Brumley, II ......... H04B 10/118 398/125 |
| 2015/0215041 A1 | 7/2015 | Pechner et al. |
| 2015/0298827 A1* | 10/2015 | Nguyen ................. B64G 1/365 701/13 |
| 2016/0013882 A1 | 1/2016 | Hashimoto |
| 2016/0033649 A1 | 2/2016 | Mathews et al. |
| 2016/0043800 A1* | 2/2016 | Kingsbury ........... H04B 10/118 398/125 |
| 2016/0084070 A1* | 3/2016 | Weston ................. E21B 47/024 702/150 |
| 2016/0087711 A1 | 3/2016 | Tayrac et al. |
| 2016/0112124 A1 | 4/2016 | Juarez et al. |
| 2016/0192303 A1 | 6/2016 | Tender et al. |
| 2016/0204851 A1 | 7/2016 | Li et al. |
| 2016/0204861 A1* | 7/2016 | Boroson ............ H04B 10/1121 398/96 |
| 2016/0204866 A1* | 7/2016 | Boroson ............ H04B 10/1121 398/97 |
| 2016/0204899 A1 | 7/2016 | Kojima et al. |
| 2016/0308601 A1 | 10/2016 | Mochida |
| 2017/0026109 A1* | 1/2017 | Wyler ................. H04B 7/18519 |
| 2017/0141849 A1* | 5/2017 | Thangavelautham ...................... H04B 10/118 |
| 2017/0208251 A1* | 7/2017 | Shamir ...................... G06T 7/33 |
| 2017/0264365 A1 | 9/2017 | Takahashi et al. |
| 2017/0302377 A1 | 10/2017 | Boroson et al. |
| 2017/0346563 A1* | 11/2017 | Steinkraus ............. H04B 10/29 |
| 2018/0006600 A1* | 1/2018 | Douglas .................. H02S 40/22 |
| 2018/0037336 A1* | 2/2018 | Rammos ............ H04B 7/18504 |
| 2018/0076895 A1* | 3/2018 | Kingsbury ........... H04B 10/118 |

OTHER PUBLICATIONS

U.S. Non-Final Office Action dated Mar. 22, 2018 from U.S. Appl. No. 14/991,394, 53 pages.

U.S. Notice of Allowance (Corrected) dated Mar. 30, 2018 from U.S. Appl. No. 14/991,386, 4 pages.

"Cubesat Design Specification", Rev. 13, The CubeSat Program, Cal Poly SLO, pp. 1-42, Feb. 20, 2014.

Aerocube-OCSD A, B (IOCPS A, B), accessed at: http://space.skyrocket.de/doc sdat/aerocube-ocsd.htm, 2 pages, Dec. 5, 2014.

Aherne, M. R. et al., "Aeneas-Colony I Meets Three-Axis Pointing", 25th Annual AIAA/USU Conference on Small Satellites, pp. 1-11, Aug. 8-11, 2011.

Alluru, S. R. et al., "An Optical Payload for Cubesats," 24th Annual AIAA/USU Conference on Small Satellites, pp. 1-13, Aug. 9, 2010.

Alluru, Seshupriya Reddy, "A System Design of an Optical Wireless Communication System for Cubesats," University of Florida Master's Thesis, 78 pages, Dec. 2010.

Andrews, L. C. et al. "Laser Beam Propagation through Random Media", Second Edition (SPIE Press Monograph vol. PM152). SPIE—The International Society for Optical Engineering, ISBN-13: 978-0819459480, 2005.

Bingham, B. et al., "The Road To A Three-Axis-Stabilized CubeSat," 32nd Annual AAS Rocky Mountain Guidance and Control Conference, vol. 133, pp. 607-613 Jan. 30 thru Feb. 4, 2009.

Biswas, A. et al., "The Atmospheric Channel", Deep Space Communications, Chapter 3, pp. 121-213, 2006.

Buchen, E. et al., "2014 Nano/Microsatellite Market Assessment," Spaceworks Enterprises, Inc., (SEI), Atlanta, GA, pp. 1-18, 2014.

Caplan, D. O. et al., "Parallel Direct Modulation Laser Transmitters for High-speed High-sensitivity Laser Communications," CLEO: Applications and Technology, PDPB12, Optical Society of America, 2 pages, 2011.

Caplan, D. O., "A technique for measuring and optimizing modulator extinction ratio," IEEE, Conference on Lasers and Electro-Optics, 2000 (CLEO 2000), pp. 335-336, May 7-12, 2000.

(56) References Cited

OTHER PUBLICATIONS

Caplan, D. O., et al., "Demonstration of 2.5-Gslot/s optically-preamplified M-PPM with 4 photons/bit receiver sensitivity," Optical Fiber Conference (OFC), Paper PDP32, 3 pages, 2005.
Caplan, D.O., et al., "Laser communication transmitter and receiver design," J. Opt. Fiber Commun. Rep. 4, pp. 225-362, 2007.
Caplan, D.O., et al., "Power-efficient Noise-insensitive Optical Modulation for High-sensitivity Laser Communications," CLEO, 2 pages, Jun. 8-13, 2014.
Chandrasekhar, S., et al., "Chirp-Managed Laser and MLSE-RX Enables Transmission Over 1200 km at 1550 nm in a DWDM Environment in NZDSF at 10 Gb/s Without Any Optical Dispersion Compensation" Photonics Tech. Letters, vol. 18, pp. 1560-1562, Jul. 2006.
Coffee, B. et al., "Propagation of CubeSats in LEO using NORAD Two Line Element Sets: Accuracy and Update Frequency", AIAA Guidance, Navigation, and Control Conference, pp. 1-15, Aug. 19-22, 2013.
Contestabile, G. et al., "40 Gb/s WDM NRZ-DPSK All-Optical Clock Recovery and Data Demodulation based on a Periodic Bragg Filter," Optical Fiber Communication/National Fiber Optic Engineers Conference, 3 pages, Feb. 24-28, 2008.
Crassidis, J. L. et al., "A Survey of Nonlinear Attitude Estimation Methods", pp. 1-48, 2007.
Darrell, L., "The Internet—Brought to You by Drones and Balloons," Jun. 27, 2014, 2 pages, downloaded from http://www.bidnessetc.com/business/the-internet-brought-to-you-by-drones-and-balloons/ on Jan. 13, 2016.
Dillow, Clay, "Record-Breaking New Fiber Optic Cables Transmit 100 Terabits per Second," Popular Science, pp. 1-3, Apr. 29, 2011.
Edwards, B. L., et al., "Overview of the Laser Communications Relay Demonstration Project," Space Ops Conference, pp. 1-11, Jun. 11-15, 2012.
Epple, Bernhard, et al., "Discussion on Design Aspects for Free-Space Optical Communication Terminals," IEEE Communications Magazine, vol. 45, Issue 10, pp. 62-69. Oct. 8, 2007.
Excelitas Technologies GmbH & Co. KG, "Thermopile Detector—TPD 1T 0214 G9/3850,"Sensor Solutions—Product Specification, Revision—Jan. 24, 2013, 4 pages.
Fields, R. et al., "5.625 Gbps Bidirectional Laser Communications Measurements Between the NFIRE Satellite and an Optical Ground Station", International Conference on Space Optical Systems and Applications, May 11-13, 2011, pp. 44-53.
Gangestad, J. W. et al., "Operations, orbit determination, and Formation Control of the Aerocube-4 Cubesats," (SSC13-X-4), Proc. Of 27th AIAA/USU Conference on Small Satellites, pp. 1-8, Aug. 10, 2013.
Hanson, J., et al. "The EDSN Intersatellite Communications Architecture," Proc. Of 28th AIAA/USU Conference on Small Satellites, p. 111, Aug. 4-7, 2014.
Hashmall, J.A., et al., "An Algorithm For Converting Static Earth Sensor Measurements Into Earth Observation Vectors", NASA Technical Memorandum from the proceedings of the Flight Mechanics Symposium, pp. 1-13, Oct. 2003.
Hemmati, H., "Laser-Communications with Lunar CubeSat," Jet Propulsion Laboratory, California Institute of Technology, pp. 1-11, Apr. 11, 2013.
Hemmati, H., et al., Near-Earth Laser Communications (book), Print ISBN: 978-0-8247-5381-8, CRC Press Mar. 3, 2009.
Henniger, H. And Wilfert, O., "An Introduction to Free-space Optical Communications", Radioengineering Journal, vol. 19, No. 2, Jun. 2010, pp. 203-212.
Henniger, H. et al., "Free-space optical transmission improves land-mobile communications," SPIE Newsroom, Jan. 9, 2007, pp. 1-3.
Horwath, J., et al., "Broadband Backhaul Communication for Stratospheric Platforms: The Stratospheric Optical Payload Experiment (STROPEX)," Proc. SPIE 6304, Free-Space Laser Communications VI, 63041N, Sep. 1, 2006, 12 pages.
http://intelsat.com, downloaded Jan. 13, 2016, 1 pages.
http://www.digitalglobe.com, downloaded Jan. 13, 2016, 3 pages.
https://www.planet.com, downloaded Jan. 7, 2013, 6 pages.
https://www.viasat.com, downloaded Jan. 13, 2016, 3 pages.
International Preliminary Report on Patentability from International Application No. PCT/US2015/019890 dated Oct. 25, 2016.
International Search Report and Written Opinion from International Application No. PCT/US16/12641, dated May 11, 2016.
International Search Report and Written Opinion from International Application No. PCT/US2016/019732, dated Nov. 29, 2016.
International Search Report and Written Opinion dated Feb. 24, 2016 from International Application No. PCT/US2015/043638.
International Search Report and Written Opinion dated Jul. 26, 2016 from International Application No. PCT/US16/12644.
International Search Report and Written Opinion dated Jul. 26, 2016 from International Application No. PCT/US16/12643.
International Search Report and Written Opinion dated Jun. 29, 2015 from International Application No. PCT/US2015/019890.
Janson, S. et al., "Attitude Control on the Pico Satellite Colar Cell Testbed-2", Presentation of Proceedings of the 26th Annual AIAA/USU Conference on Small Satellites, pp. 1-13, Aug. 13, 2012.
Janson, S. et al., "The NASA Optical Communication and Sensor Demonstration Program: An Update." (SSC14-VI-1), Proc. Of 28th Annual AIAA/USU Conference on Small Satellites, MIT: Nanosatellite Optical Downlink Experiment (NODE), The Aerospace Corporation 2014, pp. 1-10, Aug. 5, 2014.
Janson, S. et al., "The NASA Optical Communication and Sensor Demonstration Program" (SSC13-II-1), The Aerospace Corporation, pp. 1-19, Aug. 12, 2013.
Kingsbury, R.W. et al., "Design of a Free-Space Optical Communication Module for Small Satellites," (SSC14-IX-6), 28th AIAA/USU Small Satellite Conference, pp. 1-10, Apr. 12, 2014.
Kingsbury, R.W., et al., "Fast-Steering Solutions for CubeSat-Scale Optical Communication," Proc. of International Conference on Space Optics, pp. 1-6, Oct. 7-10, 2014.
Kingsbury, R.W., et al., "Two-Stage Control for CubeSat Optical Communications," CalPoly CubeSat Developers Workshop, pp. 1-29, Apr. 24, 2014.
Klofas, B. et al., "A Survey of CubeSat Communication Systems: 2009-2012", Proceedings of 2013 CalPoly CubeSat Developers' Workshop, pp. 1-41, Apr. 2013.
Kneller, E.W. et al., "Cadet: A High Data Rate Software Defined Radio for SmallSat Applications", (SSC12-X-4), 26th Annual AIAA/USU Conference on Small Satellites, pp. 1-10, 2012.
Kramer, "EDRS (European Data Relay Satellite) Constellation," EO Sharing Earth Observation Resources, Oct. 21, 2013, pp. 1-9.
Kubo-oka, Toshihiro, et al., "Optical Communication Experiment Using Very Small TrAnsponder Component on a Small RISESAT", Proc. International Conference on Space Optical Systems and Applications (ICOS), Oct. 9-12, 2012, 6 pages.
LADEE, NASA's LADEE Mission, taken from http://www.nasa.gov/mission_pages/ladee/main/index.html, 2 pages, Dec. 5, 2014.
Lambert, S. et al, "Laser Communications in Space", Optical Engineering, vol. 35, No. 5, pp. 1513-1515, May 1996.
Lee, C-H et al., "Transmission of Directly Modulated 2.5-Gb/s Signals Over 250-km of Nondispersion-Shifted Fiber by Using a Spectral Filtering Method," IEEE Photonics Technology Letters, IEEE vol. 8, No. 12, pp. 1725-1727, Dec. 1996.
Li, J. et al., "Design of Attitude Control Systems for CubeSat-Class Nanosatellite", Research Article Journal of Control Science and Engineering, vol. 13, pp. 1-9, Apr. 24, 2013.
Liebe C.C. et al., "Accuracy Performance of Star Trackers—A Tutorial" IEEE Transactions on Aerospace and Electronic Systems, vol. 38 No. 2, pp. 587-599, Apr. 2002.
Mahgerefteh, D. et al., "Penalty-free propagation over 600 km of nondispersion-shifted fiber at 2.5 Gb/s using a directly laser modulated transmitter", CLEO, 1 pages, 1999.
Maryland Aerospace Inc., MAI-400 Reference Manual, 2 pages, Apr. 29, 2014.
Merrelli, Aronne, "The Atmospheric Information Content Of Earth's Far Infrared Spectrum", A Dissertation approved for the degree of Doctor of Philosophy (Atmospheric and Oceanic Sciences), 135 pages, Nov. 26, 2012.

(56) References Cited

OTHER PUBLICATIONS

Miniscalco, W.J., et al., "Optical Space-Time Division Multiple Access," Journal of Lightwave Technology, vol. 30, No. 11, pp. 1771-1785, Jun. 1, 2012.
Moores, John D. et al., "Architecture Overview and Data Summary of a 5.4 km Free-Space Laser Communications Experiment", Proc. of SPIE, vol. 7464, Aug. 2009, 9 pages.
National Aeronautics and Space Administration, "Laser Communications Relay Demonstration, The Next Step in Optical Communications", 2 pages, Jun. 26, 2013.
Nguyen, T. et al., "Development of a pointing, acquisition, and tracking system for a CubeSat optical communication module," in SPIE OPTO, vol. 9354, pp. 93540O-1 to 93540O-9, Mar. 26, 2015.
Notice of Allowance dated Dec. 30, 2016 from U.S. Appl. No. 14/644,425.
Oaida, B.V. et al. "Optical link design and validation testing of the Optical Payload for Lasercomm Science (OPALS) system", Free-Space Laser Communication Technologies XXVI, Proc. of SPIE, vol. 8971, pp. 89710U-1 to 89710U-15, Mar. 6, 2014.
Oaida, B.V. et al., OPALS: An Optical Communications Technology Demonstration from the International Space Station, Aerospace Conference, IEEE, pp. 1-20, 2013, Mar. 2-9, 2013.
Office Action dated Apr. 22, 2016 from U.S. Appl. No. 14/644,425.
Office Action dated Sep. 8, 2016 from U.S. Appl. No. 14/817,985.
Perry, T.S., "Start-up Profile: Skybox Imaging", May 1, 2013, 9 pages, downloaded from http://spectrum.ieee.org/at-work/innovation/startup-profile-skybox-imaging on Jan. 13, 2016.
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 1 of 2).
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 2 of 2).
Pong, C. et al., "A Dual-Spinning, Three-Axis-Stabilized CubeSat for Earth Observations," AIAA Guidance, Navigation, and Control (GNC) Conference, pp. 1-24, 2013.
Pong, C. et al., High-Precision Pointing and Attitude Determination and Control on ExoplanetSat, AIAA Guidance, Navigation, and Control Conference, pp. 1-24, Aug. 13-16, 2012.
Pong, C. et al., "High-Precision Pointing and Attitude Estimation and Control Algorithms for Hardware-Constrained Spacecraft", PhD Thesis, Massachusetts Institute of Technology, pp. 1-254, May 22, 2014.
Robinson, B.S. et al., "The Lunar Laser Communications Demonstration", International Conference on Space Optical Systems and Applications (ICSOS), pp. 54-57, IEEE, May 11-13, 2011.
Santanu, D. et al., "Requirements and Challenges for Tactical Free-Space Lasercomm", Military Communications Conference, IEEE MILCOM, Nov. 16-19, 2008, pp. 1-5.
Sarda, K. et al., "Canadian Advanced Nanospace Experiment 2 Orbit Operations: Two Years Of Pushing The Nanosatellite Performance Envelope", ESA Small Satellites, Services and Systems Symposium, 20 pages, 2010.
Schwarzenberg-Czerny, A, "The BRITE Nano-Satellite Constellation Mission," Proc. of 38th COSPAR Scientific Assembly, pp. 1-17, Jul. 15-18, 2010.
Sebacher, K.S. et al., "Laser Crosslink Configurations for RF Satellite Communications Systems", Military Communications Conference, MILCOM 1985, IEEE, vol. 1, pp. 98-103.
Shirasaki, M. et al., "Fibre Transmission Properties of Optical Pulses Produced Through Direct Phase Modulation of DFB Laser Diode," Electron. Letters, vol. 24, pp. 486-488, Apr. 14, 1988.

Sniegowski, J.J. et al., "Development, test and evaluation of MEMS micro-mirrors for free-space optical communications," Free-Space Laser Communications IV, Proceedings of SPIE, vol. 5550, pp. 299-312, Dec. 3, 2014.
Staehle, R.L. et al., "Interplanetary CubeSats: Opening the Solar System to a Broad Community at Lower Cost", Journal of Small Satellites, pp. 1-10, Dec. 8, 2012.
Stotts, L. B. et al., "Hybrid Optical RF Airborne Communications," Proc. of IEEE, vol. 97, No. 6, pp. 1109-1127, Jun. 2009.
Stotts, L.B, et al, "Optical Communications in Atmospheric Turbulence," SPIE 2009, vol. 7464, Aug. 21, 2009, 17 pages.
Swartwout, Michael, "The First One Hundred CubeSats: A Statistical Look," Journal of Small Satellites, vol. 2, pp. 213-233, 2013.
Tyler, Glen A. et al., "Image-position error associated with a quadrant detector", Journal of Optical Society of America, vol. 72, No. 6, Jun. 1982, pp. 804-808.
U.S. Final Office Action dated Aug. 1, 2017 from U.S. Appl. No. 14/991,386, 28 pages.
U.S. Final Office Action dated Sep. 19, 2017 for U.S. Appl. No. 14/991,394, 42 pages.
U.S. Non-Final Office Action dated Aug. 11, 2017 for U.S. Appl. No. 14/991,377, 34 pages.
U.S. Non-Final Office Action dated Sep. 19, 2017 from U.S. Appl. No. 15/054,546, 22 pages.
U.S. Notice of Allowance dated Jul. 5, 2017 from U.S. Appl. No. 14/817,985, 12 pages.
U.S. Notice of Allowance dated Apr. 10, 2017, in regards to U.S. Appl. No. 14/644,425, 10 pages.
U.S. Notice of Allowance dated Apr. 12, 2017, in regards to U.S. Appl. No. 14/817,985, 11 pages.
U.S. Office Action dated Apr. 7, 2017, in regards to U.S. Appl. No. 14/991,394, 63 pages.
U.S. Office Action dated Feb. 22, 2017, in regards to U.S. Appl. No. 14/991,377, 58 pages.
U.S. Office Action dated Feb. 8, 2017, in regards to U.S. Appl. No. 14/991,386, 57 pages.
Unhelkar, V.V. et al., "Satellite Attitude Estimation using Sun Sensors, Horizon Sensors and Gyros", A dissertation approved for the degree of Master of Technology and Bachelors of Technology in Aerospace Engineering, 133 pages, Jun. 25, 2012.
Unhelkar, V.V. et al., "Spacecraft Attitude Determination with Sun Sensors, Horizon Sensors and Gyros: Comparison of Steady-State Kalman Filter and Extended Kalman Filter", Proceedings of the Itzhack Y. Bar-Itzhack Memorial Symposium on Estimation, Navigation, and Spacecraft Control, 22 pages, Oct. 2012.
Vodhanel, R. S. et al., "Performance of Directly Modulated DFB Lasers in 10-Gb/s ASK, FSK, and DPSK Lightwave Systems," J. Lightwave Technology, vol. 8, pp. 1379-1386, Sep. 1990.
Vodhanel, R.S. et al., "Ten-to-Twenty Gigabit-per-Second Modulation Performance of 1.5-mm Distributed Feedback Lasers for Frequency-Shift Keying Systems," J. Lightwave Technology, vol. 7, pp. 1454-1460, Oct. 1989.
Walther, F.G, et al, "Air-to-Ground Lasercom System Demonstration Design Overview and Results Summary," Proc. of SPIE, Aug. 24, 2010, vol. 7814, 9 pages.
www.laserlightcomms.com, downloaded Jan. 13, 2016, 2 pages.
U.S. Notice of Allowance dated Jan. 26, 2018 from U.S. Appl. No. 14/991,377, 22 pages.
U.S. Notice of Allowance dated Jan. 24, 2016 from U.S. Appl. No. 14/991,386, 21 pages.
U.S. Notice of Allowance dated Feb. 16, 2018 from U.S. Appl. No. 15/045,546, 5 pages.

* cited by examiner

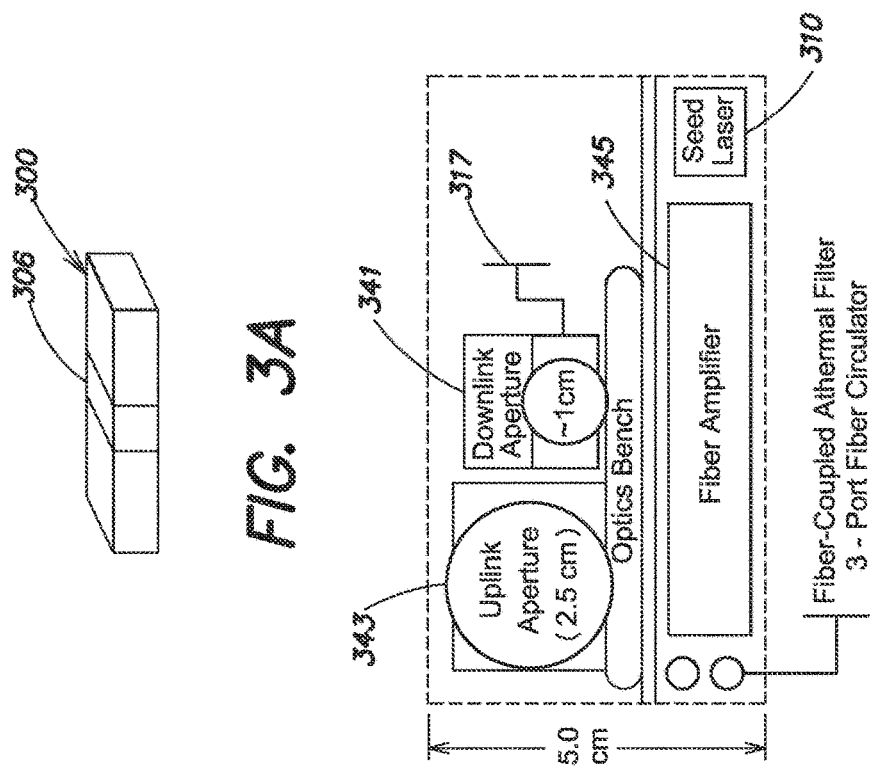
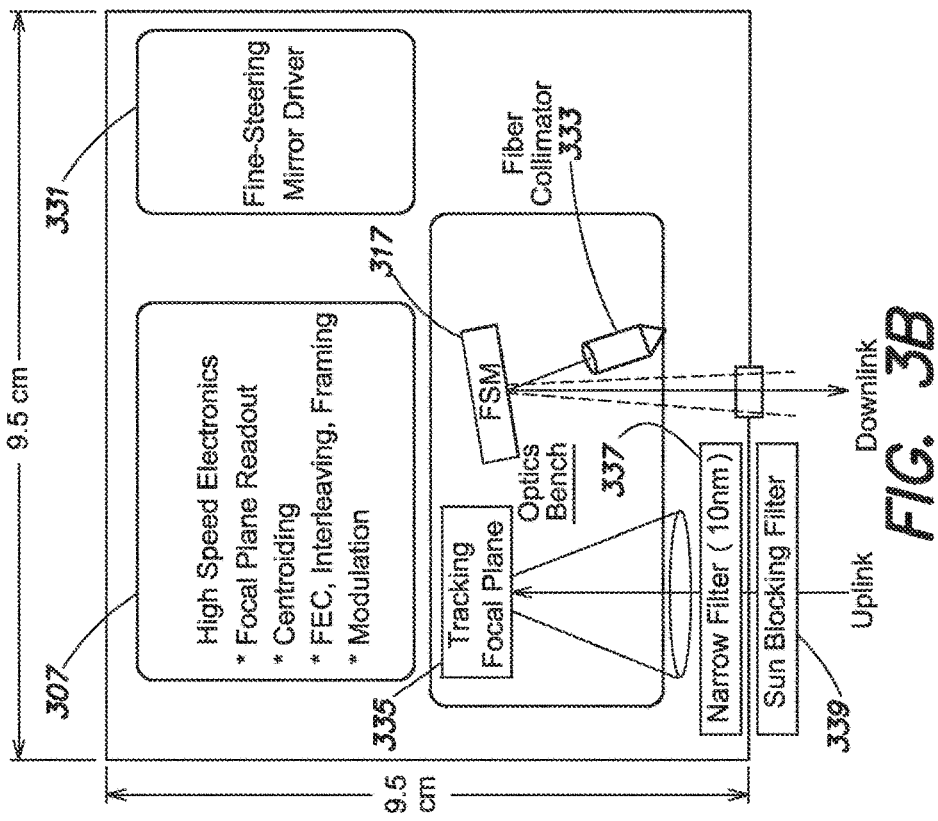

FREE-SPACE OPTICAL COMMUNICATION MODULE FOR SMALL SATELLITES

CROSS-REFERENCE TO RELATED PATENT APPLICATION

This application is a continuation application of U.S. application Ser. No. 14/817,985, now U.S. Pat. No. 9,813,151, filed Aug. 4, 2015, and entitled "Design of a Free-Space Optical Communication Module for Small Satellites," which claims priority, under 35 U.S.C. § 119(e), from U.S. Application No. 62/033,321 filed Aug. 5, 2014, and entitled "Design of a Free-Space Optical Communication Module for Small Satellites," and also claims priority, under 35 U.S.C. § 119(e), from U.S. Application No. 62/112,854 filed Feb. 6, 2015, and entitled "Design of a Free-Space Optical Communication Module for Small Satellites," which applications are hereby incorporated herein by reference in their entireties.

GOVERNMENT SUPPORT

This invention was made with Government support under Contract Nos. NNN12AAO1C and NNX13AM69H awarded by the National Aeronautics and Space Administration. The Government has certain rights in the invention.

BACKGROUND

Miniaturized satellites such as CubeSats continue to improve their capabilities to enable missions that can produce significant amounts of data. For most CubeSat missions, data must be downlinked during short low-earth orbit ground station passes, a task currently performed using traditional radio frequency ("RF") systems.

SUMMARY

Embodiments of the present invention include a CubeSat module for a CubeSat. In some embodiments, the CubeSat module (also referred to herein as a "payload") includes an optical transmitter to transmit data to a remote terminal, a receiver to acquire an optical beacon from a remote terminal, and a fine-pointing module operably and directly coupleable to a coarse-pointing module of the CubeSat. The fine-pointing module is configured to point the optical transmitter toward the remote terminal with an accuracy range that overlaps with an accuracy range of the coarse-pointing module of the CubeSat so as to establish a communications link between the CubeSat and the remote terminal over a low-Earth-orbit (LEO) distance.

In some embodiments, a CubeSat comprises a beacon receiver, a coarse-pointing module, an optical transmitter, and a fine-pointing module operably coupled to the coarse-pointing module. According to one such embodiment, a method of free-space optical communication for the CubeSat includes pointing the beacon receiver with the coarse-pointing module toward a terrestrial terminal with an attitude accuracy of within about 3°, and acquiring a beacon from the terrestrial terminal. In response to acquiring the beacon, the coarse-pointing module points the beacon receiver toward the terrestrial terminal with an attitude accuracy of within about 1°. The fine-pointing module points a beam emitted by the optical transmitter toward the terrestrial terminal with a pointing accuracy of about 0.03°, thereby establishing an optical downlink between the CubeSat and the terrestrial terminal.

In some embodiments, a CubeSat includes a beacon receiver to acquire an optical beacon emanating from a terrestrial terminal. The CubeSat also includes a coarse-pointing module to align the beacon receiver with the optical beacon over a first accuracy range prior to acquisition of the optical beacon by the beacon receiver and to align the beacon receiver with the optical beacon over a second accuracy range in response to acquisition of the optical beacon, the second accuracy range being smaller than the first accuracy range. The CubeSat also includes an optical transmitter to transmit data to the terrestrial terminal, and a fine-pointing module that is operably coupled to the coarse-pointing module, and configured to point a beam emitted by the optical transmitter toward the terrestrial terminal with an accuracy range that overlaps with the second accuracy range of the coarse-pointing module.

In some embodiments, a CubeSat includes a coarse-pointing module to point the CubeSat toward a remote terminal with a first accuracy range. According to one such embodiment, a CubeSat module for a CubeSat includes an optical transmitter to transmit data to the remote terminal, a receiver to acquire an optical beacon, and a fine-pointing module. The fine-pointing module is operably coupled to the coarse-pointing module, and is configured to point an output of the optical transmitter toward the remote terminal with a second accuracy range at least partially overlapping the first accuracy range. The fine-pointing module includes a micro-electromechanical systems (MEMS) micromirror, disposed in an optical path of the output of the optical transmitter, to align the output of the optical transmitter with respect to the optical beacon. The fine-pointing module also includes an interface to transmit fine pointing information to and to receive coarse pointing information from the coarse-pointing module of the CubeSat.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A-3C are renderings of a physical layout, including perspective, top and side views, respectively, of a communications payload, occupying a 0.5 U volume of a CubeSat, according to some embodiments.

FIG. 26A is a plot of fade probability for various transmit laser power levels; and FIG. 26B shows the percentage pointing accuracy during centroiding.

DETAILED DESCRIPTION

Figure 1:
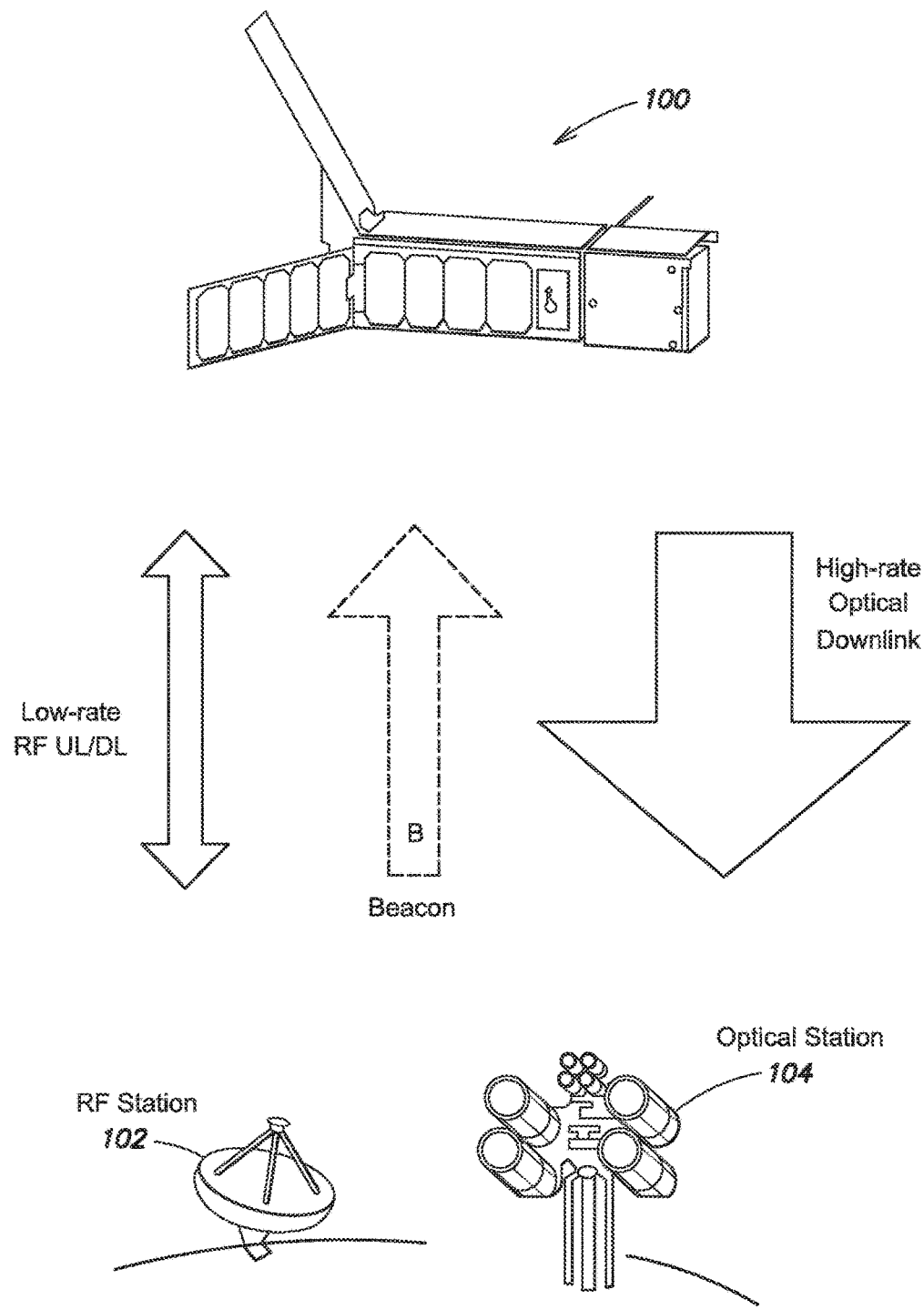
FIG. 1 is a rendering of a satellite communication system according to some embodiments.

Communication bottlenecks, particularly in the downlink direction, are a common problem for many CubeSat developers. Radio frequency solutions have poor link power efficiency (joules per bit), may be limited by antenna gain, and often carry complex regulatory burdens. Most CubeSats are in LEO and have fairly short ground station access times (<10 min/pass). CubeSats often use low-rate ultra-high frequency (UHF) links, with data rates for amateur bands of ~1200 bps and for industrial, scientific and medical ("ISM") radio bands of <115 kbps. High-rate radio frequency (RF) commercial off-the-shelf (COTS) products are available for UHF and S-band communications, but very large ground apertures are typically required. Furthermore, the pointing accuracy required for a high bandwidth downlink exceeds the capabilities of traditional CubeSats. The current state-of-the-art in demonstrated CubeSat absolute pointing accuracy ranges from 1-5° RMS. However, to achieve a 10-50 Mbps link within the power constraints of a typical CubeSat, a finer pointing accuracy is required.

Systems of the present disclosure comprise an optical transmitter to transmit data to a remote terminal, a receiver to acquire an optical beacon from a remote terminal, and a fine-pointing module operably and directly coupleable to a coarse-pointing module of the CubeSat. A two-stage control approach to pointing, acquisition and tracking ("PAT") is used, in which coarse body pointing of the CubeSat (e.g., the host attitude determination and control system, "ADCS") is augmented with a fast-steering mirror (FSM) for fine control (a "coarse" stage and a "fine" stage, respectively). In some embodiments, a free-space optical ("FSO") communications system is "asymmetric," in that it includes both a high-rate optical downlink ("DL") and a low-rate RF link ("UL"), as well as an optical beacon for acquisition and tracking. CubeSat FSO communication payloads described herein are designed to be compatible with a typical 3-axis stabilized CubeSat, and the system architecture of the disclosure takes into account the fact that many operators of FSO communications systems need a high-rate downlink (e.g., for remote sensing).

FSO communications systems of the disclosure provide functionality for day and/or night operation, with better access and throughput than has previously been possible. In some embodiments, sun sensors are used for attitude determination. In some embodiments, the PAT system does not use a 2 axis electromechanical gimbal. PAT systems of the disclosure can improve coarse pointing by about 4 orders of magnitude as compared with prior methods. Fast beam steering can be performed using microelectro-mechanical systems ("MEMS," e.g., fast-steering mirrors, micro-mirror arrays, etc.), acousto-optical methods, optical phased arrays, and/or the like.

In some embodiments, an incoherent (direct) satellite FSO communications system includes a coarse stage pointing subsystem, a fine stage pointing subsystem, and a beacon acquisition subsystem. The coarse stage pointing subsystem has an accuracy range of +/− about 5 degrees when "unlocked" with respect to a beacon, and +/− about 1.25 degrees or +/− about 1 degree when locked to the beacon. The fine stage pointing subsystem has an accuracy range of ~+/−1 degree. The accuracy range of the coarse stage can overlap with the accuracy range of the fine stage. In some embodiments, the coarse stage subsystem and the fine stage subsystem have accuracy ranges that overlap the improved uncertainty range (e.g., after acquisition of a beacon and the corresponding improvement in satellite position knowledge). Collectively, the two-stage pointing control mechanism can achieve a pointing performance of ±0.09 mrad 3-σ without bias, sufficient for a 2.1 mrad downlink laser.

In some embodiments, terminal designs of the disclosure are budgeted for a volume of 10 cm×10 cm×5 cm (i.e., smaller than a standard CubeSat, which is 10 cm×10 cm×10 cm, also referred to as "1 U"), a weight of <1 kg, and a power of <10 W, while delivering a user data rate of 10 Mbps to 50 Mbps—a full order of magnitude improvement over prior RF solutions. In some embodiments, commercial off-the-shelf (COTS) components are used. CubeSats typically have short missions (<1 year) in low Earth orbit (LEO) where radiation and thermal stresses are relatively benign.

CubeSat FSO Communications System

FIG. 1 is a rendering of a satellite communication system according to some embodiments. As shown in FIG. 1, a CubeSat 100 acquires an optical beacon B for acquisition and tracking, a low-rate radio frequency (RF) link (uplink and downlink) is established between an RF station 102 and CubeSat 100, and a high-rate optical downlink is established from the CubeSat 100 to an optical station 104. The RF station 102 and the optical station 104 are positioned at one or more ground stations. In some embodiments, potential channel impairments such as cloud cover can be mitigated through strategic placement of ground stations (e.g., in areas of favorable weather) and/or through the use of onboard storage memory. The CubeSat contains a payload comprising a two-stage pointing system, having a coarse pointing module (providing functionality for a coarse pointing "stage," e.g. comprising a host ADCS), and a fine pointing module (providing functionality for a fine pointing "stage," e.g. using an integrated fine-steering mirror ("FSM")).

During a communications pass, the CubeSat 100 uses an on-board propagated orbit to point towards the ground station and wait for an uplink beacon. The field-of-view of a beacon camera on the CubeSat 100 is selected to cover the entirety of the uncertainty region so that no additional maneuvers are needed to search for the ground station. Once the CubeSat beacon camera detects the beacon signal from the ground station, it uses this information to improve the pointing accuracy to within the range of the fine stage. Finally, the FSM steers the transmit beam to the accuracy desired for downlink. The FSM is in a bistatic configuration, so there is no feedback on the position of the FSM. An on-orbit calibration procedure can be performed to ensure transmitter/receiver alignment. Such calibration can utilize the low-rate RF link to communicate the received power measurements on the ground back up to the satellite. Using this feedback, the satellite can adjust its pointing until peak power is received on the ground.

Figure 2:
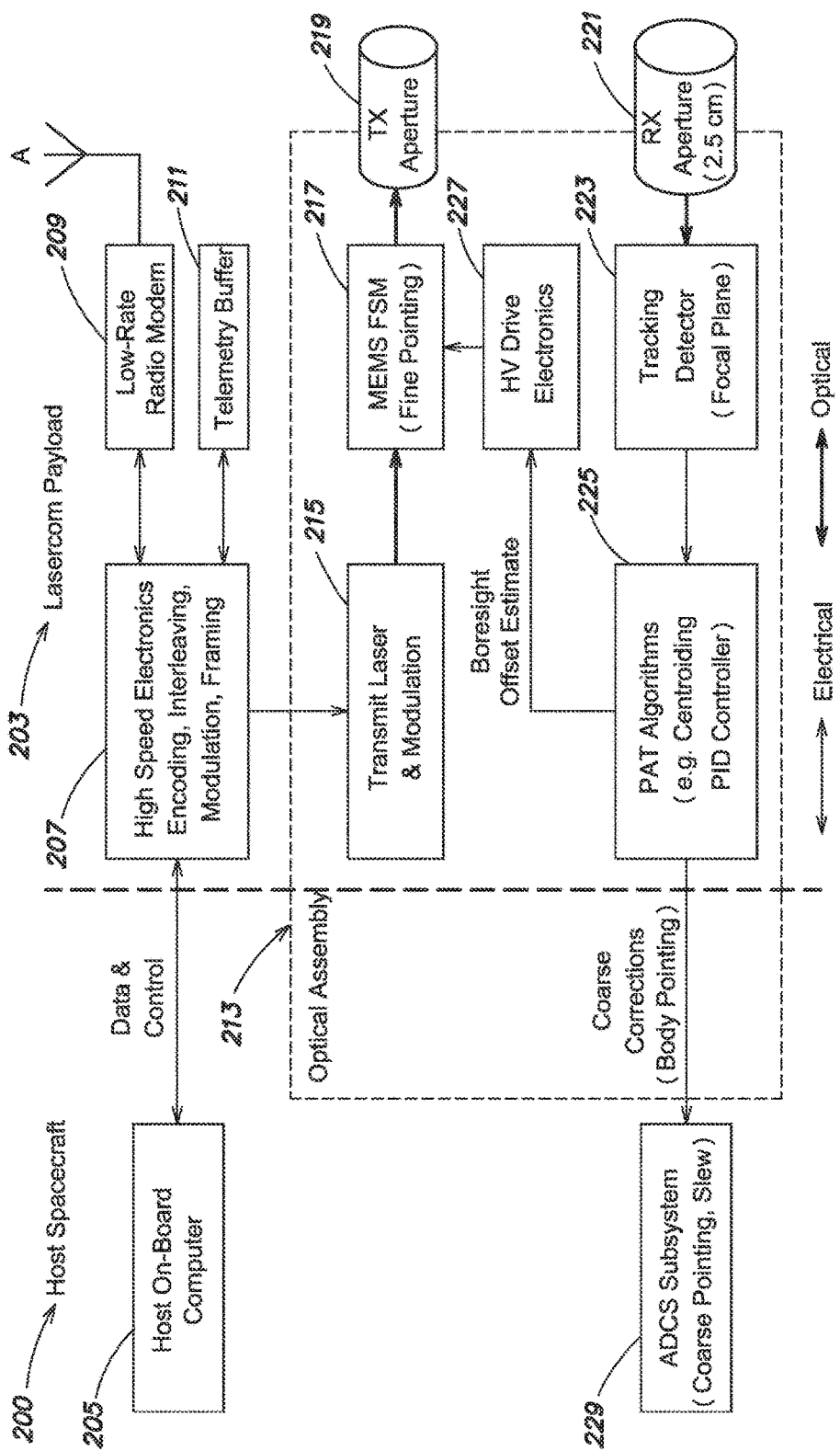
FIG. 2 is a block diagram of a satellite communication system according to some embodiments.

FIG. 2 is a block diagram of a satellite communication system according to some embodiments, showing interactions between a host spacecraft 200 and a lasercom payload 203. The lasercom payload 203 includes high-speed electronics 207 (to perform, for example, data encoding, interleaving, modulation, and/or framing) that swap data and control commands with a host on-board computer 205 of the host spacecraft 200 (e.g., a CubeSat), a low-rate radio modem 209 (configured for communication via antenna "A") and a telemetry buffer 211 each electrically coupled to the high-speed electronics 207, as well as to an optical assembly 213. The optical assembly 213 of the lasercom payload 203 includes a transmit laser and modulator (collectively 215), the transmit laser being optically coupled to at least one microelectromechanical system ("MEMS") fine-steering mirror ("FSM") 217 for fine pointing of the host spacecraft 200. The MEMS FSM 217 is, in turn, optically coupled to a transmit ("TX") aperture 219, through which the transmit beam passes during operation. The transmit laser and modulator 215 are electrically coupled to, and driven by, the high-speed electronics 207 (e.g., for encoding, interleaving, modulation, framing, etc.). A receiver ("RX") aperture 221 (e.g., having a diameter of about 2.5 cm), configured to receive an incoming optical transmission (e.g., a beacon or beam), is optically coupled to a tracking detector 223 (e.g., comprising a focal plane array) whose output is fed into a positioning, acquisition and tracking (PAT) module 225 that applies one or more PAT algorithms to the detector data (e.g., for centroiding and/or feedback control by a proportional-integral-derivative ("PID") controller). The PAT module 225 can provide a boresight offset estimate to high voltage ("HV") drive electronics 227 that drive the MEMS FSM. The PAT module 225 can also electrically transmit coarse corrections (e.g., for body pointing) to an ADCS subsystem 229 of the host spacecraft for coarse pointing and/or slew. In some embodiments. The optical assembly 213 includes at least one actuator, operably coupled to the at least one MEMS FSM (or "micromirror"), to actuate at least one micromirror about two axes.

FIGS. 3A-3C are renderings of a physical layout, including perspective, top and side views, respectively, of a spacecraft laser communications payload 306, occupying a 5 cm×10 cm×10 cm ("0.5 U") volume of a 3 U CubeSat 300 and having coarse and fine stage pointing capability, according to some embodiments. The lasercom payload 306 includes high-speed electronics 307 to control focal-plane readout (e.g., of tracking focal plane 335), centroiding of a received beacon, forward error correction ("FEC"), interleaving (e.g., to mitigate atmospheric fading so as to reduce an error rate associated with transmitting data via the communications link), framing, and modulation. The lasercom payload 306 comprises two main subsystems: a downlink transmitter and an uplink beacon receiver. The lasercom payload 306 uses a bi-static design, with separate downlink and uplink beacon paths through downlink aperture 341 and uplink aperture 343, respectively. A sun blocking filter 339 and a narrow filter 337 are disposed in the uplink path.

The transmitter design follows a Master Oscillator Power Amplifier (MOPA) architecture, where an Erbium Doped Fiber Amplifier ("EDFA") 345 is used in conjunction with a 1550 nm seed laser 310 to provide a high peak-to-average power optical waveform. EDFAs are widely available due to their use in the telecommunications industry. The industry standard "MSA" form-factor for an EDFA is (9 cm×6 cm×1.5 cm), which can fit within a 10 cm×10 cm chassis cross-section. EDFAs are offered in a variety of power output levels and gains (e.g., 200 mW optical). In some embodiments, mechanical modifications are made to the EDFA so that fiber egress points are located along a "long edge" of the CubeSat chassis to ease fiber routing within the CubeSat chassis. The EDFA can comprise a modified COTS fiber amplifier (e.g., from NuPhoton Technologies, Inc.) with a form factor of about 9 cm×7 cm×1.5 cm, and can be configured for electrical input of 5V at 5.7 W and have an optical output of 200 mW avg., a gain of 40 dB and a "wall plug" efficiency of ~3.5%.

A fiber collimator 333 forms the transmit beam, which is subsequently directed by a fine-stage fast steering mirror (FSM) 317 (e.g., driven by the fine-steering mirror driver 331) in a "gimballed-flat" topology. The FSM 317 can be a SWaP-compliant MEMS tip/tilt mirror having a steering range (e.g., of +/− about 1°) that is sufficient for coarse stage hand-off. This hand-off can be autonomous and can be based on quality metrics comprising one or more of the following: beacon signal-to-noise ratio ("SNR"), beacon transmitter power, receiver power, and attitude stability of the coarse stage. The transition could also be driven by a ground command, either manually or in response to detection of the downlink signal. Once the readouts from the beacon receiver meet some confidence criteria (e.g., a reliable bright signal across multiple frames, or a signature that matches a known modulation scheme), the fine stage begins steering. The beacon receiver camera comprises a CMOS focal plane array with high sensitivity in the near-infrared (NIR) range to detect an 850 nm beacon transmitted from the ground station. The uplink beam image can be processed using centroiding algorithms for fine attitude determination.

Example System Design Parameters

Tables 1-12 (below) provide design parameters of an FSO communications system, according to some embodiments. The ground segment can include a transportable telescope and mount (e.g., 30 cm) and can use COTS detector technology (e.g., avalanche photodiode detectors (APD), PIN photodiode, etc.). In some embodiments, a downlink radiometry involves a 1550 nm (at 1 W (optical)) transmitter, a ground segment downlink receiver with a ~30 cm aperture and a sensitivity of about 1000 photons/bit, and channel/pointing losses of ~6 dB. In some embodiments, the half-power beamwidth needs to be 0.12 deg to achieve 10 Mbps and the FSO pointing capability is about $\frac{1}{10}^{th}$ the beam width (0.012 deg or 0.21 mrad or 0.72 arcmin).

TABLE 1

Example Top-Level Design Parameters

| Link Parameters | | |
|---|---|---|
| Link rate | 10 Mbps, 50 Mbps | Uncoded channel rate |
| Bit error rate | $10^{-4}$, (e.g., using code) | Conservative baseline for FEC |
| Range | 1000 km (400 km LEO orbit) | 20° elevation above horizon @ 400 km LEO |
| Space Segment Parameters | | |
| Size, Weight | 10 cm × 10 cm × 5 cm, 1 kg | "0.5 U" CubeSat mid-stack payload |
| Power | 10 W (transmit), 1 W (idle) | Excludes host ADCS |
| Coarse Pointing | 5° (3-sigma), 1°/sec slew | Host CubeSat ADCS |
| Fine Pointing | 0.1 mrad (3-sigma) | FSO Payload fast-steering mirror |
| Downlink Beam | 1550 nm, 2.1 mrad (0.12°) divergence | FWHM divergence |
| Beacon Receiver | Uncooled focal-plane array | 850 nm (TBR) |
| Ground Segment Parameters | | |
| Apertures | RX: 30 cm, beacon: TBD | Mount capable of tracking LEO object |
| Acq. Detector | InGaAs Camera | Informs tip/tilt FSM |
| Comm. Detector | COTS APD/TIA Module | Cooled module |
| Pointing | Coarse: Reaction wheel(s), magnetorquer(s), and/or two-line element(s) ("TLE"), Fine: tip/tilt FSM (e.g., 2-axis) | Detector size demands fine stage |

TABLE 2

Example Top-Level Design Parameters

| Link Parameters | | |
|---|---|---|
| Data rate | 10 Mbps, 50 Mbps (stretch) | User data rate |
| Bit error rate | $10^{-4}$ without coding | Conservative baseline for FEC (7% RS) |
| Path length | 1000 km | ~20 deg elev @ 400 km LEO |
| Space Segment Parameters | | |
| Size, Weight | 10 × 10 × 5 cm, 1000 g | "0.5 U" CubeSat mid-stack payload |
| Power | 10 W (transmit), 1 W (idle) | Excludes host ADCS |
| Coarse Pointing | +/−3° (3-sigma), 1°/sec slew | Host CubeSat ADCS |
| Fine Pointing | +/−0.03° (+/−525 urad) 3-sigma | Lasercom payload fast-steering mirror |
| Downlink Beam | 1550 nm 0.12° (2.1 mrad) FWHM | Radiometric constraint for 10 Mbps |
| Beacon Receiver | Uncolled Si focal-plane array | 850 nm |
| Ground Segment Parameters | | |
| Apertures | RX: 30 cm, beacon: TBD | Mount capable of tracking LEO object |
| Acq. Detector | InGaAs Camera | Informs tip/tilt FSM |
| Comm. Detector | COTS APD/TIA Module | Cooled module, link operating at 300 K |
| Pointing | Coarse: TLE, Fine: tip/tilt FSM | Detector size demands fine stage |

TABLE 3

Example Design Parameters

| | Value | |
|---|---|---|
| Optics | | |
| Focal Length | 25 | mm |
| Centroid Error | 0.018 | mrad RMS |
| Reaction Wheel (MAI-400) | | |
| Max. Torque | 635 | mNm |
| Resolution | 0.005 | mNm |
| Gyroscope (ADIS-16534) | | |
| Angular Random Walk | 2 | deg/√hr |
| Output Noise | 0.75 | deg/s RMS |
| Resolution | 0.0125 | deg/s |
| Spacecraft | | |
| True Moment of Inertia | 0.05 | kgm^2 |
| Est. Moment of Inertia | 0.0475 | kgm^2 |

TABLE 4

Example Top-Level Design Parameters

| | | Notes |
|---|---|---|
| Optical Link Parameters | | |
| Optical link rate | 10 Mbps (goal) 50 Mbps (stretch) | Uncoded channel rate |
| Bit error rate | $1 \times 10^{-6}$ BER | Without coding |
| Operational range | ≤1000 km | Appropriate for most LEO missions |
| Optical Space Segment Parameters | | |
| Size | 0.5 U | 5 cm × 10 cm × 10 cm |
| Mass | 2 kg | |
| Power | 10 W (TX) 1 W (idle) | Includes FSO payload, excludes host ADCS |
| PAT scheme | closed-loop | Using uplink beacon |
| Coarse pointing | satellite body-pointing goal: 2.0" (TDR) stretch: 0.5° (TBR) | Provided by host ADCS 3σ-, absolute 3σ-, absolute |
| Coarse slew rate | 3.0 deg/s ('fBR) | Provided by host ADCS |
| Fine point/track | single two-axis MEMS | Shared by TX and RX optical paths |

TABLE 4-continued

Example Top-Level Design Parameters

|  |  | Notes |
|---|---|---|
| Fine point range | ±5.0" (TBR) | Greater than coarse pointing accuracy |
| Fine point resolution | TBD | Beam width dependent |
| Ground Segment Parameters |  |  |
| Receive aperture | ≤30 cm | COTS telescope |
| Mass | 50 kg | For portability |
| PAT scheme | open-loop | Based on TLE/ephemeris |
| Detector | APD, PMT, etc. | Commodity/COTS unit is desirable |
| Uplink beacon | TBD eye-safe laser | Req. for closed-loop tracking |

TABLE 5

Link and Module Parameters

| Link parameters | | |
|---|---|---|
| Data rate | 10-50 Mbps | |
| Bit error rate | $10^{-4}$ (no coding) | Conservation baseline |
| Path length | 1000 km (at 20° elevation) | LEO orbit at 400 km altitude |
| NODE module | | |
| Size, weight | 10 × 10 × 5 cm, 0.6 kg | 0.5 U CubeSat |
| Power | 10 W (transmit) | CubeSat constraints |
| Downlink beam | 0.12° FWHM | Provide required data rate |
| Beacon receiver | Silicon array, 7° FOV | COTS components, cover coarse pointing range |
| Coarse pointing | +/−3° (3-σ) | Host CubeSat ADCS |
| Fine pointing | +/−0.03° (3-σ) | Fast-steering mirror |

TABLE 6

Example FSO Payload Mechanical Parameters

| ID | Parent | Description |
|---|---|---|
| MECH-1 | | The FSO payload shall fit within a 0.5 U (10 × 10 × 5 cm) volume envelope |
| MECH-2 | | The FSO payload shall have a mass no greater than 1 kg |
| MECH-3 | | The FSO payload shall have "side-looking" so that it can be situated in the midsection of the CubeSat |
| MECH-4 | | The FSO payload's bistatic apertures shall maintain alignment within X mrad (TBD) across expected environmental disturbances (thermal gradients, vibe, shock) |

TABLE 7

Example FSO Payload Electrical Parameters

| ID | Parent | Description |
|---|---|---|
| ELEC-1 | | The FSO payload shall consume no more that 1 W (idle) and 10 W (during TX) |
| ELEC-2 | | The FSO payload shall accept unregulated bus voltages between 6 V and 10 V |

TABLE 8

Example Communication Link Parameters

| ID | Parent | Description |
|---|---|---|
| COMM-1 | | The optical dowlink shall provide 10 Mbps (goal), 50 Mbps (stretch) user information rate |
| COMM-1.1 | COMM-1 | The optical downlink shall operate at channel BER less than 10^-4 |
| COMM-1.2 | COMM-1 | The FSO payload shall provide FEC |
| COMM-1.3 | COMM-1 | The FSO payload shall provide interleaving to mitigate atmospheric fading |
| COMM-2 | | The optical downlink beam divergence shall be 2 mrad (FWHM) |

TABLE 9

Example Ground Station Parameters

| ID | Parent | Description |
|---|---|---|
| GND-1 | | The ground station telescope(s) shall be capable of continuously tracking a LEO object without entering gimbal lock |
| GND-2 | | The ground station shall provide an uplink beacon signal |
| GND-2.1 | GND-2 | The beacon signal shall not be visible or listed as a distraction hazard. |
| GND-2.2 | GND-2 | The beacon signal shall be eye-safe (i.e. below MPE) at the beacon transmit aperture |
| GND-2.3 | GND-2 | The beacon beam divergence shall be large enough to ensure 3-sigma probability of illumination given satellite position uncertainties |
| GND-3 | | The ground station shall provide a 30 cm {TBR} aperture for receiving the downlink communication signal |
| GND-4 | | The downlink receiver shall use COTS detector technology such as APO/TIA modules |
| GND-5 | | The ground station shall incorporate a wide FOV acquisition sensor |
| GN0-5.1 | | The ground station shall provide a means to calibrate alignment of acquisition sensor and communication detector |

TABLE 10

Example Transmitter, Channel and Receiver Parameters

|  | Symbol | Value | Units | Notes |
|---|---|---|---|---|
| Transmitter Parameters | | | | |
| Laser optical output power | PLD, elec | 1 | W | |
| Laser wavelength | > ... peak | 1550 | nm | Peak wavelength |
| Modulation duty cycle |  | 0.5 |  | Simple RZ for now |
| Laser avg. optical power (dBW) | PLD, opt, avg, d B | −3.0 | dBW | |
| Half-power beam width | $\theta_{1/2}$ | 0.120 | degrees | Full cone angle where power is half of peak intensity |
| Transmit antenna gain (dB) | Gt, dB | 65.60 | dBi | Based on divergence above |

TABLE 10-continued

Example Transmitter, Channel and Receiver Parameters

| | Symbol | Value | Units | Notes |
|---|---|---|---|---|
| Channel Parameters | | | | |
| Path length | d | 1000 | km | LEO at 400 km can be tracked down to 20 degrees above horizon |
| Path loss (dB) | Lpath, dB | −258.2 | dB | Standard free-space path loss equation |
| Atmpheric loss placeholder | Latm, dB | −6.00 | dB | Placeholder value for absorbtion, scattering, turbulence |
| Receiver Parameters | | | | |
| Aperture di11meter | | 30 | cm | |
| Receive antenna gain (dB} | Gr, dB | 115.7 | db | Diffraction limited gain |
| Power at detector (dB) | Prec, dB | −85.9 | dBW | |
| Power at detector | Prec | 1.28E−09 | W or J/s | |
| Photons per second | | 1.00E+10 | photons/sec | |
| Required photons/bit | | 1000 | photons/bit | An "easy#" to achieve receiver sensitivity |
| Predicted data rate | | 10000102 | bits/sec | |

TABLE 11

Example Power Budget Breakdown

| | | Mode: Nominal | TX Comm downlink in progress | | UL_ACQ Search/ acquire UL beacon | | DL_ACQ Track UL beacon, transmit DL acq. | | IDLE Accept, encode, store telemetry from host | |
|---|---|---|---|---|---|---|---|---|---|---|
| Component | | Power (W) | Duty (%) | P_avg | Duty (%) | P_avg | Duty (%) | P_avg | Duty (%) | P_avg |
| Focal plane array | | | | | | | | | | |
| FPA quiescent | | 0.05 | 100% | 0.05 | 100% | 0.05 | 100% | 0.05 | | |
| FPA readout power | | 0.11 | 100% | 0.11 | 100% | 0.11 | 100% | 0.11 | | |
| PAT Processor | | 0.25 | 100% | 0.25 | 100% | 0.25 | 100% | 0.25 | | |
| Fast steering mirror + driver | | 0.25 | 100% | 0.25 | | | 100% | 0.25 | | |
| High-Speed Electronics | | 0.25 | 100% | 0.25 | | | 100% | 0.25 | | |
| FEC encoder | | 0.25 | 100% | 0.25 | | | 100% | 0.25 | 100% | 0.25 |
| Non-vol telem. buffer (SSR) | | 0.25 | 100% | 0.25 | | 0.25 | 100% | 0.25 | 100% | 0.25 |
| Modulator/framer | | 3.00 | 100% | 3.00 | | | 100% | 3.00 | | |
| Laser transmitter | | | | | | | | | | |
| EDFA | | 3.00 | 100% | 3.00 | | | 100% | 3.00 | | |
| Seed laser driver | | 0.25 | 100% | 0.25 | | | 100% | 0.25 | | |
| Seed laser TEC | | 0.25 | 100% | 0.25 | 100% | 0.25 | 100% | 0.25 | | |
| Radio Modem | | | | | | | | | | |
| Receive only | | 0.10 | 95% | 0.10 | 50% | 0.05 | 50% | 0.5 | 100% | 0.10 |
| Transmit/receive | | 1.50 | 5% | 0.08 | 50% | 0.75 | 50% | 0.75 | | |
| Mode Total (W) | | | | 7.58 | | 1.71 | | 8.21 | | 0.60 |
| Mode Budget (W) | | | | 10.00 | | 10.00 | | 10.00 | | 1.00 |
| Power Margin (%) | | | | 24% | | 83% | | 83% | | 40% |

TABLE 12

Example Downlink Budget Overview

| | | Value | Units | |
|---|---|---|---|---|
| Link Budget Input Parameters | | | | |
| Information rate | R_info | 1.00E+07 | bps | 10 Mbps |
| Code overhead | eta_FEC | 0.00% | | Codeless for now |
| PPM order | M | 16 | | Number of slots per symbol |

TABLE 12-continued

Example Downlink Budget Overview

| | | Value | Units | |
|---|---|---|---|---|
| Laser Transmitter | | | | |
| Laser electrical input power | PLD, elec | 3.00 | W | Electrical input power |
| Laser wavelength | λpeak | 1550 | nm | Peak wave length |
| Electro-optical efficiency | η_TX | 0.07 | . | |
| Extinction ratio | ER dB | 27.04 | dB | Used for "power robbing" correction. |
| Half-power beam width | θ | 0.120 | deg | Power is 0.5*peak, full cone |
| | | 2.09-1 | mrad | |
| Transmit optical losses (dB) | L t, o pt, dB | −3.00 | dB | Real values from OCTL |
| Channel | | | | |
| Pathlength | d_path | 1000 | km | LEO at 400 km −+ 20 deg above horizon |
| Atmospheric loss | Latm, dB | −1.00 | dB | |
| Pointing loss | Latm, dB | −3.00 | dB | |
| Receive Telescope & Optics | | | | |
| Focal length | FL | 3 | M | |
| Aperture diameter | d | 30 | cm | |
| Receive optics losses | L_RX, optics | −3.00 | dB | |
| Background Noise (Sky Rad.) | | | | |
| Field of view (full cone angle) | | 6.67E−05 | rad | PPM: C30662ER has 0.2 mm diameter |
| Sky Spectral Radiance | L_sky | 6.00E−04 | W (cm/\2 + S | Daytime • 2 km above sea level at 975 nm [Hemmati FIG. 8.16] |
| Optical filter band"idth | B opt | 1 | nm | |
| Receiver Electronics | Module | | | |
| Responsivity (w/gain) | R_V_per_W | 340,000 | V/W | |
| Transimpedance | R fb | 68,000 | ohm | Approximated from responsivity curve |
| Excess noise factor | F | 5.5 | | |
| Noise equivalent power | NEP | 6.50E−14 | W/sqrt(Hz) | W/sqrt(Hz) |
| Electrical BW | B | 3.20E+07 | Hz | OOK: 0.8 * bit rate PPM: 0.8 * slot rate |
| Liu Budget Summary | | | | |
| Laser avg. optical power | PLD, opt, avg, dB | −6.8 | dBW | Based on manuf specifications |
| Transmit optical losses (dB) | L t, o pt, dB | −3.0 | dB | Placeholder |
| Transmit antenna gain(d•B) | Gt, dB | 65.6 | dBi | Uniform plane wave assumption. G = 16 theta/\(Lambert eq3.78) |
| Path loss (dB) | Lpath, dB | −2581 | dB | Standard free-space path loss equation |
| Atmospheric loss | Latm, dB | −1.0 | dB | Placeholder |
| Pointing loss | Latm, dB | −3.0 | dB | Placeholder |
| Receive antenna gain (dB) | Gr, dB | 115.7 | dBi | Diffraction limited gain |
| Receive optics losses | L_RX, optics | −3.0 | dB | Placeholder |
| Signal power at detector | P_sig, dB | −93.7 | dBW | Average received power |
| Signal power required | P_req, dB | −97.1 | dBW | BER = 1e-4 |
| Margin for 1e−−4 BER | | 3.4 | dB | |

Coarse Stage

The coarse stage of the system uses CubeSat body-type pointing (see, e.g., coarse pointing of FIG. 2 and corresponding description above). In some embodiments, the coarse pointing sensors and actuators are not contained within the FSO communications payload, but rather are contained within or are part of the host CubeSat. CubeSats can use a combination of magnetorquers, reaction wheels, and/or thrusters for attitude control. Actuators that can slew include: thrusters, magnetorquers, reaction wheels, miniature control moment gyros, or any other mechanism that can generate a torque. The FSO communications payload can be agnostic to the choice of sensors and actuators in the host system. The host CubeSat has sufficient orbit and attitude knowledge to initially point within 3° (i.e., initial pointing accuracy of 3°) of the ground station (e.g., based on the field-of-view of the beacon receiver). The CubeSat can be configured to autonomously slew with respect to inertial space to achieve initial alignment of the beacon receiver with the optical beacon (e.g., in advance of the CubeSaf s pass of a ground terminal, such that the lasercom beacon camera is staring at the point on the horizon where the terrestrial station will appear).

Once an initial alignment is achieved and/or the beacon has been located/acquired, the CubeSat can slew with respect to the ground/terrestrial terminal at a slew rate of 1° per second, or up to 1.1° per second (e.g., orbit dependent, to slew to track the terrestrial terminal through the pass). The beacon can provide very fine attitude knowledge, approximately 30 μrad, and the CubeSat undergoes a transition to become actuation-limited (during tracking). At this point, the host CubeSat points to within 1° of accuracy to overlap with the pointing range of the fine stage. The FSO communications payload, which contains a FSM for fine steering, can then "dial in" the transmitter to the desired accuracy for downlink. A distinction between attitude determination and orbit (position) determination can be made, in that position/orbit determination is relevant to both ends of the link. For example, position/orbit determination impacts how the ground station points the uplink beacon laser. For the satellite, orbit determination along with attitude determination impact satellite pointing.

Fine Stage

With regard to the fine steering mechanism (see, e.g., fine pointing/steering of FIGS. 2-3 and corresponding description above), component selection criteria can include (but are not limited to): field of regard, accuracy, bandwidth, size, weight and power (SWaP) considerations (e.g., as affected by a mirror and its driver). In some embodiments, a MEMS fine-steering mirror ("FSM") is used (e.g., having a mechanical resonance of 430 Hz), and a Bessel filter can be employed to protect the FSM. The MEMS fine-steering mirror can comprise a 2-axis MEMS tip/tilt mirror (e.g., a Physik Instrumente S-334 piezoelectrically actuated tip/tilt mirror or a Mirrocle Technologies, Inc. S1630DB gimbal-less two-axis scanning MEMS micromirror) with a steering range (e.g., of about +/−1.25° or about +/−2.86° or about +/−5.73°), a size (e.g., of about 1.25 mm, or of about 4.2 mm), and a bandwidth (e.g., of about 300 Hz, or of up to 200 Hz, or of up to 1 kHz). The MEMS fine-steering mirror can be disposed within a small, chip-scale package having no integrated feedback sensors. Qualification parameters for a fine steering mechanism can include positioning repeatability, thermal stability, and/or the ability of a mirror to be driven open-loop.

The fine-pointing module can be configured to point the optical transmitter toward a remote terminal with an accuracy range that overlaps with an accuracy range of the coarse-pointing module of the CubeSat. In some embodiments, overlap is desired because, for example, if the CubeSat can only get to within 3° accuracy for example, and the FSM can only reach 1° at the edge of its motion, it would be difficult or infeasible to apply an error correction. As such, in some embodiments, the fine stage range is driven by the actuation-limited CubeSat pointing capability. In some embodiments, the cubesat payload does not include an electromechanical gimbal. The gimbal is replaced by the fine steering mirror combined with the fact that it is generally acceptable to body slew a CubeSat.

Specifications for the accuracy of the fine stage can be based on a detailed link budget analysis to size the beamwidth of the CubeSat payload. With a beamwidth of 2.1 mrad, the 3-pointing accuracy is set as a quarter of the beamwidth, e.g., 525 µrad (0.03°). The pointing loss is thus limited to 3 dB in the worst case. Therefore, the fine stage provides a range of 1° to overlap with the CubeSat body pointing and a final accuracy of 525 µrad. The combination of the coarse and fine stage control can achieve a pointing accuracy of ±90 µrad, excluding consideration of pointing bias. This gives approximately 7 dB of margin over ±525 µrad. In the worst case scenario (i.e., the worst possible pointing that still meets the requirements described herein), the pointing loss is maintained within 3 dB.

To characterize the fine pointing stage, a 650 nm red laser was directed through a focusing lens, and steered into a Si camera by a FSM. The angle of the FSM was determined based on the geometry of the setup. Since there was no feedback available on the device's position, it was necessary to characterize repeatability of the device to ensure that it could meet performance requirements. To test repeatability, the mirror was commanded to visit each of the points in a 5-sided die pattern covering its entire range. For each iteration, points were visited in a random order. Statistics on the position repeatability for a significant number of trials (N=500) show that the RMS error of the device is 12 µrad, well within the desired performance.

Beacon Design

With regard to the beacon (see FIG. 1 and corresponding description above), design drivers can include (but are not limited to): satellite position uncertainty, eye safety (e.g., ANSI Z136.6, "Safe Use of Lasers Outdoors," NASA Use Policy for Outdoor Lasers, FAA Regulation: Order JO 7400.2), and/or detector technology. In some embodiments of the disclosure, a broad, near infrared uplink beacon is used, and is intercepted by a focal plane array on the satellite (i.e., the CubeSat). Beacon system analysis can include atmospheric fading, detector noise modeling and centroiding algorithm performance. As described herein, the beacon system can provide an average attitude knowledge accuracy of 30 µrad with 2.3% fading probability in each frame read-out.

CubeSat FSO Communications System—Operation

Figure 4A:
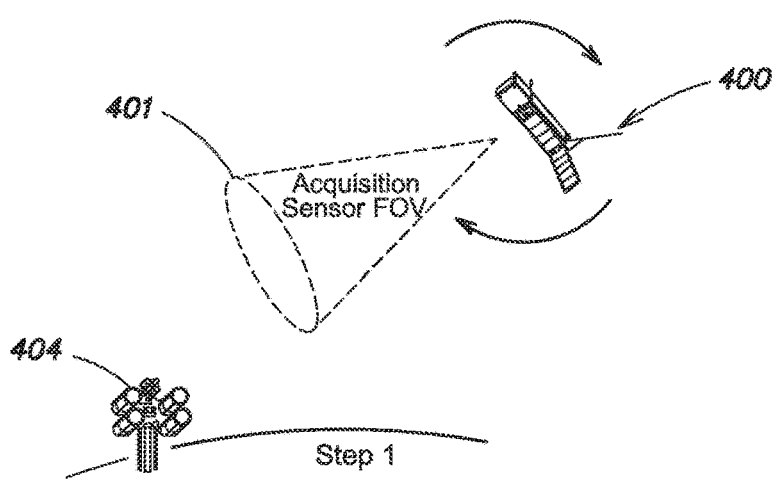
FIGS. 4A-4C show a pointing, acquisition and tracking ("PAT") process, according to some embodiments.
Figure 4B:
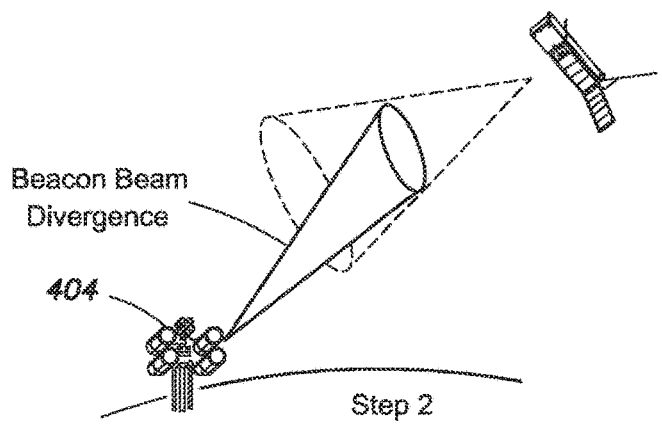
Figure 4C:
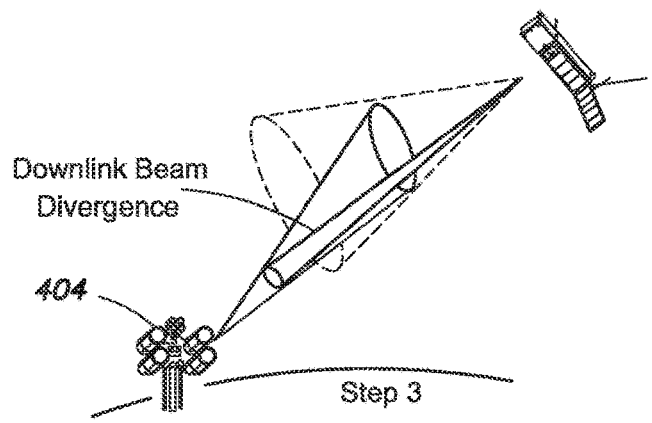

FIGS. 4A-4C illustrate a sequence of a pointing, acquisition, and tracking ("PAT") process executed by a CubeSat with fine a coarse pointing stages. During operation, a host CubeSat 400 autonomously slews from a mission-defined attitude. In FIG. 4A, an acquisition sensor (e.g., having a FOV 401 of 6.6°×8.7° (full-angle)) of an FSO communications module of the host CubeSat 400 stares for a beacon signal B with a coarse ADCS accuracy of ~2° (e.g., based on attitude knowledge and/or position knowledge). The beacon can originate from a remote terminal 404 or from its general vicinity. In systems where uplink and downlink wavelengths are similar, it can be advantageous to provide some spacing between the beacon transmitter and the downlink receiver in order to reduce noise caused by scattered light from the uplink.

In FIG. 4B, a centroid algorithm, running on the FSO communications module, estimates a boresight offset, and the ADCS subsystem of the host CubeSat closes control loops using a beacon offset. The beacon beam divergence is ~5 mrad full width at half maximum ("FWHM"), which accommodates a tracking error of less than +/−1 km. The point-ahead angle in LEO is orders of magnitude smaller than the specified beamwidth. As such, the point-ahead angle is ignored due to beamwidth and orbit geometry (10 arcsec (51 µrad)). In FIG. 4C, an integrated fine-steering mechanism rejects residual error, and coarse corrections are fed to the host ADCS. Although some degree of range, resolution, and/or bandwidth limitation is inherent to all actuators and sensors, multi-stage solutions (i.e., the staged control approach described herein) can alleviate such limitations.

Tables 13 and 14 (below) provide exemplary overviews of the coarse and fine stages of a staged control approach to PAT, according to some embodiments.

TABLE 13

Overview of Coarse Stage (Host CubeSat) Requirements

| Parameter | Requirement |
|---|---|
| Initial pointing accuracy | ±3° |
| Actuation-limited pointing accuracy | ±1° |
| Max. slew rate | up to 1.1°/s (orbit dependent) |

TABLE 14

Overview of Fine Stage Requirements

| Parameter | Requirement |
|---|---|
| Range | ±10 |
| Pointing accuracy | 525 µrad (0.03°) |

Figure 5:
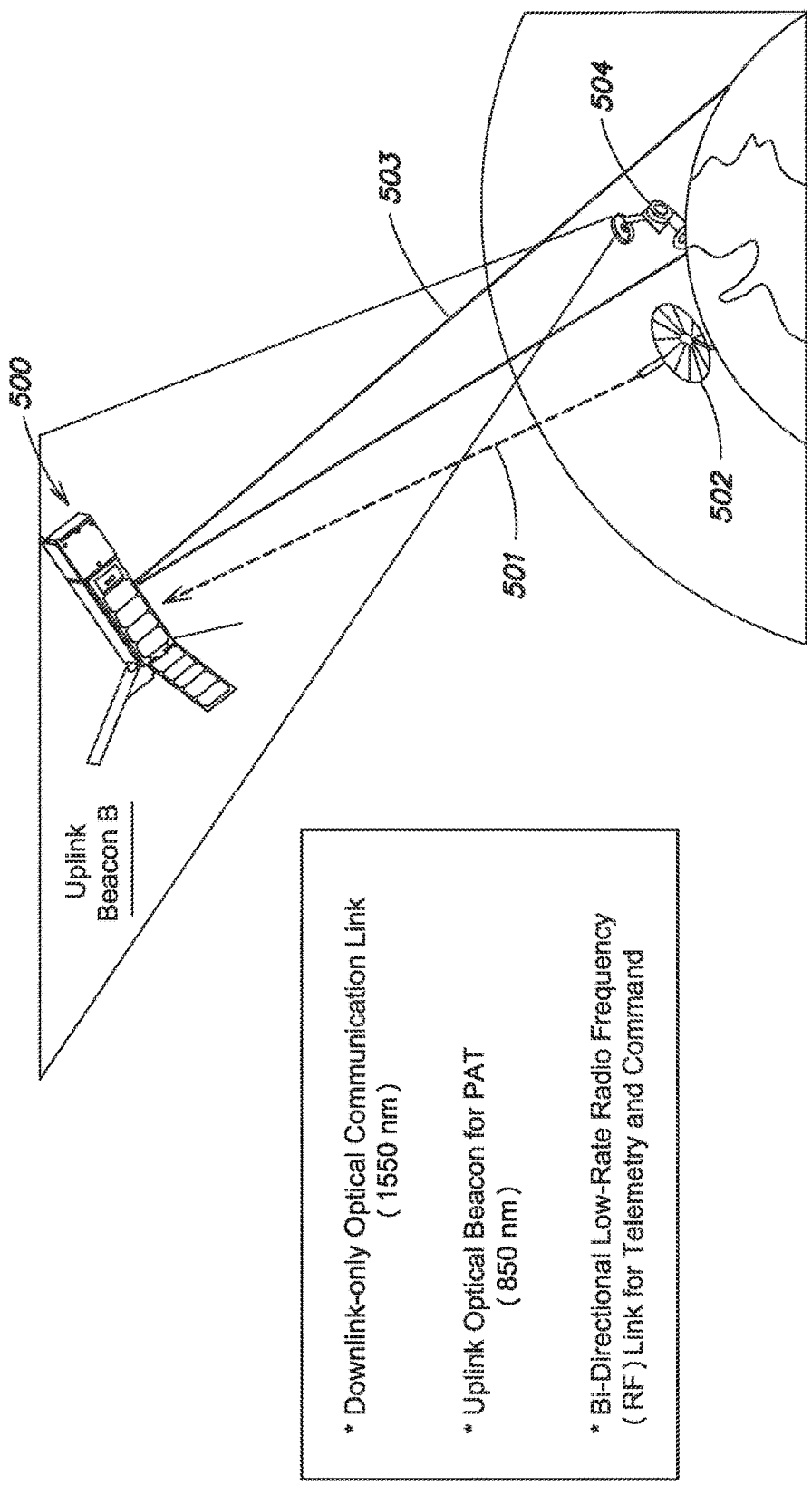
FIG. 5 is a rendering of a satellite communication system according to some embodiments.

FIG. 5 is a rendering of an FSO satellite communication system according to some embodiments. An FSO module on board the satellite 500 has a data rate of about 10 Mbps to about 50 Mbps, with comparable power consumption as compared with existing RF solutions. While the high-rate downlink and beacon uplink are both optical, the system also uses a low-rate RF uplink and downlink 501 (via RF station 502) for high-level command and control and limited data downlink, for example during periods of optical link unavailability, should they occur. The RF link 501 can be supported with minimal resources in terms of licensing, ground systems, and power.

As shown in FIG. 5, an uplink optical beacon B (e.g., originating from optical station 504), having a wavelength of about 850 nm, is used for acquisition and tracking, and an optical downlink beam 503 at about 1550 nm is used for high-rate data transmission. The transmitter optical power budget can be a function of the downlink data rate and/or the size, cost and/or the portability of the ground terminals. A link budget analysis can be performed to determine a target transmit beamwidth (e.g., 2.1 mrad) as well as other PAT considerations for minimizing pointing losses to acceptable levels. In some embodiments, the transmitter is configured to output (e.g., via an EDFA) high-fidelity waveforms with an extinction ratio ("ER") of >about 33 dB, at an electrical power margin of about 18% and a modulation bandwidth of >about 600 MHz (e.g., FPGA-limited).

Figure 6:
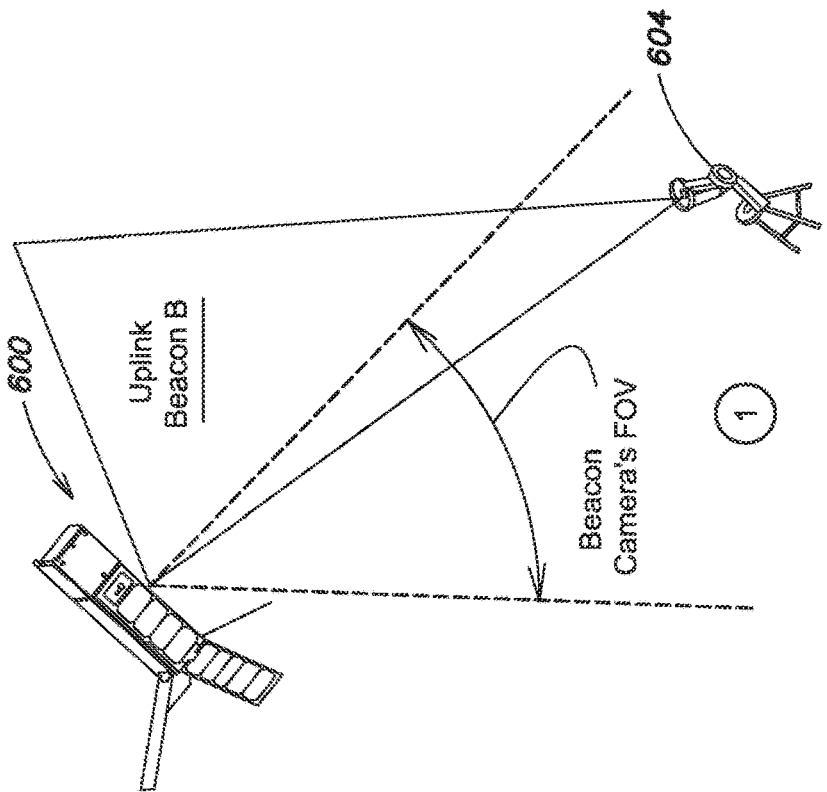
FIG. 6 is a rendering of a first step in a PAT process implemented using the system of FIG. 5.
Figure 7:
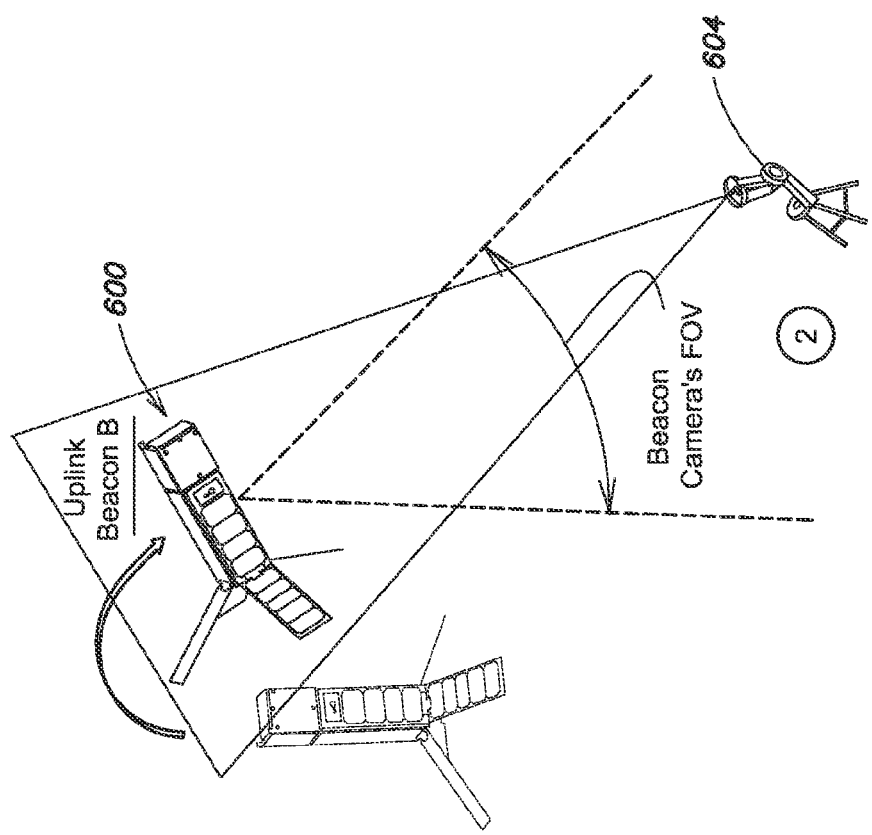
FIG. 7 is a rendering of a second step in a PAT process implemented using the system of FIG. 5.
Figure 8:
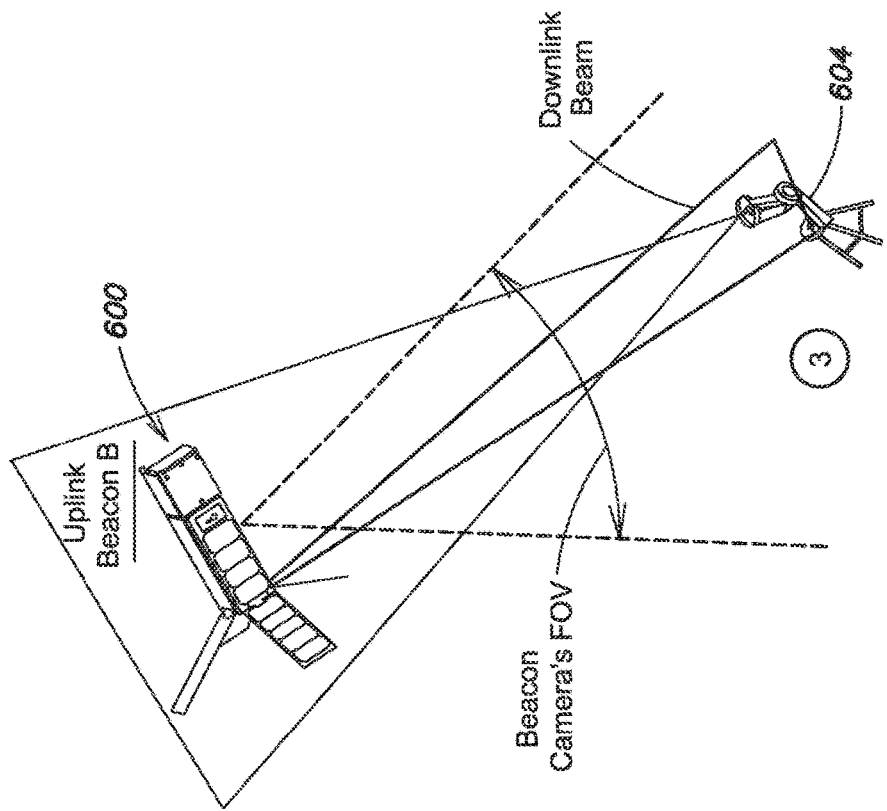
FIG. 8 is a rendering of a third step in a PAT process implemented using the system of FIG. 5.

FIGS. 6, 7 and 8 are renderings of first, second, and third steps (respectively) in a PAT process implemented using the system of FIG. 5. During the first step (FIG. 6), the CubeSat 600 slews toward a ground station 604 or other remote terminal (i.e., seeking to acquire an uplink beacon emanating therefrom) using one or more coarse sensors and one or more reaction wheels as actuators, with a pointing accuracy of +/− about 3°. Coarse pointing can be based on two-line element ("TLE") information. Two line element sets are published by the Joint Space Operations Center for satellite operators to utilize. Based on the satellite's orbital position from the TLE and the known location of the ground station, the satellite can point towards the ground station.

During the second step (FIG. 7), the CubeSat 600 closes its control loop around a beacon offset using a beacon camera and one or more reaction wheels as actuators, with an improved pointing accuracy of +/− about 1.25°. The beacon camera determines ("sees") the location of the beacon and, correspondingly, where it should point to achieve a high degree of accuracy (the accuracy being limited, in some embodiments, by the actuators' capabilities). A beacon camera can comprise a CMOS focal plane array (e.g., 5 megapixels) such as an Aptina MT9P031 (e.g., having an optical format of 1/2.5", a resolution of 2,592H× 1,944V, a pixel pitch of ~2.2 μm, and a quantum efficiency ("QE") at 850 nm of ~15%), a lens systems (e.g., 1", f=35 mm), one or more bandpass filters to reject background light, and/or one or more UV/VIS-cut filters to reduce system heating.

During the third step (FIG. 8), the fine steering mechanism of the CubeSat 600 is activated. This step continues to use the beacon camera for sensing, but transitions to using a fast-steering mirror as its actuator, with a pointing accuracy of +/− about 0.03°. The CubeSat can then steer its downlink based on a beacon boresight offset. Example parameters for the transmitter shown in Table 15 below. Example parameters for the beacon camera optics are shown in Tables 16 and 17 below.

TABLE 15

Transmitter Design Parameters

| Parameter | Value | Justification/Driver |
| --- | --- | --- |
| Optical output power | >200 mW avg | Link budget, PPM-16 assumed |

TABLE 15-continued

Transmitter Design Parameters

| Parameter | Value | Justification/Driver |
| --- | --- | --- |
| Modulation type | PPM, M = [8-64] | ER implications |
| Modulation BW | >1 GHz desired | To support future pointing improvements |
| Wavelength stability | ±1 nm | Ground receiver filter |
| Operating temp. range | 0° C. to 40° c. | Typical CubeSat values (inside chassis) |
| Input power | <8 w | Transmitter portion of terminal |
| Size goal | <10 cm × 10 cm × 3 cm | Transmitter portion of terminal |
| Mass goal | <300 g | Transmitter portion of terminal |

TABLE 16

Beacon Camera Parameters

| Parameter | Value |
| --- | --- |
| Detector resolution | 2592 H × 1944 V |
| Pixel's pitch | 2.2 μm |
| Focal length | 35 mm |
| Field of view | 7° |
| 850 nm band-pass filter bandwidth | 10 nm |
| Long-pass filter cut-off frequency | 700 nm |

TABLE 17

Beacon Camera Parameters
Lens + filters

| Focal length | 35 mm |
| --- | --- |
| Aperture | 1" |
| Band-pass filter | (850 +/− 5) nm |
| Long-pass filter | >700 nm |

In some embodiments, a field-programmable gate array ("FPGA") is used for transmitter modulation.

In some embodiments, the beacon receiver camera comprises a CMOS focal plane array, a 1" aperture lens system, and two optical filters. The detector is configured to have a high NIR sensitivity, resolution and low dark current and read noise properties. The lens system is configured to provide a wide effective field-of-view (7°) that can sufficiently compensate for the satellites pointing capability with only coarse sensors. Two optical filters are used: a bandpass filter at 850 nm and a UV/VIS-cut filter to reduce heating caused by Sun radiation. The beacon camera system size is approximately 4 cm×4 cm×6 cm with a total weight of 160 g, and can include a UV/VIS-cut filter to reduce system heating.

Figure 9B:
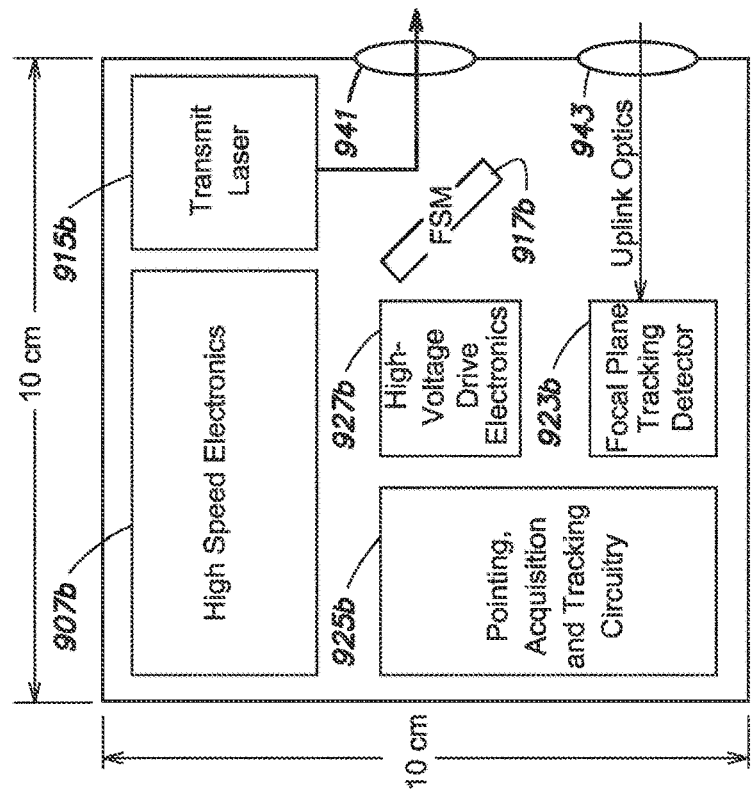
FIG. 9B is a rendering of a closed-loop tracking configuration using a focal plane tracking detector, according to some embodiments.
Figure 9A:
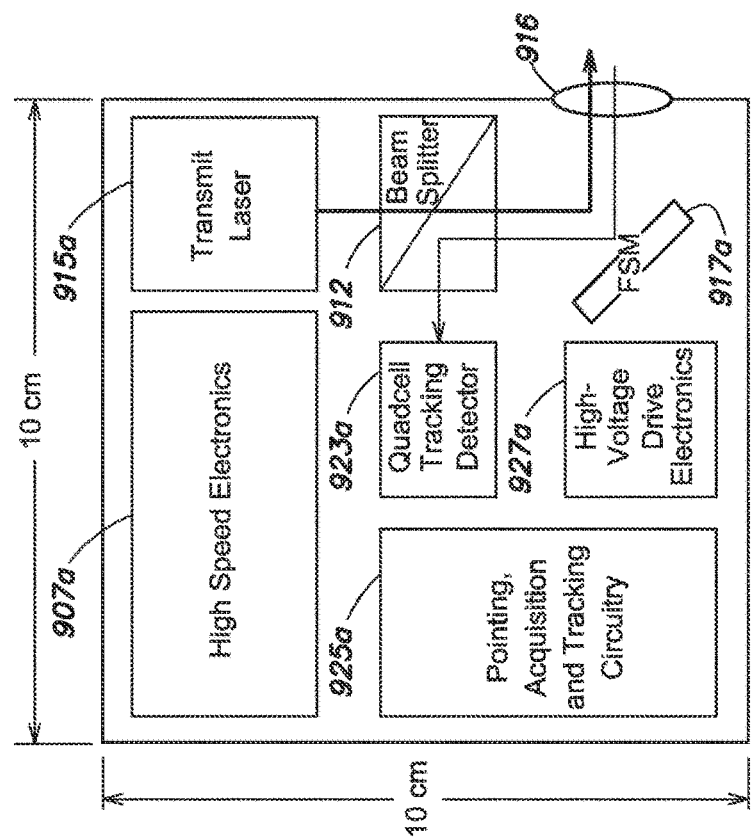
FIG. 9A is a rendering of a closed-loop tracking configuration using a quadcell tracking detector, according to some embodiments.

FIG. 9A is a rendering of a closed-loop tracking configuration for an FSO communications module, using a quadcell tracking detector 923a, according to some embodiments. A single aperture 916 is used for transmitted light (passing from the transmit laser 915a through beam splitter 912, then reflecting off of the FSM 917a and directed through the aperture 916) and received light (reflecting off of the FSM 917a and directed to the beam splitter 912, which diverts the incoming light onto the quadcell tracking detector 923a). Quadcell tracking detector 923a signal data is processed by PAT circuitry 925a. Transmit laser 1015a is driven by high speed electronics 907a, and the FSM 917a is driven by high-voltage drive electronics 927a. As compared with the focal plane detector configuration discussed below with reference to FIG. 9B, the quadcell configuration has a narrower field of view ("FOV") and more complex optics, but has a higher sensitivity.

FIG. 9B is a rendering of a closed-loop tracking configuration using a focal plane tracking detector, according to some embodiments. Separate apertures (941 and 943) are used for transmitted light (passing from the transmit laser 915*b* to the FSM 917*b* where it is reflected and directed through aperture 941) and received light (passing through uplink aperture 943 and incident directly onto the focal plane tracking detector 923*b*), respectively. Focal plane tracking detector 923*b* signal data is processed by PAT circuitry 925*b*. Transmit laser 915*b* is driven by high speed electronics 907*b*, and the FSM 917*b* is driven by high-voltage drive electronics 927*b*. As compared with the quadcell detector configuration discussed above with reference to FIG. 9A, the focal plane configuration has a wider FOV and simpler optics, but is less sensitive.

Ground Segment

Figure 10:
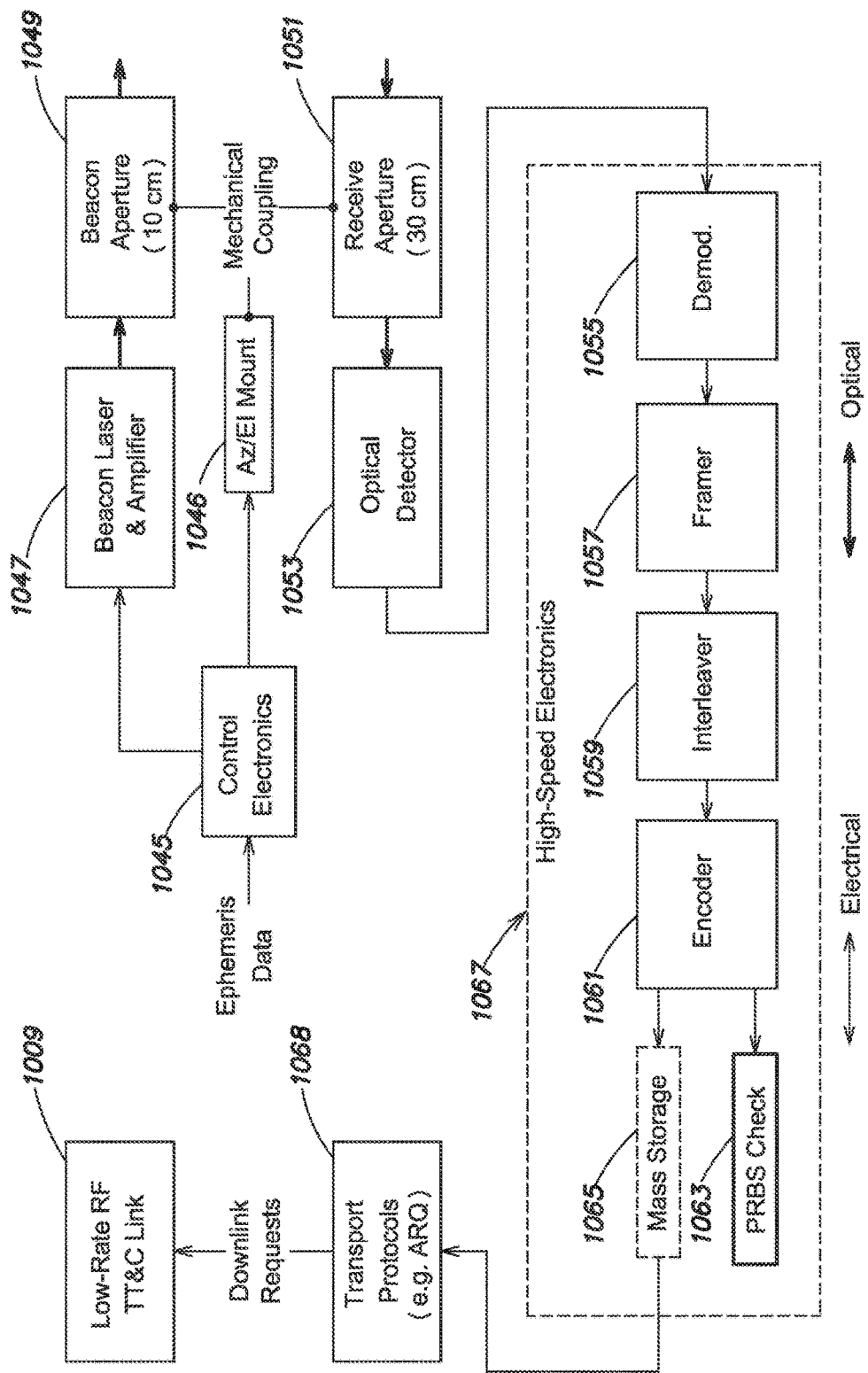
FIG. 10 is a system block diagram showing components of a ground segment according to some embodiments.

FIG. 10 is a system block diagram showing components of a ground segment according to some embodiments. Control electronics 1045, configured to receive ephemeris data, are electrically coupled to a beacon laser and amplifier 1047 whose collective output is optically transmitted through a beacon aperture 1049 (e.g., about 10 cm in diameter). The control electronics 1045 are also electrically coupled to an azimuth-elevation ("Az/El") mount 1046 that is mechanically coupled to the beacon aperture 1049 as well as to a receive aperture 1051 (e.g., about 30 cm in diameter). The receive aperture 1051 is configured to pass an incoming optical transmission to an optical detector 1053, whose output is electrically fed to a high-speed electronics module 1067. The high-speed electronics module 1067 contains a sequence of functional blocks: a demodulator 1055, a framer 1057, an interleaver 1059, and an encoder 1061. The output of the encoder is checked using a pseudorandom binary sequence (PRBS) checker 1063, and is optionally (e.g., if no or low error is found) stored to a mass storage unit 1065. Data in the mass storage unit 1065 (e.g., a downlink request) can then be retrieved using one or more transport protocols 1068 (e.g., automatic repeat request ("ARQ")) via the low-rate RF TT&C link 1009.

Transmitter Selection

A radiometric link budget analysis was performed to estimate the optical transmit power to close a 10 Mbps link for a CubeSat implementation. This analysis was constrained by the expected pointing capability of the space segment/terminal (e.g., which sets the downlink beam divergence to 2.1 mrad FWHM), the link range (e.g., <1000 km) as well as the sensitivity of the ground receiver (e.g., 1000 photons per bit, allowing for the use of COTS detectors), and indicated that approximately 1 W of optical power would close the link at a 10 Mbps user data rate in a receiver thermal-noise-limited system. At 1 W power levels, two optical sources were identified as candidates for the system: a high power laser diode (HPLD), such as a "pump" laser at 980 nm, and a master-oscillator power amplifier (MOPA) design incorporating a fiber amplifier at either 1 μm or 1.55 μm. The effectiveness of each of these configurations, based on end-to-end link performance, is discussed below. This performance analysis incorporated realistic transmitter assumptions (e.g. modulation type) and receiver parameters (e.g. suitable detector technology for transmitter wavelength). System parameters were matched where possible, and notable differences are enumerated in Table 18.

TABLE 18

Differences in HPLD and MOPA system parameters

| | Option A HPLD | Option B MOPA |
|---|---|---|
| Wavelength | 980 nm | 1550 nm |
| TX power (avg) | 500 mW | 200 mW |
| Modulation | OOK | PPM-16 |
| Receiver BW | Per modulation specifications | |
| Detector | Si APD/TIA | InGaAs APD/TIA |
| Performance Limiter | Modulation bandwidth | Wall-plug power |

Figure 11:
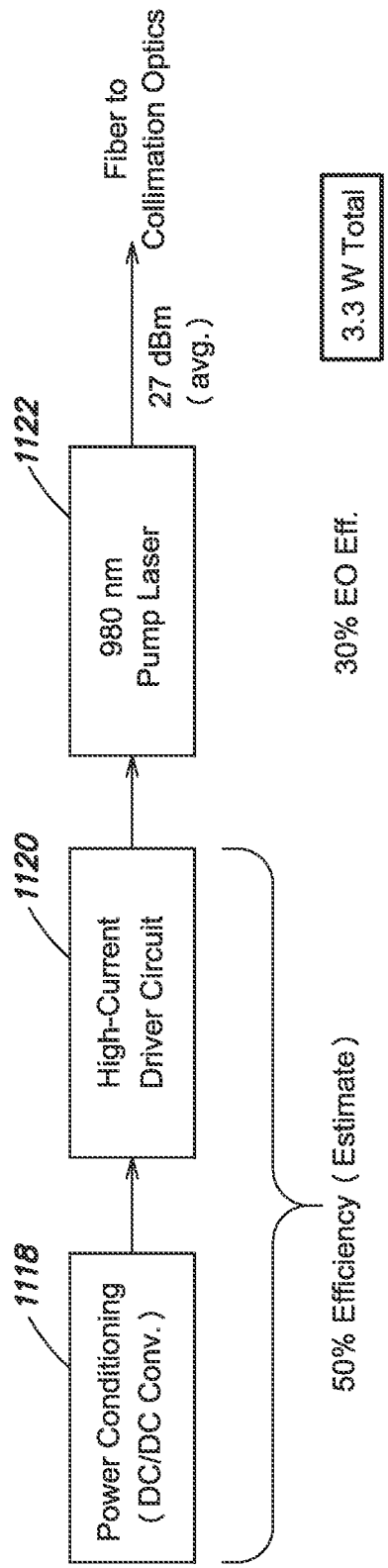
FIG. 11 is a block diagram showing components of a high power laser diode, according to some embodiments.

FIG. 11 is a block diagram showing components of a HPLD configuration, suitable for use in the optical transmitters of FIGS. 2-4. The HPLD configuration consists of a directly modulated high-power laser diode, such as a 980 nm "pump" laser diode 1122. These devices can be obtained in convenient single mode fiber-coupled butterfly packages. The electrical-to-optical (EO) conversion efficiency of HPLD lasers is typically greater than 30%. Operation at 980 nm is also advantageous from a receiver perspective, as silicon detectors are near their peak responsivity at this wavelength. Conditioned power (e.g., DC/DC conversion at 1118) is supplied to a high-current driver circuit 1120 that drives the pump laser 1122, and the laser output is fiber-optically routed to collimation optics. A disadvantage of the HPLD approach stems from the associated driver circuitry, which switches large amounts of current at the modulation bandwidth. Assuming on-off-keying (OOK), which minimizes modulation bandwidth relative to data rate, and a typical pump diode efficiency ($\eta$=0.6 W A$^{-1}$), the driver circuit would switch over ~1.5-2 A at 10 MHz rates. This approach is feasible, and is used in some systems (e.g., laser video projection systems), but may be fundamentally limited by the packaging of the laser. Nevertheless, this configuration is well within power budget: 3.3 W estimated of 8 W budget and an estimated wall-plug efficiency of 15%.

Figure 12:
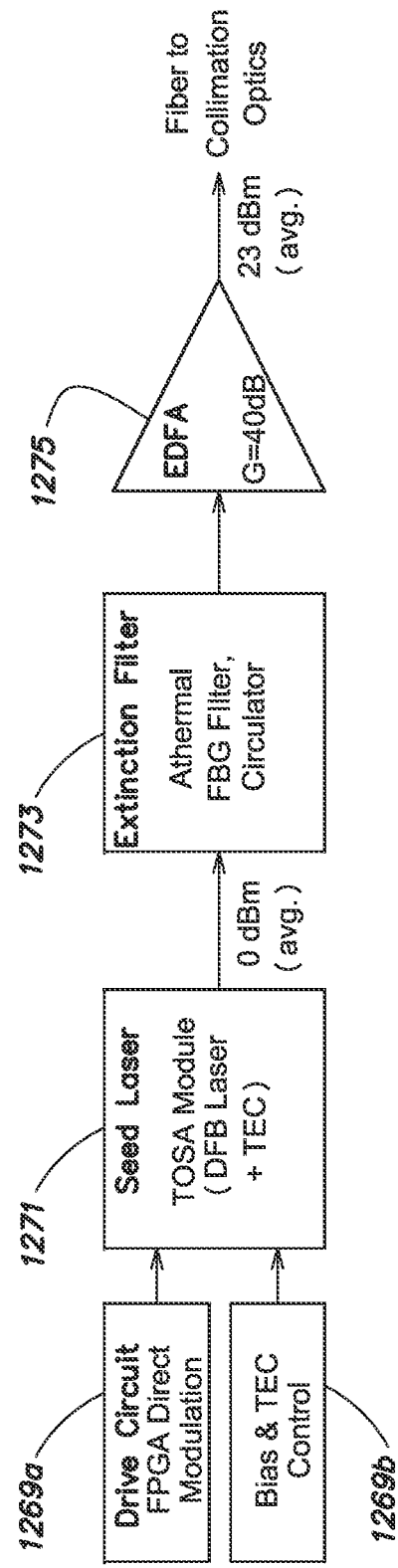
FIG. 12 is a block diagram showing components of a master oscillator power amplifier (MOPA), according to some embodiments.

FIG. 12 is a block diagram showing components of a MOPA configuration, according to some embodiments, suitable for use in the optical transmitters of FIGS. 2-3. Drive circuit 1269 provides FPGA direct modulation, bias, and TEC control, and is electrically coupled to seed laser 1271. Alternatively or in addition, the drive circuit 1269 includes one or more laser drivers and/or one or more thermoelectric cooler ("TEC") drivers. Seed laser 1271 comprises a transmitter optical subassembly ("TOSA") module including a distributed feedback ("DFB") laser diode and a TEC (which may be part of the TOSA module). Output from the seed laser 1271 is optically coupled to an extinction filter 1273 (e.g., an athermal FBG filter, circulator, bandpass spectral filter, etc.), for example to improve the extinction ratio ("ER") of the seed laser signal through FM-to-AM conversion. Precise alignment between the seed laser wavelength and the filter passband can simultaneously achieve high ER and low insertion loss. In some embodiments, athermal fiber Bragg grating ("FBG") filters can provide both steep transition regions (»1 dB/GHz) and high stopband attenuation (>30 dB) along with a thermally stable center wavelength (≈100 MHz/° C.). A temperature sensor can be mounted to a FBG filter and used to compensate for the slight thermal dependency of the FBG filter. The overall wavelength shift of the transmitter during such compensation can be acceptable, for example when the ground station receive filter bandwidth is 250 GHz (2 nm).

The filtered signal (i.e., the output of extinction filter 1273) is then fed to an amplifier. The MOPA configuration uses an average-power-limited fiber amplifier such as an Erbium-doped fiber amplifier ("EDFA," e.g., 1.55 μm) 1275a or an Yttrium-doped fiber amplifier ("YDFA," e.g., 1 μm), and is amplified by EDFA 1275 (e.g., with a gain of ~40 dB). Average-power-limited amplification allows the system to take advantage of low duty-cycle waveforms with high peak-to-average ratios such as pulse position modulation ("PPM"). Although YDFAs can provide roughly twice the wall-plug efficiency of EDFAs, these efficiency levels can be difficult to realize at lower (<1 W) power levels, and may be less commercially available. For purposes of analysis herein, a 200 mW "MSA" form-factor EDFA that is compatible with the volume constraints of CubeSats was used as a baseline. The lower output power of the MOPA (relative to the HPLD) is roughly balanced by the link margin gains afforded by moving to PPM from OOK modulation. The EDFA 1275 amplifier output is fiber-optically routed to collimation optics.

The EDFA 1275 amplifier output is then fiber-optically routed to collimation optics. In some embodiments, a MOPA transmitter produces high fidelity PPM waveforms at 1550 nm at 200 mW average output power while consuming 6.5 W of electrical power.

Aside from the amplifier, the modulator (e.g., see 215 in FIG. 2 and corresponding description above) is typically a large power consumer in MOPA designs. For PPM waveforms, the modulator can provide high extinction ratio ("ER") in order to avoid "power robbing" losses in the fiber amplifier (e.g. for PPM-16, ER>27 dB). To avoid the power penalty associated with an external modulator, a direct modulation ("directly modulated laser," "DML") approach can be used. The transmitter digital electronics (e.g. an FPGA) can directly modulate the seed laser with the communication waveform. Direct modulation alone can provide 10 dB of ER if the laser is kept above a threshold ($i_{th}$). To further improve ER, the laser's adiabatic frequency chirp can be used in conjunction with a narrow bandpass filter to produce FM-to-AM conversion. The MOPA design is estimated to consume about 6.5 W, yielding a wall-plug efficiency of approximately 3%. This is lower than the HPLD design, however the MOPA is capable of producing higher fidelity waveforms at much faster modulation rates. MOPA designs can have high modulation bandwidths, high peak-to-average power ratios, good component availability and a clean spectral output.

Seed-to-EDFA power budget data for MOPA architectures according to some embodiments is provided in Table 19 below.

TABLE 19

Seed-to-EDFA Power Budget (e.g., EDFA driven into saturation)

| Parameter | Value | Notes/Justification |
|---|---|---|
| Seed laser power output | −4 dBm | Average power (+12 dB for peak at M = 16) |
| Circulator Loss | −1.2 dB | |
| FBG Filter Loss | −1.3 dB | |
| Connector/coupler losses | −0.5 dB | Conservative budget for flight design |
| EDFA Gain | 40 dB | |
| EDFA avg output power | +23 dBm | |
| Margin | 10 dB | EDFA driven 10 dB beyond saturation |

Comparisons of the HPLD and MOPA configurations are provided in Tables 20-21 below. Both HPLD and MOPA configurations gave a >3 dB link margin for a 10 Mbps data rate at a specified bit error rate ("BER") of $1 \times 10^{-4}$ (uncoded).

TABLE 20

Comparison of HPLD and MOPA Architectures

| Parameter | HPLD | MOPA |
|---|---|---|
| Wavelength | 980 nm | 1550 nm |
| Approx. Size | 5 cm × 5 cm × 1 cm | 10 cm × 10 cm × 3 cm |
| Approx. Mass | 100 g | 250 g |
| Approx. Power | 3.3 W | 6.5 W |
| Modulation Bandwidth | <50 MHz (package parasitics) | >1 GHz |
| Peak-to-average Limit | Low (typ. <10) | High (>16) |
| Spectral Quality | Poor (>1 nm) | Excellent |
| Notable Risks | Driver circuit design Spectral quality | Wall-plug power Achieving high ER |

TABLE 21

Comparison of HPLD and MOPA Architectures

| | Config A (Direct) | Config B (MOPA) | Units | Notes |
|---|---|---|---|---|
| Laser avg. optical power | −3.0 | −6.8 | dBW | Manuf. specifications |
| Transmit optical losses | −3.0 | −3.0 | dB | TBR |
| Transmit antenna gain | 65.6 | 65.6 | dBi | 2.0 mrad divergence |
| Path loss | −262.2 | −258.2 | dB | Free-space path loss |
| Atmpheric loss | −1.0 | −1.0 | dB | TBR |
| Pointing loss | −3.0 | −3.0 | dB | TBR |
| Receive antenna gain | 119.7 | 115.7 | dBi | Diffraction limited gain, 30 cm |
| Receive optics losses | −3.0 | −3.0 | dB | TBR |
| Signal power at detector | −89.9 | −93.7 | dBW | |
| Signal power required | −92.7 | −97.1 | dBW | For 10 Mbps at BER = 1e−4 |
| Margin for 1e−4 BER | 2.8 | 3.4 | dB | |

PAT Analysis

Figure 13:
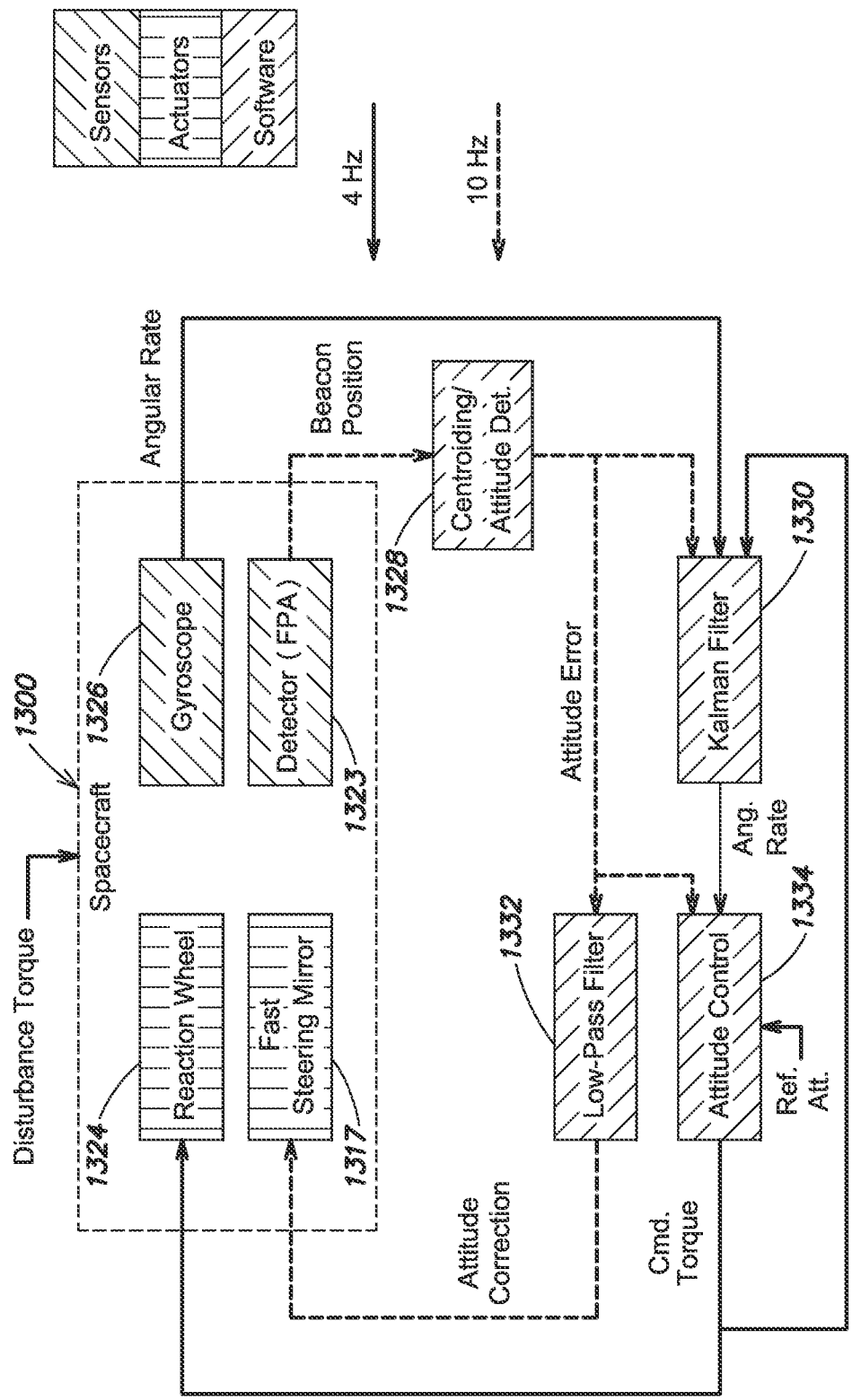
FIG. 13 is a diagram showing a linear single-axis model of an attitude control system, according to some embodiments.

Analysis of a PAT attitude control system according to some embodiments was performed using a single-axis tracking simulation. FIG. 13 is a diagram showing the linear single-axis model used, and Table 22 below shows the simulation parameters used. A spacecraft 1300 was modeled to include a reaction wheel 1324, gyroscope 1326, FSM 1317, and FPA detector 1323, and to have a disturbance torque applied thereto. Simulated beacon position information was routed from detector 1323 to a centroiding/attitude determination module 1328, which determined an attitude error and passed it to a low pass filter 1332, an attitude control module 1334, and the Kalman filter 1330. Attitude correction data was routed from the low-pass filter 1332 to the fast-steering mirror 1317. The attitude control module 1334 received angular rate data from the Kalman filter 1330, as well as reference attitude data (e.g., from memory) to calculate a command torque which was then passed to reaction wheel 1324 as well as back to the Kalman filter 1330 input. Angular rate information was routed from gyroscope 1326 to a Kalman filter 1330. Attitude dynamics were expressed as follows:

$$x = \begin{bmatrix} \theta \\ \dot{\theta} \end{bmatrix} \quad \dot{x} \begin{bmatrix} 0 & 1 \\ 0 & 0 \end{bmatrix} x + \begin{bmatrix} 0 \\ \frac{1}{J} \end{bmatrix} \tau_{cmd} + \begin{bmatrix} 0 \\ \frac{1}{J} \end{bmatrix} \tau_{dist}$$

The feedback controller was a PID controller run at 4 Hz (based on the MAI-400 reaction wheel), and gains were selected for a damping ratio of 0.7 and crossover frequency of 0.04 Hz:

$$K_P = J\omega_n^2 \quad K_D = 2J\eta\omega_n \quad K_I = \frac{K_P}{10}$$

where $K_P$ is proportional gain, $K_D$ is derivative gain and $K_I$ is integral gain.

TABLE 22

Simulation Parameters

| | Value |
|---|---|
| Optics | |
| Focal Length | 35 mm |
| Centroid Error | 30 μrad RMS (0.5 pixel) |
| Reaction Wheel (MAI-400) | |
| Max. Torque | 635 mNm |
| Resolution | 0.005 mNm |
| Gyroscope (ADIS-16334) | |
| Angular Random Walk | 2 deg/√hr |
| Output Noise | 0.75 deg/s RMS |
| Resolution | 0.0125 deg/s |
| Spacecraft | |
| True Moment of Inertia | 0.05 kgm² |
| Est. Moment of Inertia | 0.0475 kgm² |

During the PAT analysis, the performance of a system using only a coarse stage was compared with the system using both coarse and fine stages. A 400 km altitude, an acquired beacon, and environmental disturbances such as solar radiation, magnetic interference, a gravity gradient, and aerodynamic drag were simulated. The combined "coarse and fine stage" pointing significantly outperformed the exclusively coarse stage pointing (i.e., the attitude error was considerably lower for the combined "coarse and fine stage" as compared with the exclusively coarse stage pointing), and fell well within the limits of an exemplary downlink error range requirement. The estimated coarse pointing accuracy was +/−1.6 mrad (3-σ), while the estimated fine pointing accuracy was +/−80 μrad (3-σ).

ADCS Parameters

Figure 14:
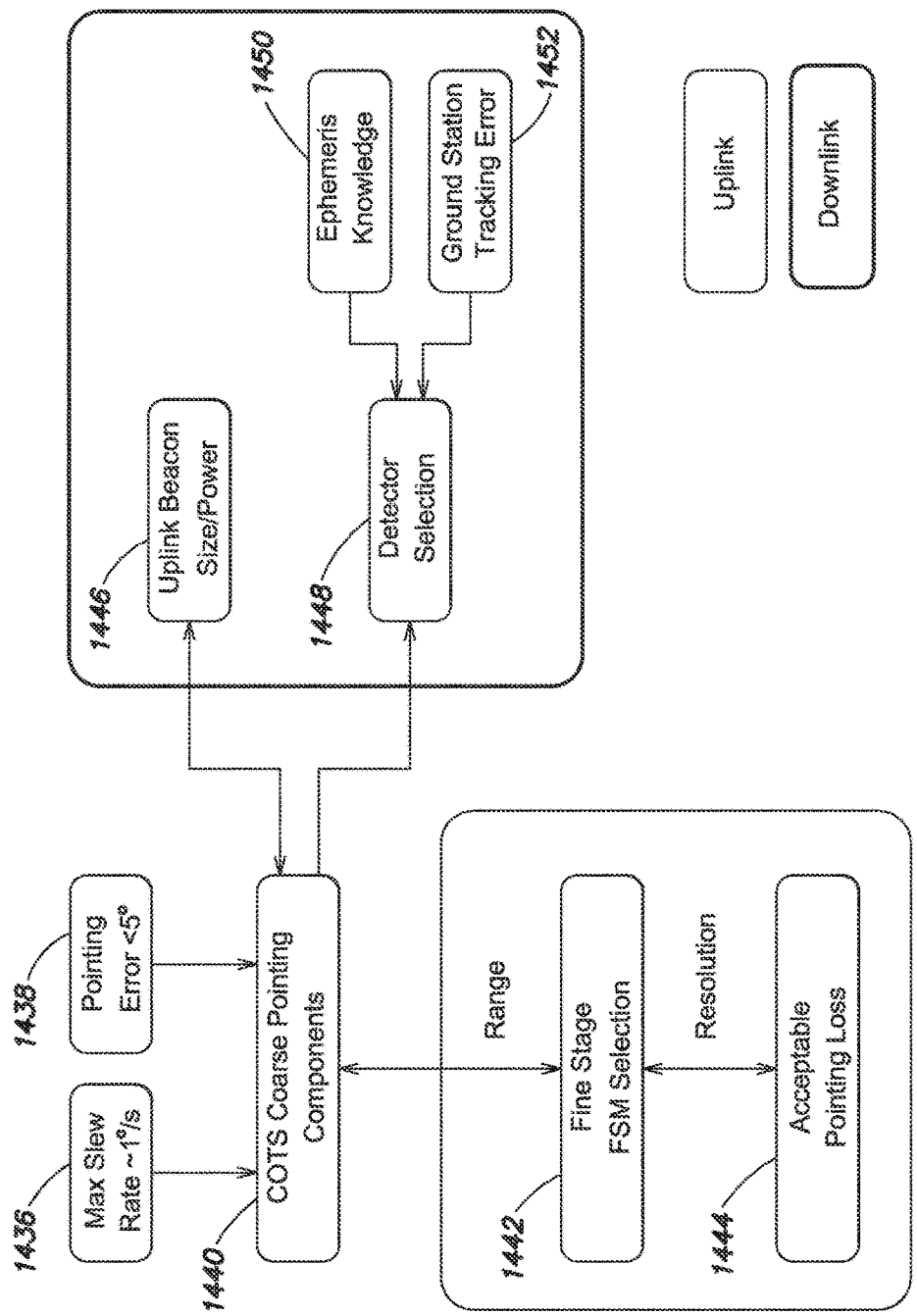
FIG. 14 is a flow-down diagram of key parameters of attitude determination and control systems, according to some embodiments.

FIG. 14 is a flow-down diagram of parameters of attitude determination and control systems. Uplink parameters include uplink beacon size/power 1446 (e.g., interdependent upon COTS coarse pointing component 1440 selection) and detector selection 1448 (e.g., based upon COTS coarse pointing component 1440 selection, ephemeris knowledge 1450 and/or ground station tracking error 1452). Downlink parameters include fine stage FSM selection 1442 (e.g., interdependent upon COTS coarse pointing component 1440 selection) and acceptable pointing losses 1444 (e.g., interdependent upon the fine stage FSM selection). COTS coarse pointing component 1440 selection can depend upon maximum slew rate 1436 (e.g., ~1°/s) and/or pointing error 1438 (e.g., <5°).

Figure 15:
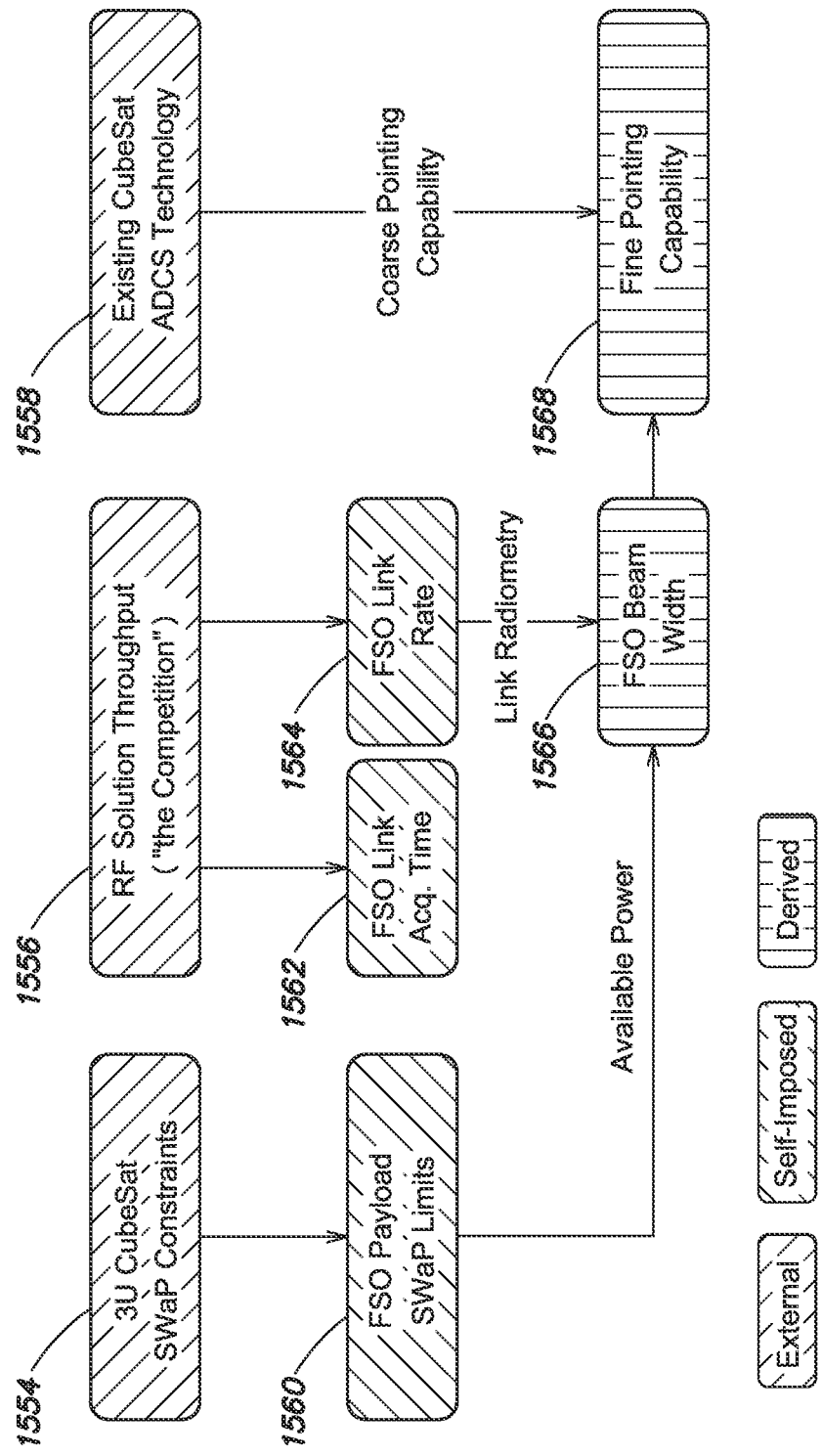
FIG. 15 is a flow-down diagram of constraints and parameters of attitude determination and control systems, according to some embodiments.

FIG. 15 is a flow-down diagram of constraints of attitude determination and control systems. 3 U CubeSat SWaP constraints 1554 (an external constraint) are considered when identifying self-imposed FSO payload SWaP limits 1560. The FSO payload SWaP limits correspond to an available power that affects the FSO beam width 1566 (i.e., a derived constraint). The RF communications infrastructure 1556 used (e.g., an external constraint) is a factor in determining a target FSO link acquisition time 1562 and FSO link rate 1564. The FSO link rate also affects the FSO beam width 1566 (a derived constraint). The existing CubeSat ADCS technology 1558 used, and its associated coarse pointing capability (an external constraint), together with the FSO beam width 1566, impact the fine pointing capability 1568 that can be achieved.

Figure 16:
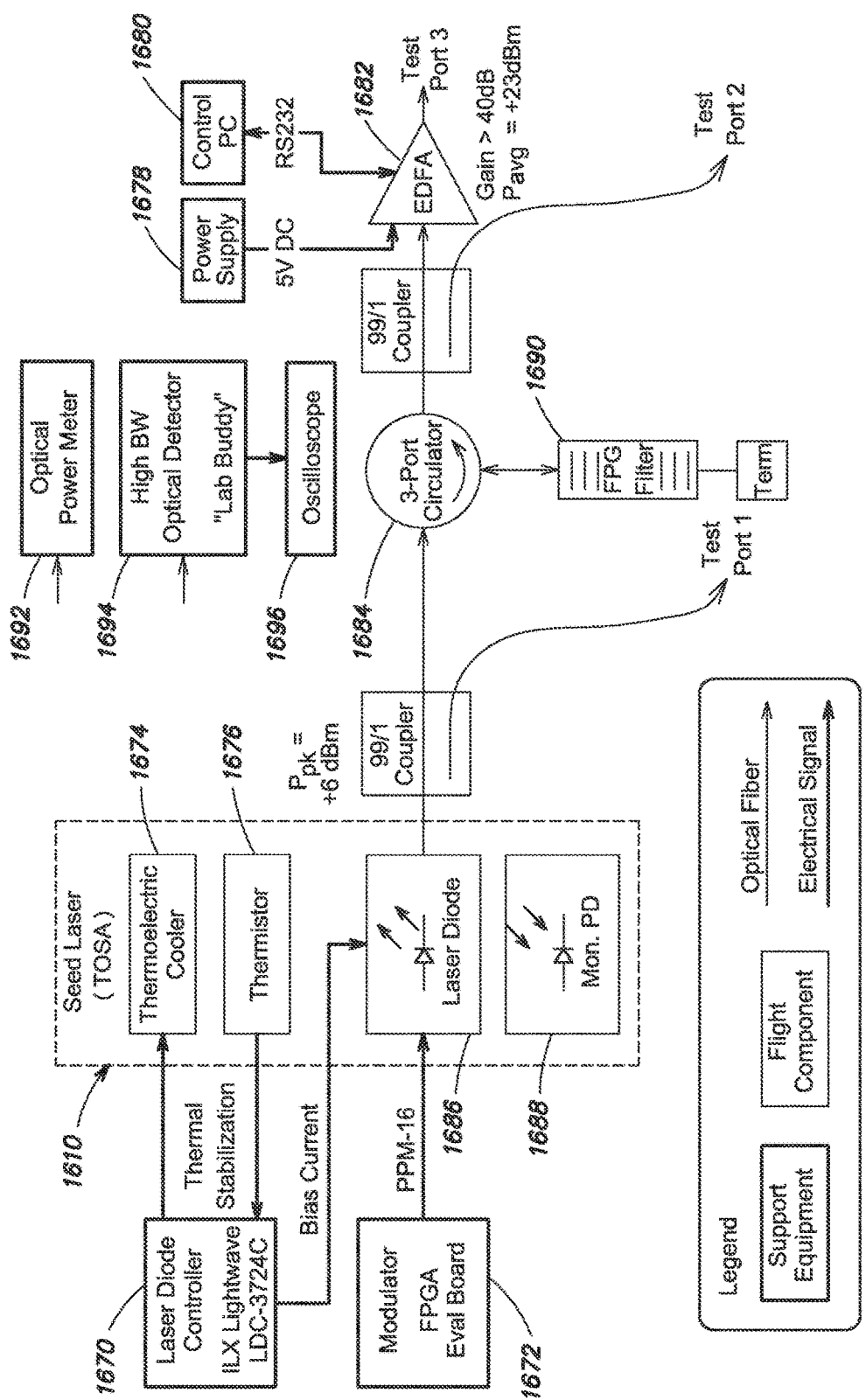
FIG. 16 is a transmitter test configuration according to some embodiments.

FIG. 16 is a transmitter test configuration according to some embodiments. Support equipment includes a laser diode controller 1670 (e.g., ILX Lightwave LDC-3724C), a modulator 1672 (e.g., FPGA evaluation board), an optical power meter 1692, a high bandwidth optical detector 1694, and an oscilloscope 1696. Seed laser 1610 includes TEC 1674, thermistor 1676, laser diode 1686 and photodiode 1688. The laser diode controller 1670 provides bias current to the laser diode 1686, and is also electrically coupled to TEC 1674 and thermistor 1676. Modulator 1672 applies a PPM-16 modulation to the laser diode 1686, whose output is fed through a coupler to both "test port 1" and to a 3-port circulator 1684 in optical communication with an FBG filter 1690. Output from the 3-port circulator 1684 is fed through a coupler to "test port 2" as well as to EDFA 1682 (powered by 5V DC power supply 1678 and controlled by control PC 1680 via an RS232 connection). The EDFA 1682 output is optically fed to "test port 3." The test configuration of FIG. 16 was used to produce the results in FIG. 17 (laser current and temperature wavelength tuning), FIG. 18 (thermal stabilization power consumption), FIG. 19 (filter characterization), FIG. 20 (extinction ratio validation) and FIGS. 21A-F (EDFA validation), discussed in greater detail below.

Seed Laser Selection and Characterization Example

In some embodiments, selection criteria for a seed laser (e.g., for the MOPA configurations discussed above with reference to FIG. 12) include power consumption of the integrated thermoelectric cooler (TEC), size and/or mechanical layout. Accurate temperature control is necessary to stabilize the laser wavelength, and on many lasers the TEC requires a significant amount of power (>1 W). TOSAs can include low power TECs (<0.4 W), and are available in very compact, fiber-coupled packages (e.g., 20 mm×8 mm×5 mm). In some embodiments, a TOSA has 6 dBm continuous wave ("CW") output power in the 1550 nm C-band.

Figure 17:
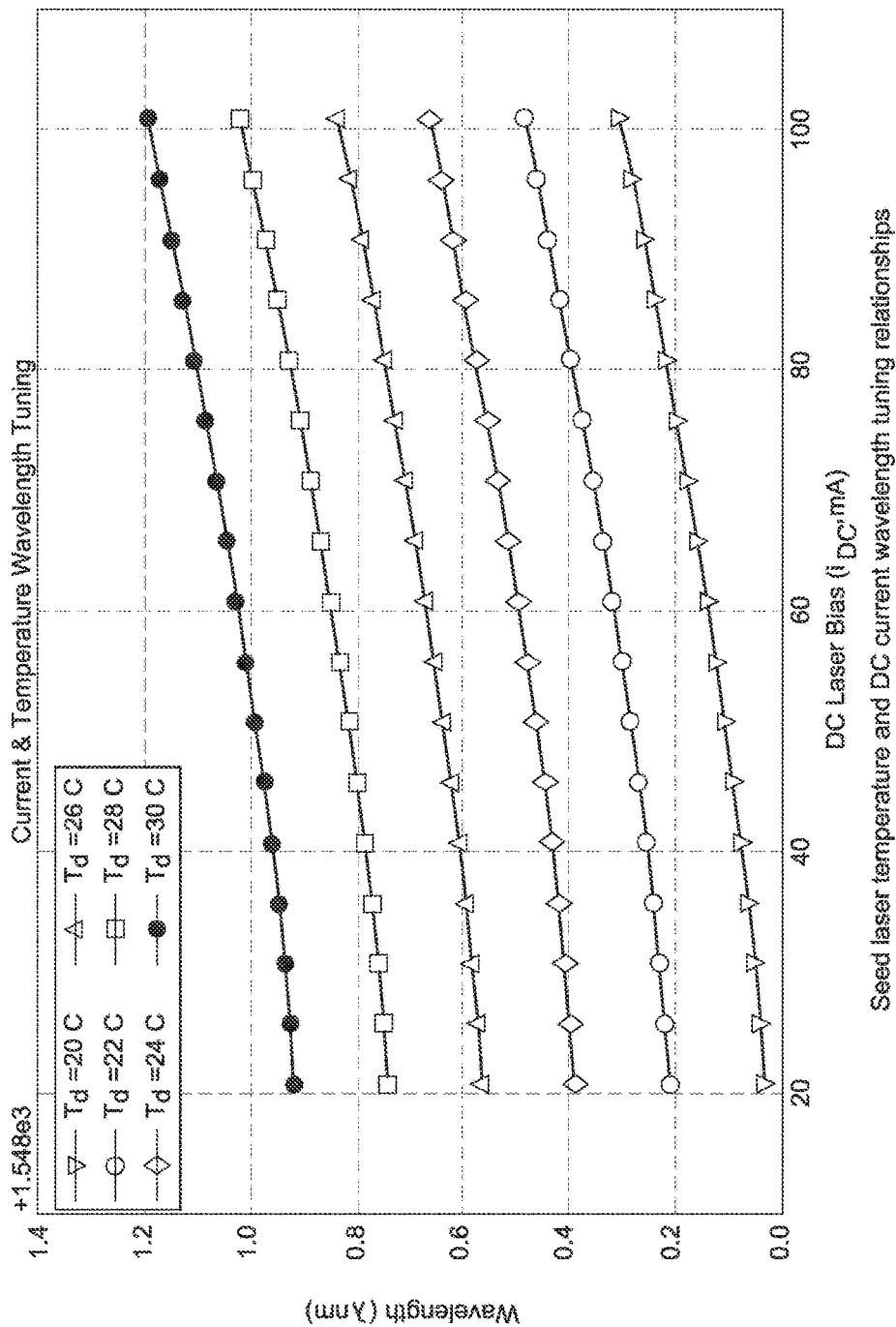
FIG. 17 is a plot of wavelength versus DC laser bias, with each curve corresponding to a different seed laser temperature, according to some embodiments.

An automated testbed comprising a laser diode controller, a wavemeter and an optical spectrum analyzer was used to characterize tuning parameters of a seed laser according to some embodiments (see FIG. 17, showing a plot of wavelength versus DC laser bias, with each curve corresponding to a different seed laser temperature). The approximate tuning characteristics for a representative device were $\Delta\lambda/\Delta T$=−11 GHz/° C., $\Delta\lambda/\Delta i_{DC}$=−0.45 GHz/mA, and $\Delta\lambda/\Delta i_{AC}$=0.20 GHz/mA (measured with PPM at f slot=200 MHz). The TOSA's TEC power consumption was validated by measuring both VTEC and iTEC while the setpoint (Tset) was adjusted relative to ambient. Details relating to the transmitter power budget are provided in Table 33 below.

TABLE 23

Transmitter Power Budget

| | Value | Notes |
|---|---|---|
| EDFA | 5.7 W | Manuf. worst case, (we measured: 4.1 W) |
| Seed laser TEC | 0.4 W (TBRR) | Peak power, over temp |
| Seed laser DC bias | 0.2 W | Worst case |
| Seed laser AC drive | 0.01 W | 50 mA, 1/16 duty |
| FPGA logic | 0.2 W | Only TXer related portion of FPGA |
| Total: | 6.51 W | |
| Margin: | 1.49 W | 8 W budgeted |

Figure 18:
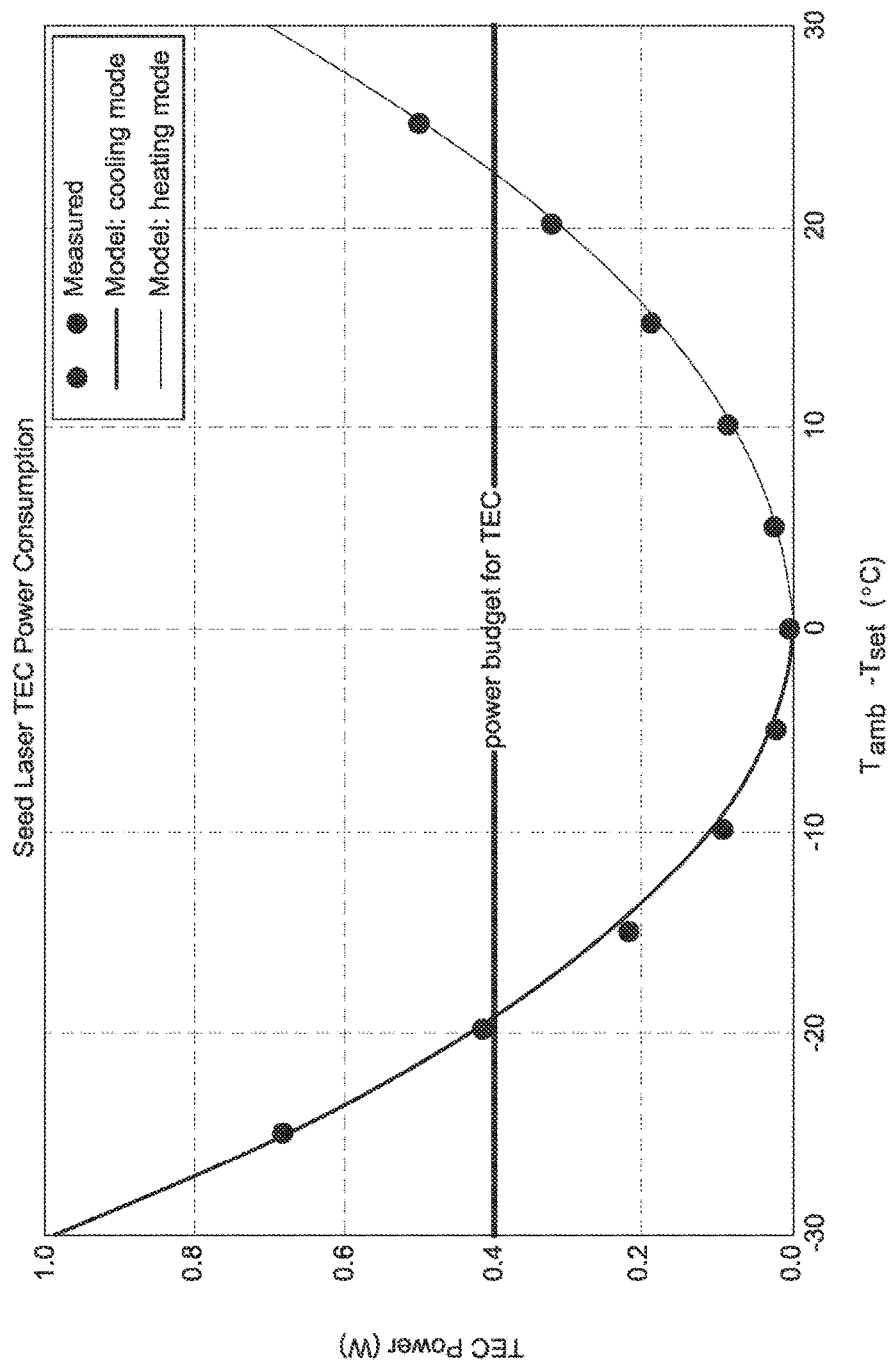
FIG. 18 is a plot of power consumption versus temperature for an exemplary transmitter, according to some embodiments.

FIG. 18 shows a plot of the measured seed laser TEC power consumption versus temperature for an exemplary transmitter, as well as a quadratic model for both heating mode (right half of curve) and cooling mode (left half of curve). The TEC power consumption was within budget (0.4 W), with 18% margin, across the expected operational range for the device (0° C. to 40° C.).

Figure 19:
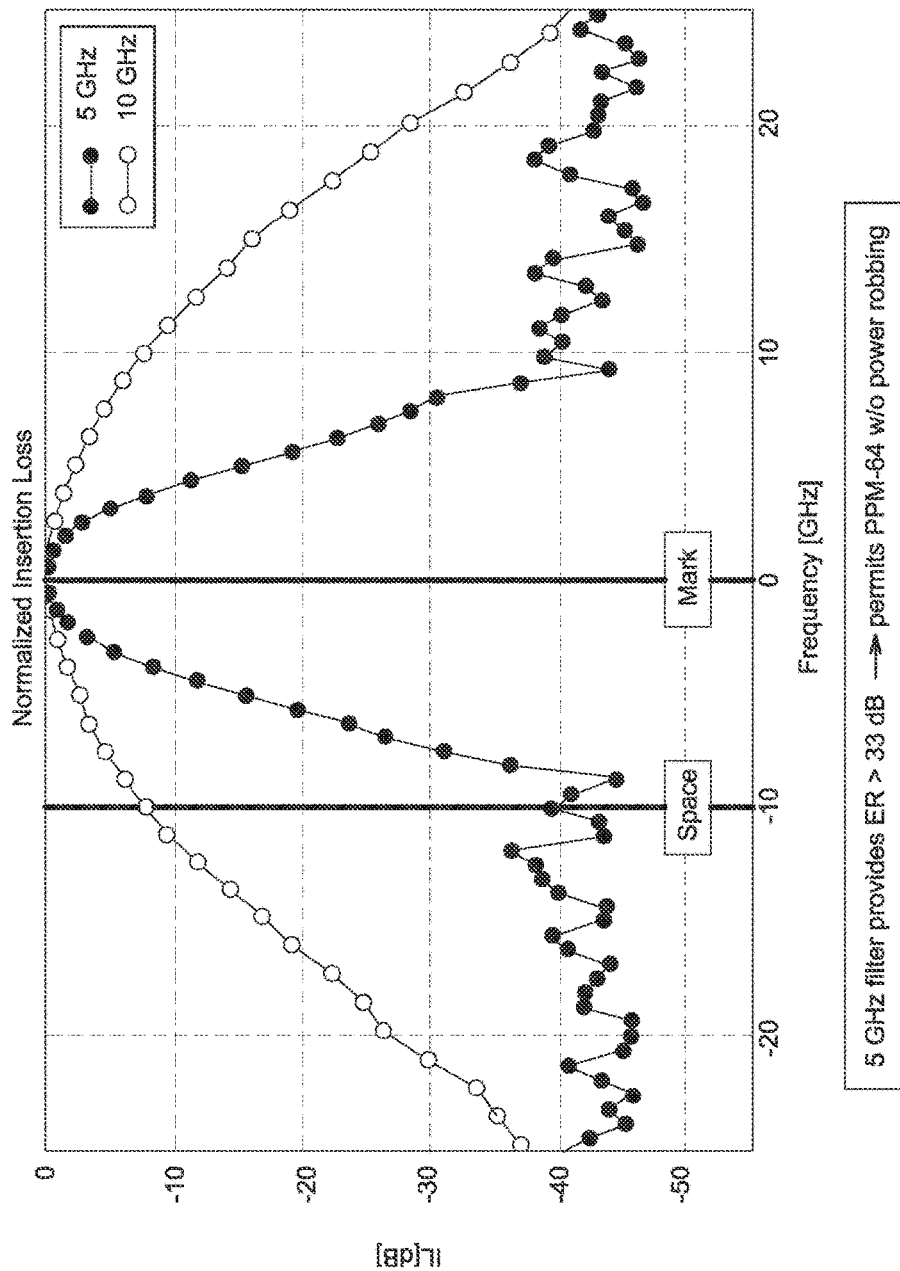
FIG. 19 is a plot of insertion loss versus frequency, comparing 5 GHz and 10 GHz passband filters, according to some embodiments.

FIG. 19 is a plot of insertion loss versus frequency, comparing the insertion loss of two Gaussian passband athermal fiber Bragg grating ("FBG") filters (having bandwidths of 5 GHz and 10 GHz, >40 dB stopband and $|\Delta\lambda/°C.|<\sim 125$ MHz/° C.), along with the expected wavelength "chirp" ($\Delta\lambda/\Delta i_{AC}$) of the seed laser, according to some embodiments. The 10 GHz chirp shown in FIG. 23 was achieved with 50 mA of direct drive current from a Xilinx Spartan 6 FPGA LVCMOS I/O pin. Only the narrower 5 GHz FBG filter was able to produce sufficient seed suppression while maintaining low insertion loss. In some embodiments, temperature/bias wavelength tuning aligns the seed laser with the filter, and signal modulation ER is enhanced through FM-to-AM conversion.

Figure 20:
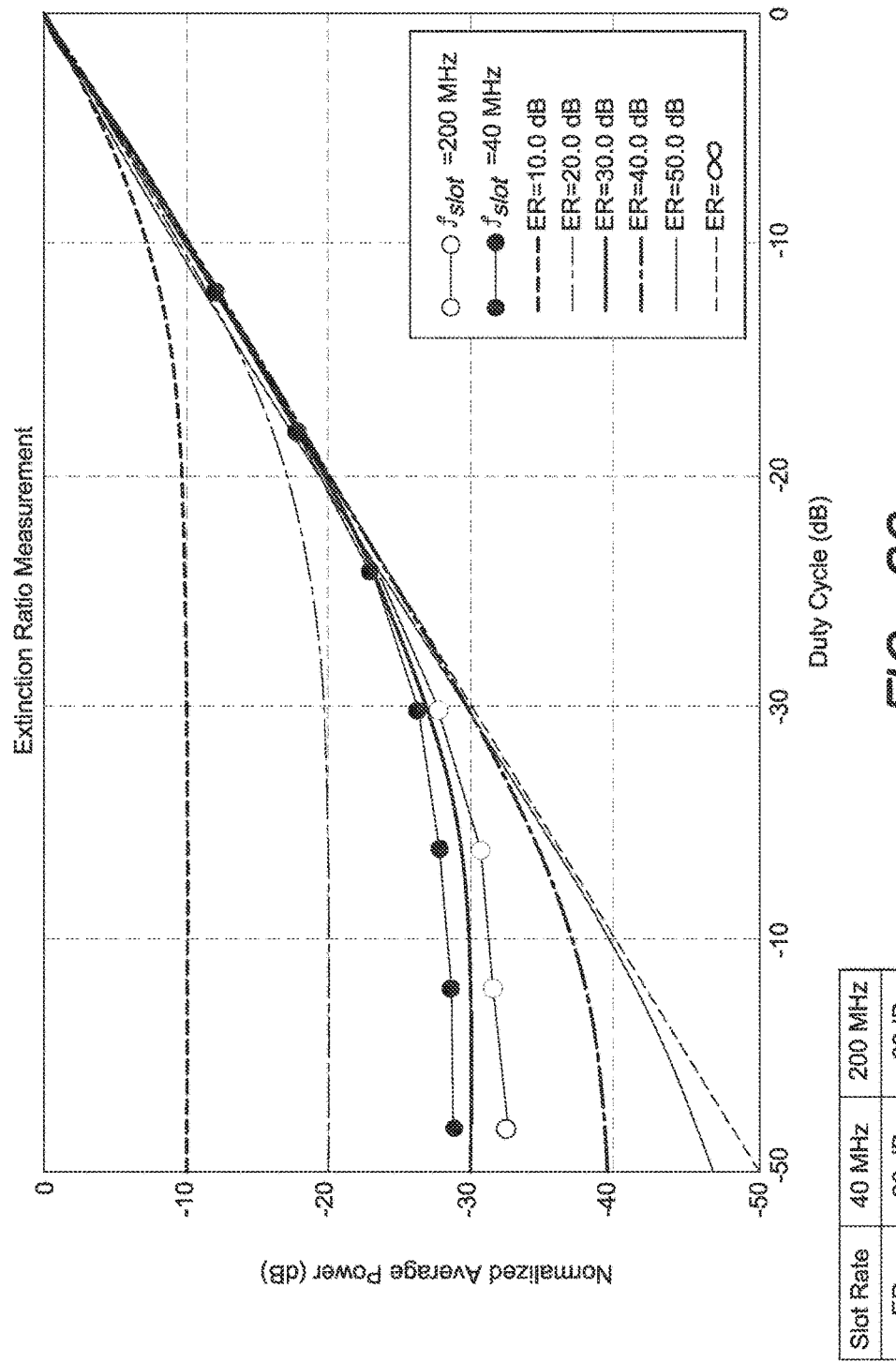
FIG. 20 is a plot showing extinction ratio measurements for a seed laser with an extinction filter, according to some embodiments.

A swept duty-cycle ER measurement (with peak power variation compensation applied) revealed that the combined seed laser, in combination with an extinction filter, was achieving an ER of >33 dB at slot frequency $f_{slot}$=200 MHz (see FIG. 20, a plot showing extinction ratio measurements for a seed laser with an extinction filter, according to some embodiments). Slot frequency is the rate of PPM slots. In other words, 1/(slot frequency) is the duration (or "pulse length") of the transmitter pulses. The aforementioned ER is sufficient for low duty-cycle waveforms, such as 64-ary PPM. The same measurement was completed at $f_{slot}$=40 MHz, and showed a slightly degraded ER ($\approx$28 dB). Without wishing to be bound by theory, this is believed to be due to fact that the modulation frequency is closer to the transition point where thermal effects begin to dominate charge carrier density effects. The higher modulation rate may have had better extinction due to a higher value of $|\Delta\lambda/\Delta iac|$. In some embodiments, the transmitter is operated at $f_{slot}\geq$200 MHz, and the modulation order (M) is varied to achieve a variety of link rates.

Figure 21A:
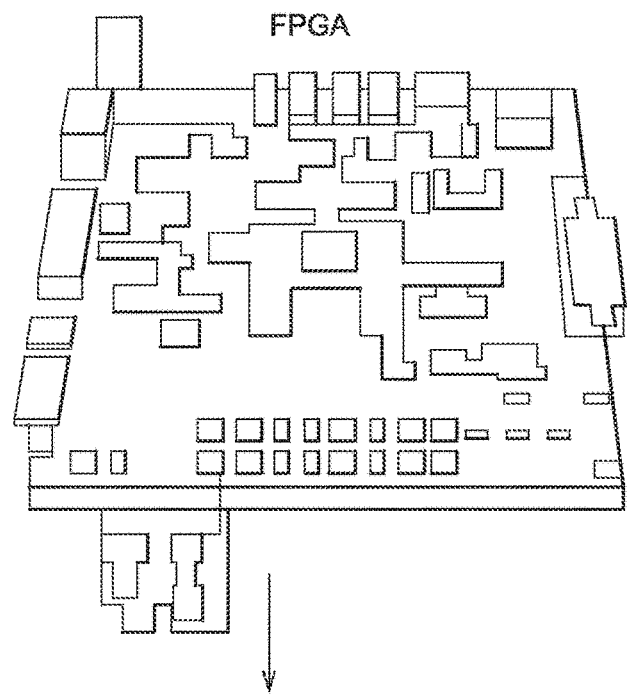
FIGS. 21A-21F show a sequence of system components and related electrical and optical input/output waveform plots, according to some embodiments.
Figure 21B:
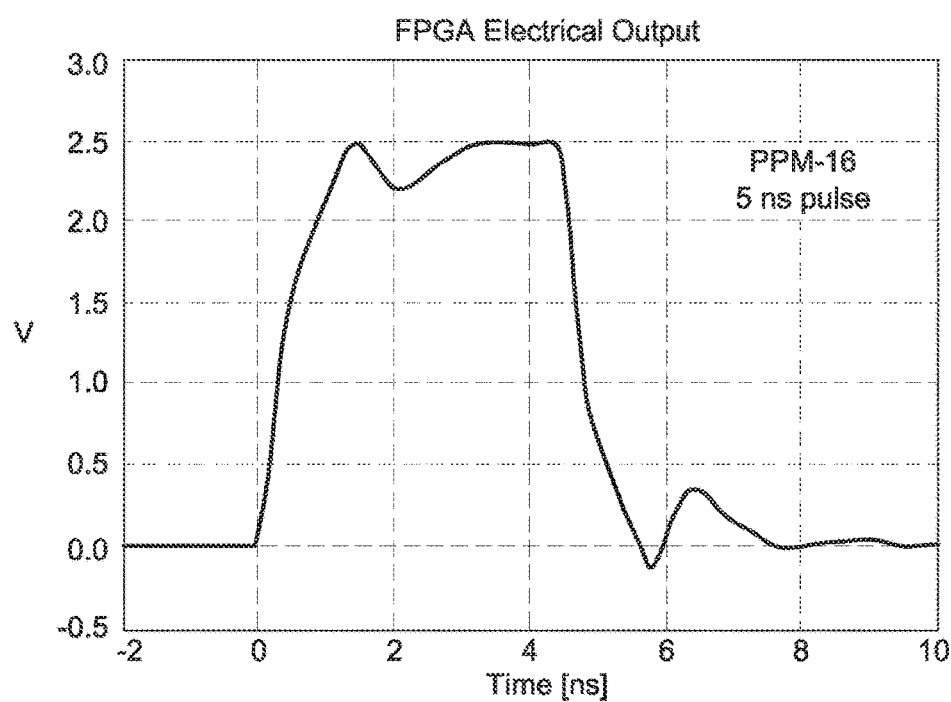
Figure 21C:
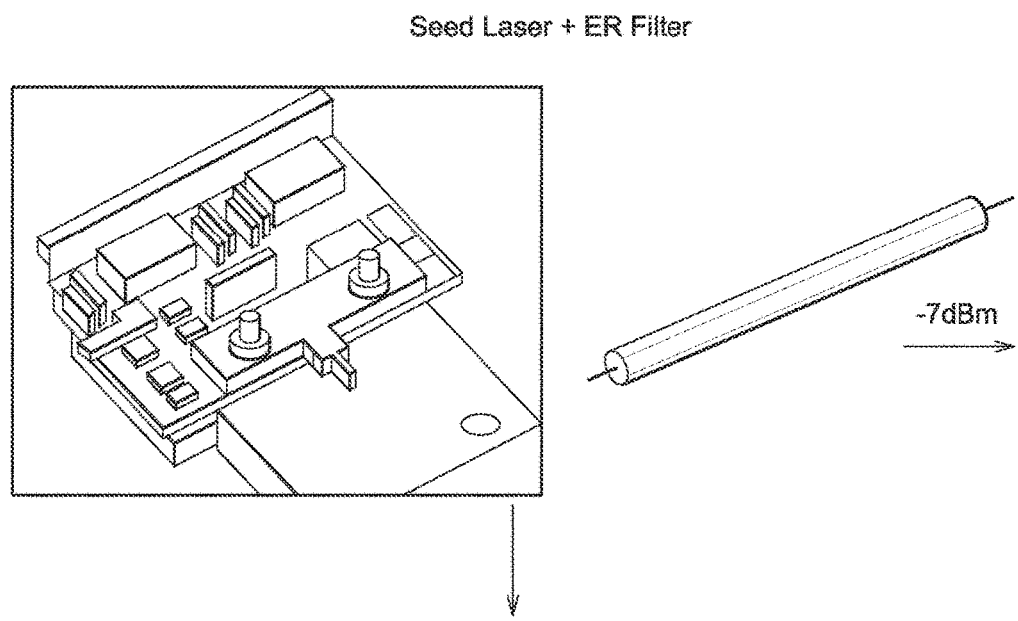
Figure 21D:
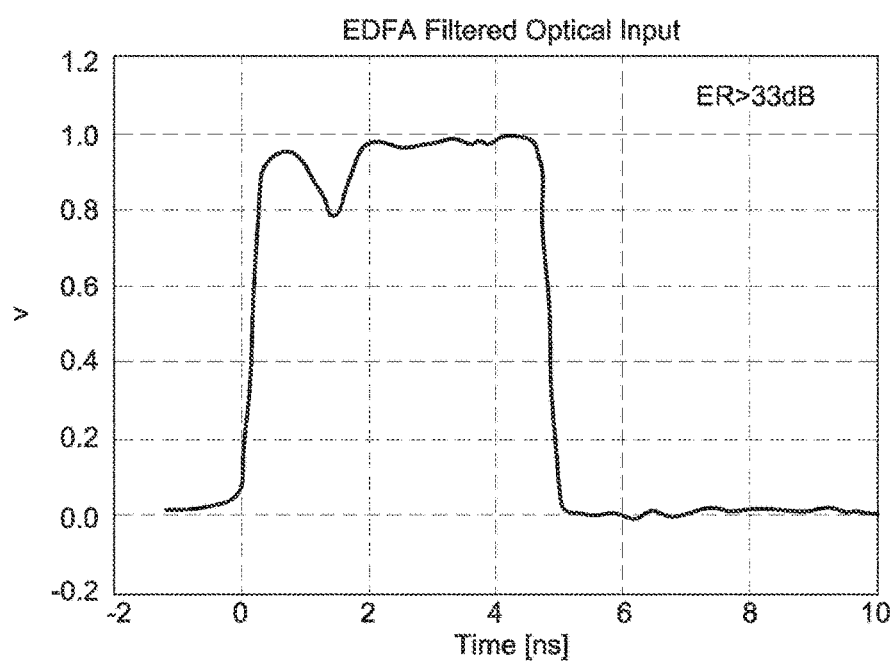
Figure 21E:
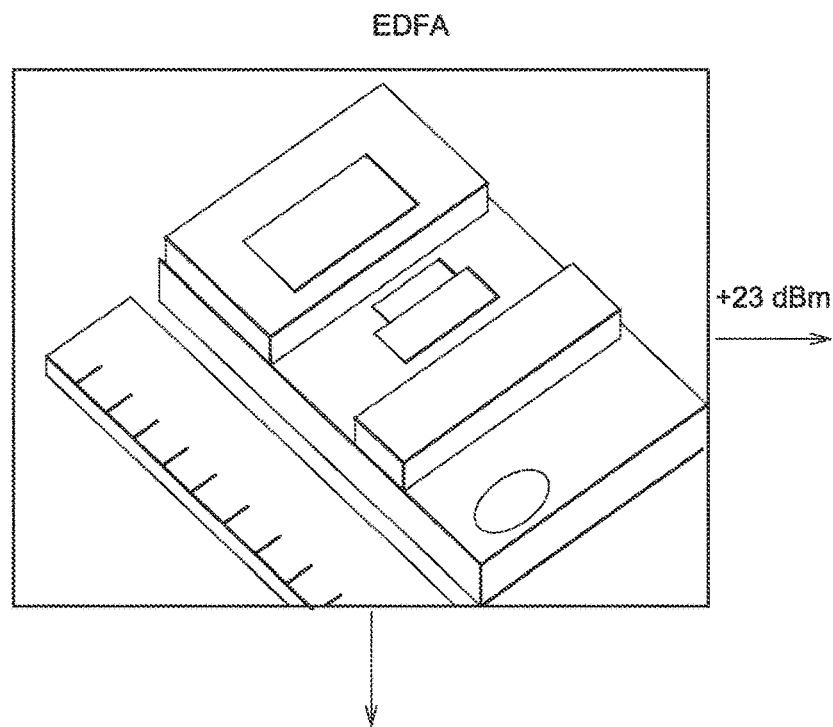
Figure 21F:
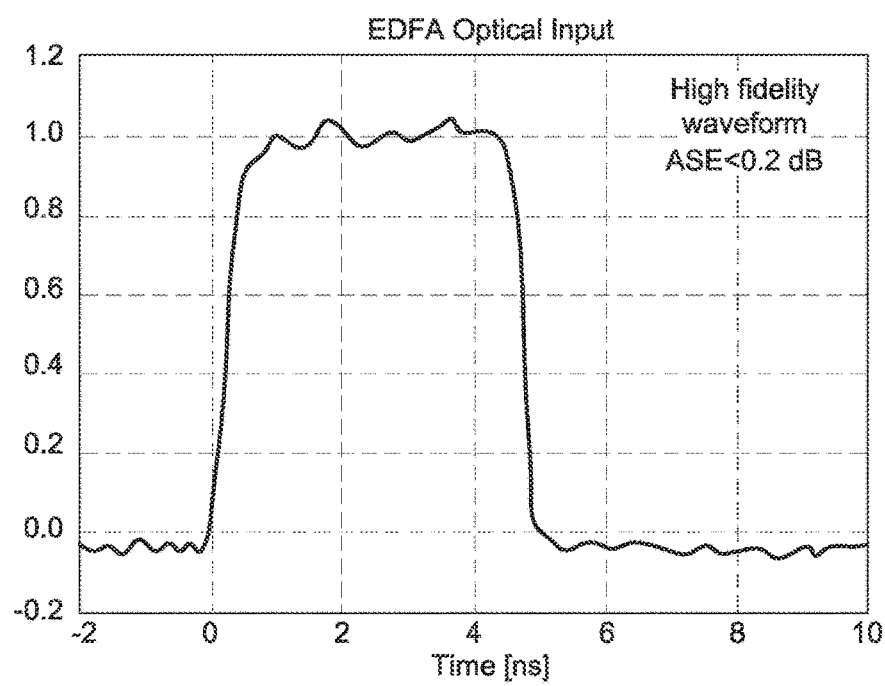

FIGS. 21A-21F show an FPGA, seed laser+ER filter, and EDFA sequence, with related electrical and optical input/output time-domain waveform plots, according to some embodiments. The time-domain measurements show that the design produces high-fidelity optical waveforms, as shown in FIGS. 21B, 21D and 21F. Furthermore, the >33 dB ER of the combined seed laser and filter assembly allows operation at high order PPM (64-ary) without sacrificing the peak power gains offered by the average-power-limited EDFA. Since the design supports modulation bandwidths in excess of 600 MHz, it will be suitable for use in future systems with enhanced pointing capabilities. The power consumption of the transmitter is within budget with nearly 20% margin (see Table 24 below).

TABLE 24

Transmitter Power Consumption Summary
Transmitter power consumption summary

| Parameter | Value | Notes |
|---|---|---|
| EDFA | 5.7 W | Manufacturer worst case specification |
| Seed laser TEC | 0.4 W | Peak power over 0° C. to 40° C. |
| Seed laser DC bias | 0.2 W | Worst case |
| Seed laser AC drive | 0.01 W | 50 mA, 1/16 duty cycle |
| FPGA logic | 0.2 W | Transmitter portion of FPGA {shared with other functions) |
| Total | 6.51 W | |
| Margin | 1.49 W | 8 W budget for transmitter |

Figure 22A:
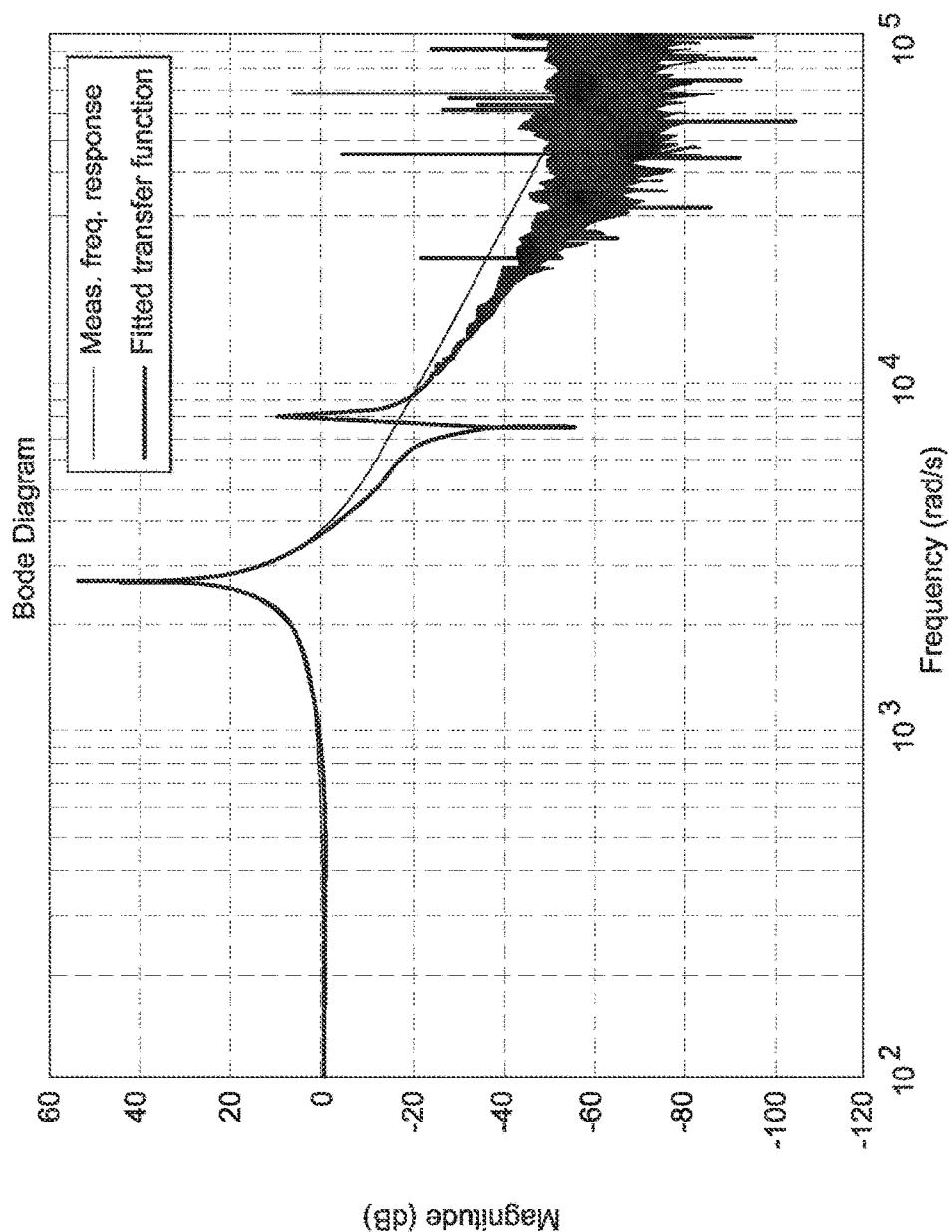
FIGS. 22A and 22B are bode plots showing the frequency response of a fine steering mirror, with and without a Bessel filter, respectively, according to some embodiments.
Figure 22B:
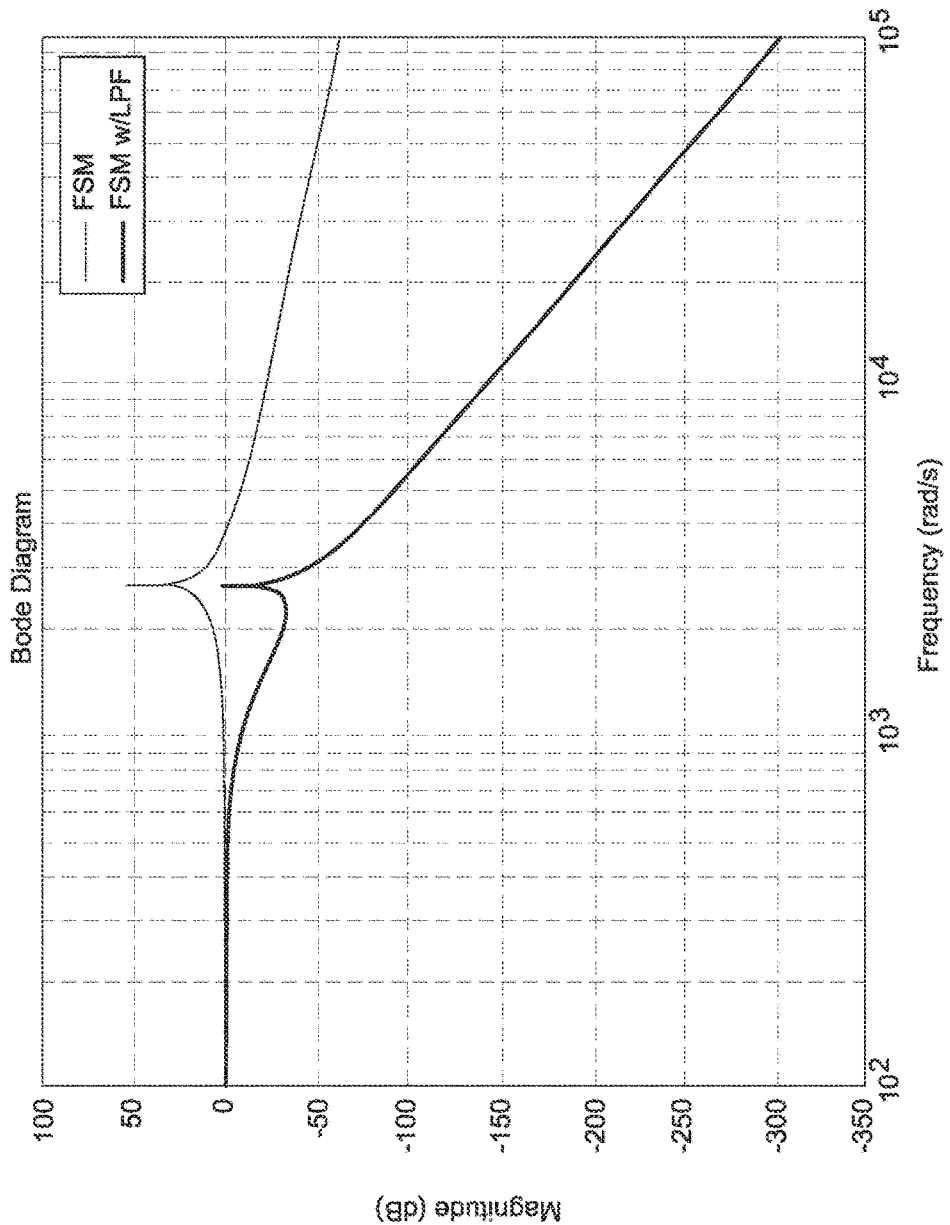

FIGS. 22A and 22B are Bode plots showing the frequency response of a fine steering mirror, with and without a low-pass (e.g., Bessel) filter, respectively, according to some embodiments.

Figure 23A:
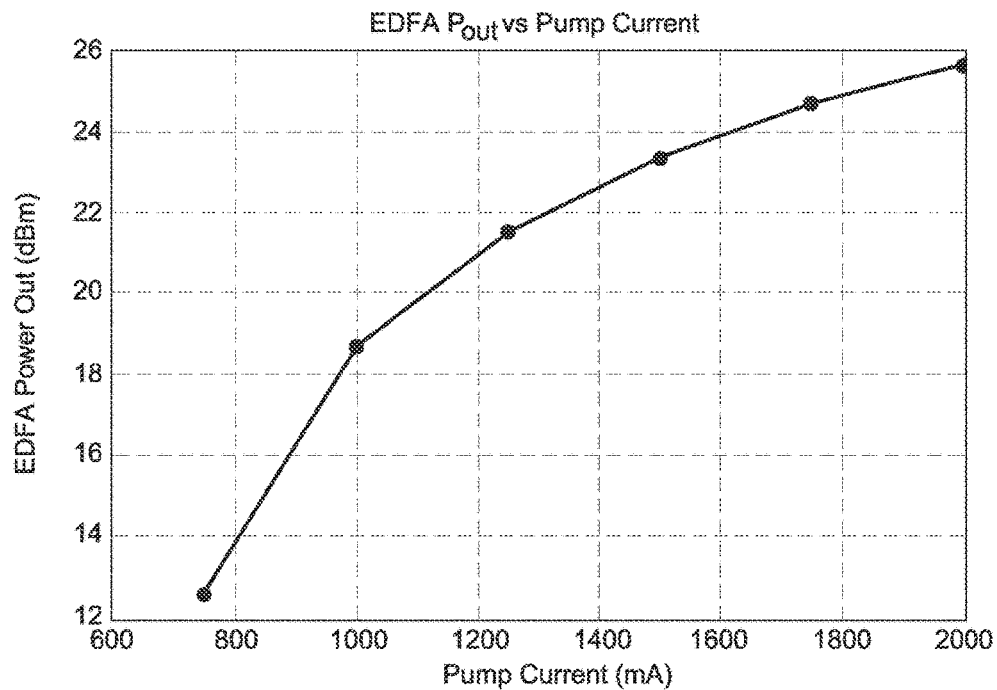
FIGS. 23A and 23B show power/performance plots for erbium-doped fiber amplifiers ("EDFAs"), according to some embodiments.
Figure 23B:
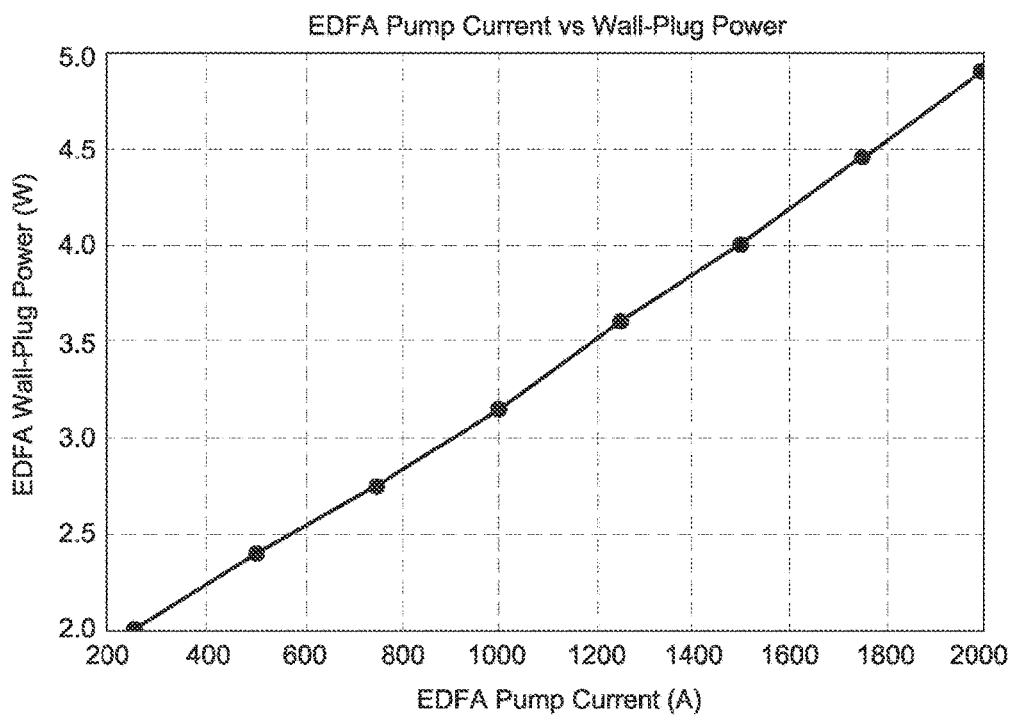

FIGS. 23A and 23B show power/performance plots for erbium-doped fiber amplifiers ("EDFAs"), according to some embodiments.

Simulation of Uplink Beacon Acquisition

Fine attitude sensing capabilities can depend upon the acquisition and tracking capabilities of the uplink beacon. Fading of the uplink beacon due to atmospheric turbulence can be of concern, especially with the high slew speed required to track the satellite in LEO (up to 1°/s). As such, a detailed analysis and simulation were performed to evaluate the performance of a beacon system according to an embodiment.

Table 25 below presents a beacon uplink budget with a 10 W transmitter, 5 mrad beamwidth when the satellite is at 20° and 90° elevation angle, with estimates of optical and atmospheric absorption and scattering losses (see Tables 25-27, also below). Noise components in the simulation include shot noise from signal, background sky radiance, and the noise sources of the beacon camera detector. In some embodiments, background shot noise is the dominant source. Various background light conditions were analyzed including a worst case scenario consisting of sunlit clouds. The estimated spectral radiance in this condition at 850 nm is approximately 180 W/m²/sr/um. The estimated integration time is selected to maximize dynamic range given the well capacity of the detector.

TABLE 25

Beacon Uplink Budget
Beacon link budget

| Transmitter | | | |
|---|---|---|---|
| Transmit laser power | 10 | W | |
| Uplink wavelength | 850 | nm | |
| Beam divergence | 5 | mrad | |
| Actual transmit power | 4 | W | |
| | 20° elevation | 90° elevation | |
| Free-space/Atmospheric channel | | | |
| Range | 894 | 400 | Km |
| Atmospheric absorption and scattering | −6 | −5 | dB |

TABLE 25-continued

Beacon Uplink Budget
Beacon link budget

Receiver

| | | | |
|---|---|---|---|
| Receiver bandwidth | 10 | 10 | Nm |
| Average power at detector | 0.013 | 0.081 | nW |
| Interation time | 1.6 | 0.5 | Ms |
| Total photons received | 7.3E+04 | 1.8E+05 | photons |
| Noise level in ROI | 7.0E+03 | 9.9E+03 | photons |
| Optical S/N | 10.1 | 12.5 | dB |

TABLE 26

Link Analysis

| | | |
|---|---|---|
| Transmit power | 10 | W |
| Wavelength | 850 | nm |
| Beamwidth | 5 | mrad |
| Range (20° elevation) | 984 | km |
| Atmospheric absorption/scattering | −6 | db |
| Sky radiance[5] | 180 | W/m³/sr/um |
| Receiver bandwidth | 10 | nm |
| Optics loss (Tx + Rx) | −8 | db |
| Received power | 0.013 | nW |
| Margin | 10 | db |

TABLE 27

Scintillation Statistics

| | |
|---|---|
| $C_n^2$ profile | Huffnagel-Valiey model[3] 1°/s slew speed |
| Scintillation index | Strong-turbulence model[3] Spatial diversity (4 beams) |
| Distribution | Log-normal |

Figure 24:
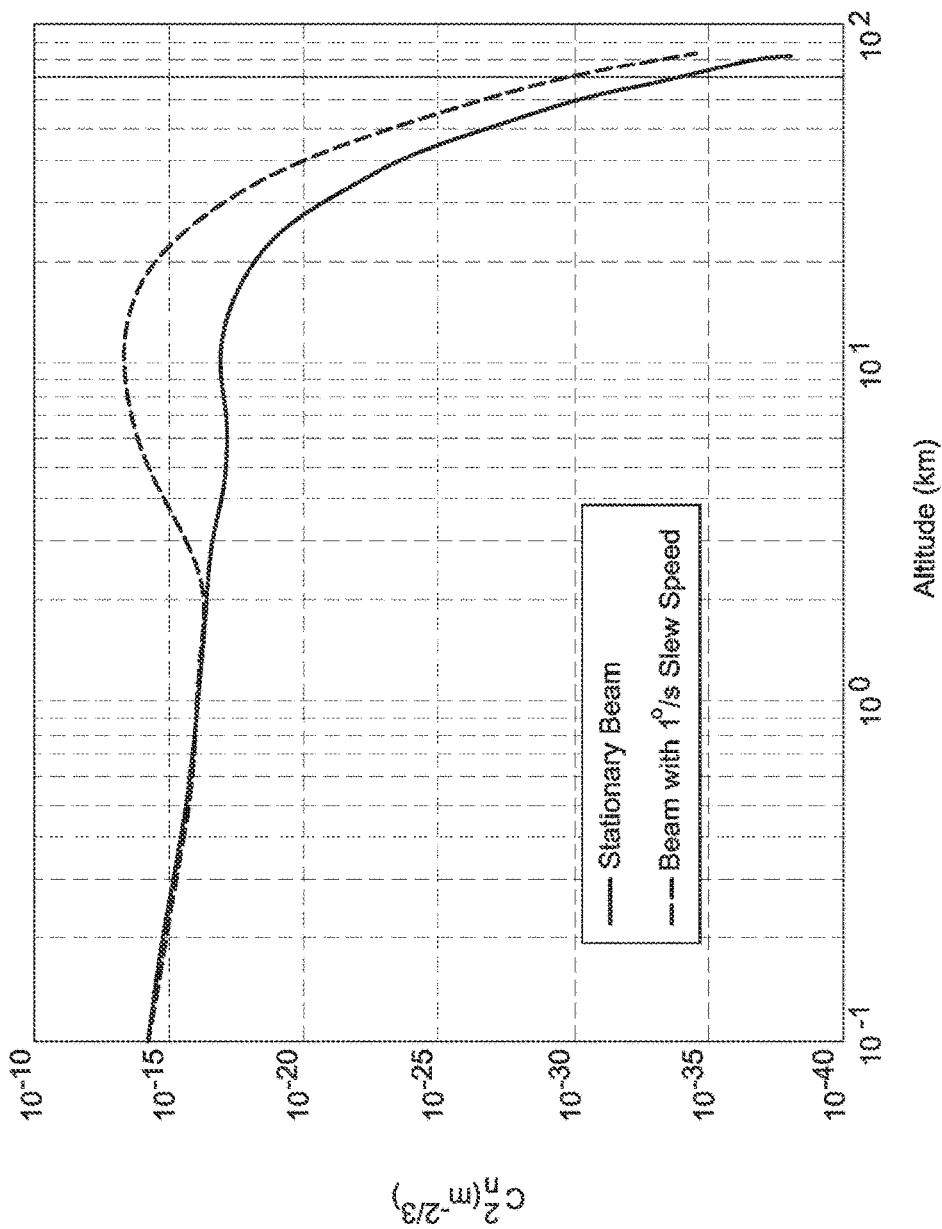
FIG. 24 is a plot showing atmospheric refractive index structure parameter profiles for a stationary beam and for a beam with 1°/s slew speed, according to some embodiments.

The atmospheric refractive index structure parameter ($C_n^2$) profile for a mission can be estimated using the Hufnagel-Valley model. Since uplink beam will be slewing up to 1°/s to track the satellite in LEO, the slew rate becomes the dominant "wind-speed" parameter. This slew rate was incorporated in the Hufnagel-Valley model as additional wind speed through the Bufton wind model, leading to a more turbulent $C_n^2$ profile than the standard HV5/7 profile, as seen in FIG. 24 (a plot showing atmospheric refractive index structure parameter profiles for a stationary beam and for a beam with 1°/s slew speed). The scintillation index can be estimated using the strong-turbulence model. A high scintillation index, e.g. caused by a fast slew rate, can be reduced by the use of multiple independent transmitters for spatial diversity. For a satellite at 400 km altitude, the scintillation index of the uplink channel with 4 independent transmitters is approximately 0.3. Signal power fluctuations about the mean value from the above link budget can be estimated using a log-normal distribution with variance equal to the scintillation index. Additional information on the models referenced herein (e.g., Hufnagel-Valley model and Bufton wind model) can be found in "Laser Beam Propagation through Random Media," second edition, by Larry Andrews and Ronald Phillips (2005).

Figures 26A, 26B:
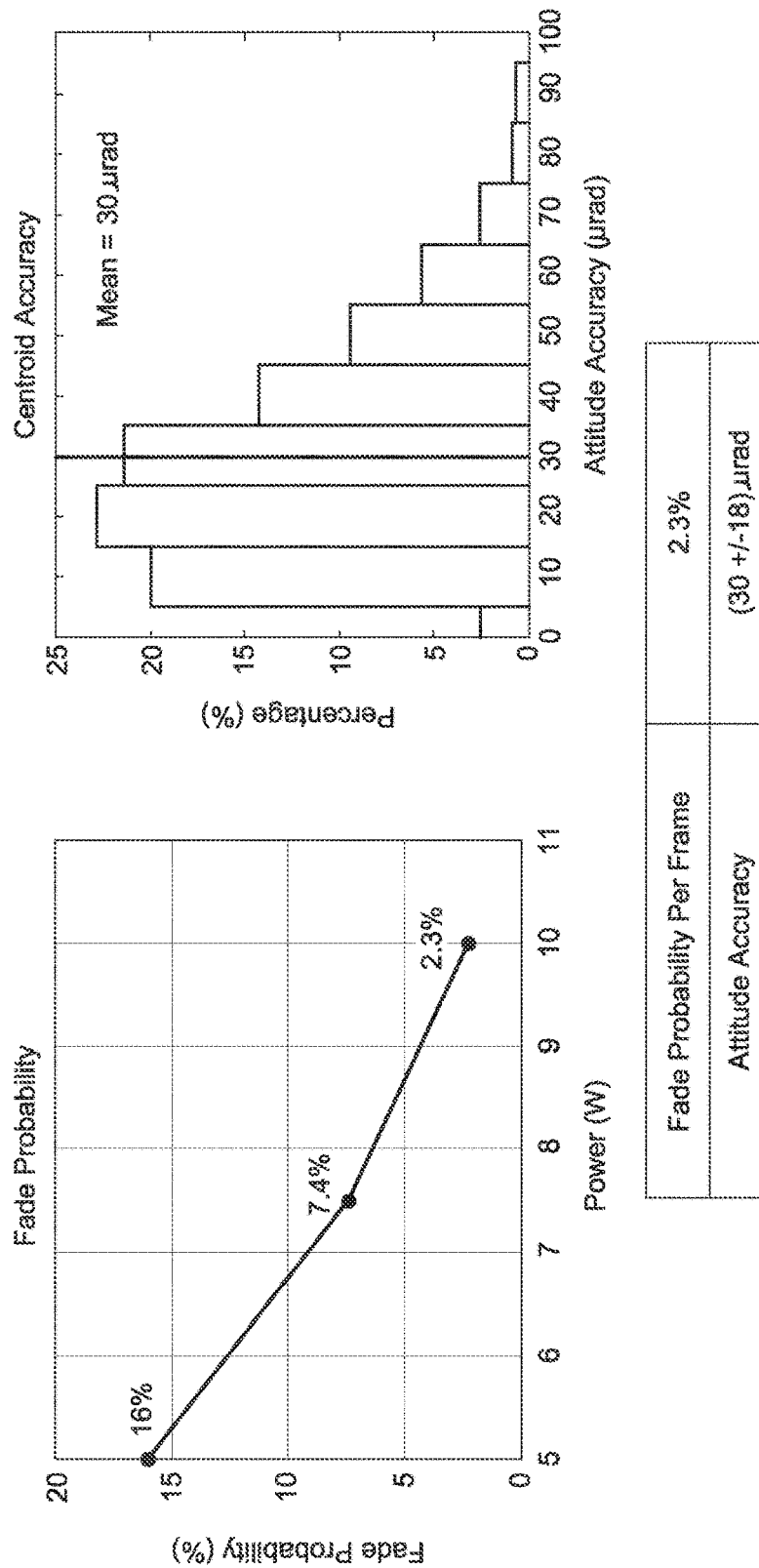
FIGS. 26A and 26B are plots showing beacon acquisition simulation results, according to some embodiments.

The fade probability and centroiding accuracy were found by running the simulation with scintillation statistics with a time series of expected beam motion at 20° elevation from a 400 km altitude orbit. A fade instance is defined as the case where the brightest pixel does not belong to the beacon image on the detector array. In this simulation, the scintillation time scale is assumed to be comparable to the detectors integration time. The fade probability indicates the probability that the beacon is not found within the time it takes to read out a frame, which is approximately 0.15 s for a 5 megapixel camera. FIG. 26A shows the simulation results of fade probability at various transmitter power levels (5 W, 7.5 W, 10 W). As shown in FIG. 26A, the fade probability can be reduced to about 2.3% given a 10 W transmit power, sufficient for acquisition and tracking given proper real-time estimation techniques.

Figure 25A:
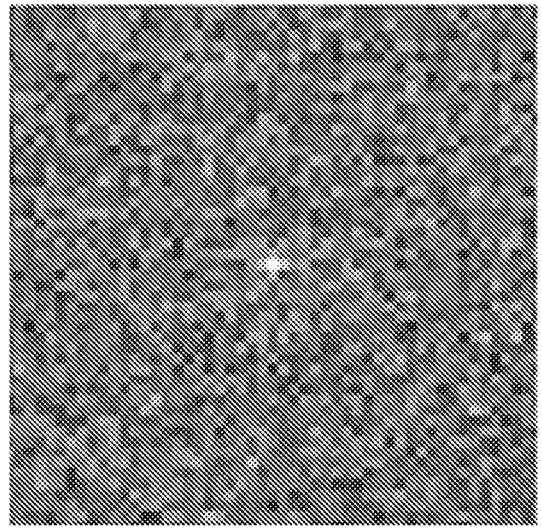
FIGS. 25A and 25B are images simulating the identification of a beacon region of interest, according to some embodiments.
Figure 25B:
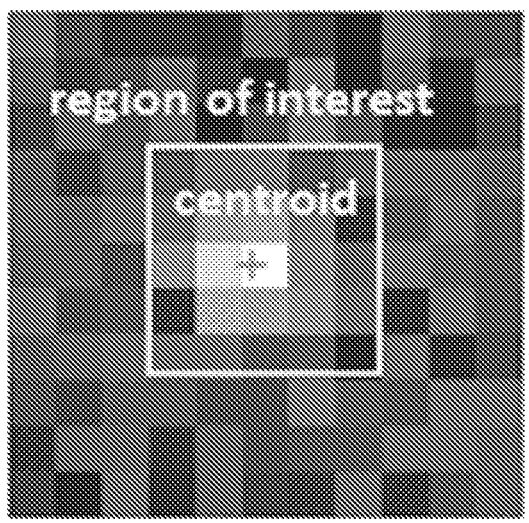

The centroiding accuracy was found using center-of-mass centroiding of the beacon image on the detector (see FIGS. 25A and 25B). The accuracy result when not fading is shown in FIG. 26B. The average centroiding accuracy is approximately 0.5 pixel, corresponding to a mean attitude accuracy of 30 μrad. This accuracy result is less than 1/10 of the pointing requirement of the fine stage, leaving margin for actuation limitations and errors.

Control System Simulation

Figure 27:
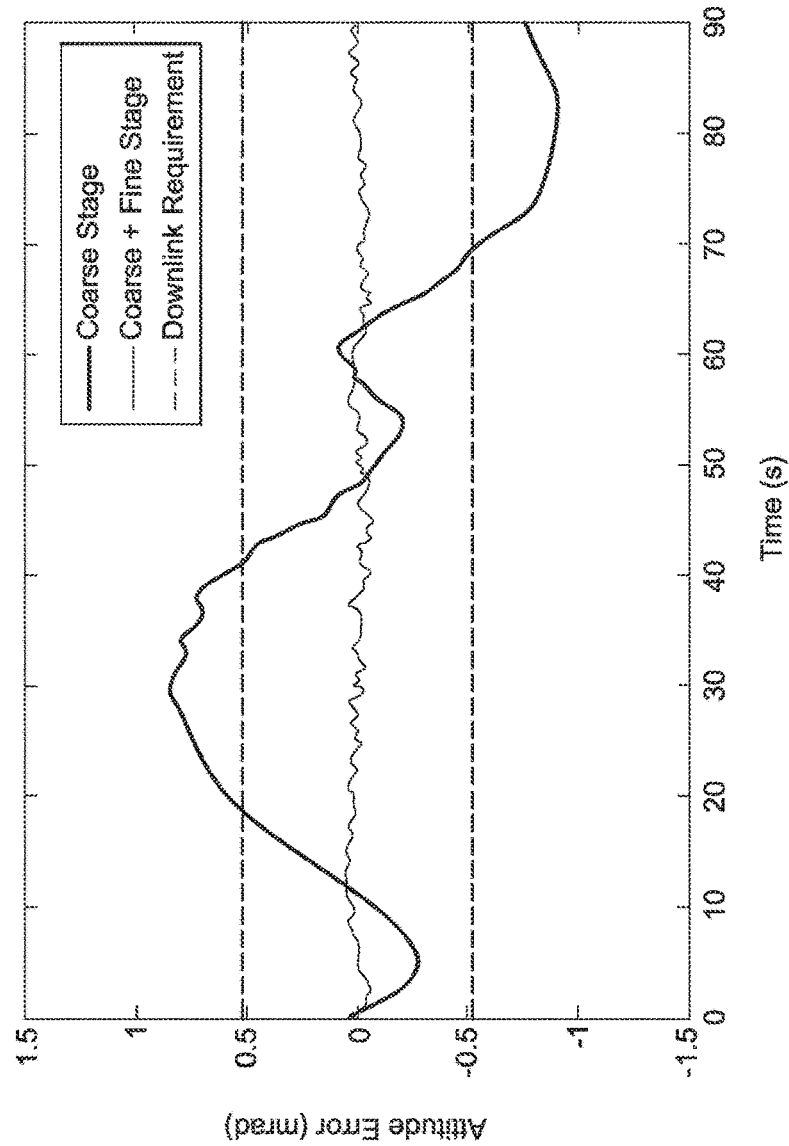
FIG. 27 is a plot showing attitude error for systems using a coarse pointing stage with and without a fine pointing stage, according to some embodiments.

A simulation of coarse and fine control stages was performed, incorporating the results of the uplink beacon simulation described in the previous section. The accuracy of the detector was taken to be 30 μrad on average. The rate at which the FSM can be driven is limited by the beacon detector readout and processing. A readout rate of 10 Hz is sufficient for an accuracy of 525 μrad, as shown in FIG. 31. Once the beacon has been acquired, the CubeSat pointing performance can be dependent upon the control authority of its reaction wheels. The CubeSat modeled in FIG. 27 is affected by torque quantization and is intended as a fairly low-performance actuator. Verifying that the fine stage can improve performance to within required accuracy (with a margin of 7 dB) for this scenario indicates that it can meet the pointing requirements for a typical CubeSat.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein, the terms "about" and "approximately" generally mean plus or minus 10% of the value stated.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A Cubesat module for a CubeSat, the CubeSat module comprising:
    an optical transmitter to transmit data to a remote terminal;
    a receiver to acquire an optical beacon from the remote terminal;
    a coarse-pointing module to point the CubeSat toward the remote terminal with an attitude accuracy of within about 3°; and
    a fine-pointing module, operably coupled to the coarse-pointing module, to point the optical transmitter toward the remote terminal with an accuracy of about 0.03°.

2. The Cubesat module of claim 1, wherein the coarse-pointing module is operably coupled to the receiver and configured to point the Cubesat toward the remote terminal with an attitude accuracy of within about 1° in response to the receiver acquiring the optical beacon.

3. The Cubesat module of claim 1, wherein the optical transmitter is configured to transmit the data to the remote terminal via a first aperture and the receiver comprises a focal plane array configured to receive the optical beacon from the remote terminal via a second aperture.

4. The Cubesat module of claim 1, wherein the optical transmitter is configured to transmit the data to the remote terminal via a first aperture and the receiver comprises a focal plane array configured to receive the optical beacon from the remote terminal via the first aperture.

5. The Cubesat module of claim 1, wherein the coarse-pointing module comprises at least one of a thruster, a magnetorquer, a reaction wheel, or a control moment gyroscope.

6. The Cubesat module of claim 1, wherein the fine-pointing module comprises a fine-steering mirror.

7. The Cubesat module of claim 1, further comprising:
    a processor, operably coupled to the beacon receiver, to determine a range of the CubeSat to the remote terminal and an attitude of the CubeSat with respect to the remote terminal based on the beacon acquired at the beacon receiver.

8. A method of pointing, acquisition, and tracking by a satellite, the method comprising:
    pointing an entirety of the satellite at a remote terminal with an attitude accuracy of within about 3°;
    acquiring, by the satellite, an optical beacon from the remote terminal, the acquiring comprising closing a control loop, with a coarse-steering module on the satellite, around the optical beacon; and
    tracking, by the satellite, the optical beacon from the remote terminal, the tracking comprising rejecting residual tracking error with a fine-steering module on the satellite.

9. The method of claim 8, wherein the closing the control loop comprises pointing the satellite at the remote terminal with an attitude accuracy of within about 1°.

10. The method of claim 8, wherein the rejecting residual error comprises pointing the satellite at the remote terminal with an accuracy of about ±0.03°.

11. The method of claim 8, further comprising:
    transmitting a free-space optical beam modulated with data from the satellite to the remote terminal.

12. The method of claim 11, further comprising:
    mitigating atmospheric fading so as to reduce a bit-error rate of the free-space optical beam.

13. A satellite comprising:
    a receiver to receive an optical beacon from a remote terminal;
    a coarse-steering module, operably coupled to the beacon, to point an entirety of the satellite at the remote terminal with an attitude accuracy of within about 3° by closing a control loop around the optical beacon; and
    a fine-steering module, operably coupled to the beacon and the coarse-steering module, to reject residual tracking error associated with the control loop.

14. The satellite of claim 13, wherein the coarse-steering module is configured to point the satellite at the remote terminal with an attitude accuracy of within about 1° upon closing the control loop.

15. The satellite of claim 13, wherein the fine-steering module is configured to point the satellite at the remote terminal with an accuracy of about ±0.03°.

16. The satellite of claim 13, further comprising:
    an optical transmitter to transmit a free-space optical beam modulated with data from the satellite to the remote terminal.

17. The satellite of claim 16, further comprising:
    an interleaver, operably coupled to the optical transmitter, to mitigate atmospheric fading so as to reduce a bit-error rate of the free-space optical beam.

18. A satellite comprising:
    a beacon receiver to acquire an optical beacon from a remote terminal;
    a coarse-pointing module to point an entirety of the satellite at the optical beacon with an attitude accuracy of within 3°;

an optical transmitter to transmit a free-space optical beam modulated with data to the remote terminal;
a fine-pointing module, operably coupled to the coarse-pointing module, to point the free-space optical beam toward the remote terminal with a second accuracy that overlaps with the attitude accuracy; and
an electronics module, operably coupled to the optical transmitter, to perform interleaving to mitigate atmospheric fading so as to reduce a bit-error rate of the free-space optical beam.

* * * * *